(12) United States Patent
Gallo

(10) Patent No.: US 11,408,098 B2
(45) Date of Patent: Aug. 9, 2022

(54) METHODS FOR PRODUCING POLYMER FIBERS AND POLYMER FIBER PRODUCTS FROM MULTICOMPONENT FIBERS

(71) Applicant: Global Materials Development, LLC, Raleigh, NC (US)

(72) Inventor: Peter W. Gallo, Raleigh, NC (US)

(73) Assignee: GLOBAL MATERIALS DEVELOPMENT, LLC, Raleigh, NC (US)

( * ) Notice: Subject to any disclaimer, the term of this patent is extended or adjusted under 35 U.S.C. 154(b) by 370 days.

(21) Appl. No.: 16/780,400

(22) Filed: Feb. 3, 2020

(65) Prior Publication Data

US 2020/0299869 A1  Sep. 24, 2020

Related U.S. Application Data

(60) Provisional application No. 62/822,521, filed on Mar. 22, 2019.

(51) Int. Cl.
| | |
|---|---|
| B01D 37/00 | (2006.01) |
| B29B 17/02 | (2006.01) |
| C08J 7/02 | (2006.01) |
| C08J 11/02 | (2006.01) |
| C08J 11/04 | (2006.01) |
| C08J 11/08 | (2006.01) |

(Continued)

(52) U.S. Cl.
CPC .......... *D01F 13/04* (2013.01); *B29C 71/0009* (2013.01); *D01F 8/06* (2013.01); *D01F 8/14* (2013.01); *D03D 15/292* (2021.01); *D04H 3/007* (2013.01); *D04H 3/011* (2013.01); *D06M 7/00* (2013.01); *D06M 23/10* (2013.01); *B29B 2017/0203* (2013.01); *B29B 2017/0289* (2013.01); *B29B 2017/0293* (2013.01); *B29B 2017/0296* (2013.01); *D10B 2321/021* (2013.01); *D10B 2331/04* (2013.01)

(58) Field of Classification Search
CPC .......... B01D 37/00; B01J 8/006; B29B 17/02; B29B 2017/0203; B29B 2017/0289; B29B 2017/0293; B29B 2017/0296; B29C 71/0009; C08J 7/02; C08J 11/02; C08J 11/04; C08J 11/08; D01F 13/00; D01F 13/04; D06M 7/00
USPC ............ 264/211.16, 340, 343, 913; 210/767; 521/40.5, 47, 48, 49.8; 528/491, 492, 528/493, 494, 495, 496, 497, 498, 502 A, 528/502 D
See application file for complete search history.

(56) References Cited

U.S. PATENT DOCUMENTS

| | | | |
|---|---|---|---|
| 4,206,257 | A | 6/1980 | Fukushima et al. |
| 5,198,471 | A | 3/1993 | Nauman et al. |

(Continued)

FOREIGN PATENT DOCUMENTS

| | | |
|---|---|---|
| EP | 0894818 B1 | 3/2005 |
| WO | 2015000681 A1 | 1/2015 |
| WO | 2018069205 A1 | 4/2018 |

*Primary Examiner* — Leo B Tentoni
(74) *Attorney, Agent, or Firm* — Neo IP

(57) ABSTRACT

The present invention relates to methods of producing polymer fibers and polymer fiber products and materials recovery from these processes. It is an object of this invention to produce polymer fibers and products that include these fibers using selective dissolution of multicomponent fiber and to recover the dissolved polymer and solvent for subsequent use.

20 Claims, 25 Drawing Sheets

(51) Int. Cl.
  *D01F 13/00* (2006.01)
  *D01F 13/04* (2006.01)
  *D01F 8/06* (2006.01)
  *D01F 8/14* (2006.01)
  *D06M 23/10* (2006.01)
  *D04H 3/007* (2012.01)
  *D04H 3/011* (2012.01)
  *D06M 13/00* (2006.01)
  *D03D 15/292* (2021.01)
  *B29C 71/00* (2006.01)

(56) References Cited

U.S. PATENT DOCUMENTS

| | | | |
|---|---|---|---|
| 6,583,075 | B1 | 6/2003 | Dugan |
| 6,767,853 | B1 | 7/2004 | Nakayama et al. |
| 6,861,142 | B1 | 3/2005 | Wilkie et al. |
| 7,431,869 | B2 | 10/2008 | Haggard et al. |
| 7,585,795 | B2 | 9/2009 | Yakake et al. |
| 7,666,504 | B2 | 2/2010 | Ochi et al. |
| 7,910,207 | B2 | 3/2011 | Kamiyama et al. |
| 7,981,336 | B2 | 7/2011 | Pourdeyhimi |
| 7,998,887 | B2 | 8/2011 | Horiguchi et al. |
| 8,138,232 | B2 | 3/2012 | Maeurer et al. |
| 8,349,232 | B2 | 1/2013 | Pourdeyhimi et al. |
| 8,501,642 | B2 | 8/2013 | Naruse et al. |
| 8,969,224 | B2 | 3/2015 | Masuda et al. |
| 9,284,431 | B2 | 3/2016 | Hohner et al. |
| 9,605,126 | B2 | 3/2017 | Parker et al. |
| 2001/0029138 | A1 | 10/2001 | Aikawa et al. |
| 2003/0191202 | A1 | 10/2003 | Maurer et al. |
| 2005/0079781 | A1* | 4/2005 | Tsujimoto ............... D04H 3/12 442/361 |
| 2005/0260911 | A1 | 11/2005 | Ochi et al. |
| 2006/0081330 | A1 | 4/2006 | Minami et al. |
| 2006/0083917 | A1 | 4/2006 | Dugan |
| 2008/0047671 | A1 | 2/2008 | Vandenhende |
| 2008/0160859 | A1 | 7/2008 | Gupta et al. |
| 2011/0183563 | A1 | 7/2011 | Ochi et al. |
| 2012/0135653 | A1* | 5/2012 | Hwang ............... D06N 3/0004 264/168 |
| 2013/0165007 | A1 | 6/2013 | Pourdeyhimi et al. |
| 2015/0184315 | A1 | 7/2015 | Masuda et al. |
| 2017/0298207 | A1 | 10/2017 | Côté |
| 2019/0001281 | A1 | 1/2019 | Heller et al. |
| 2019/0233609 | A1 | 8/2019 | Mäurer et al. |

* cited by examiner

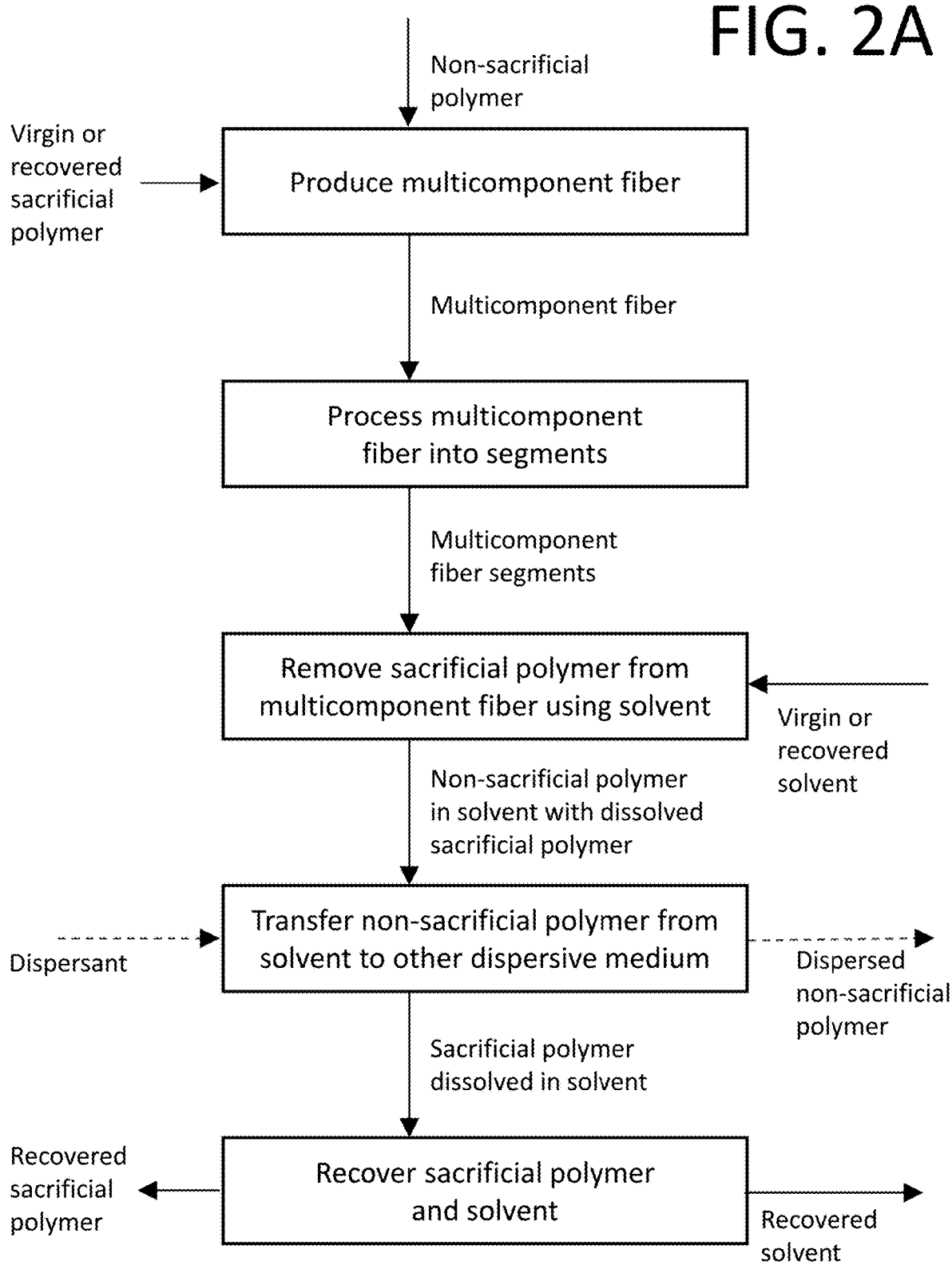

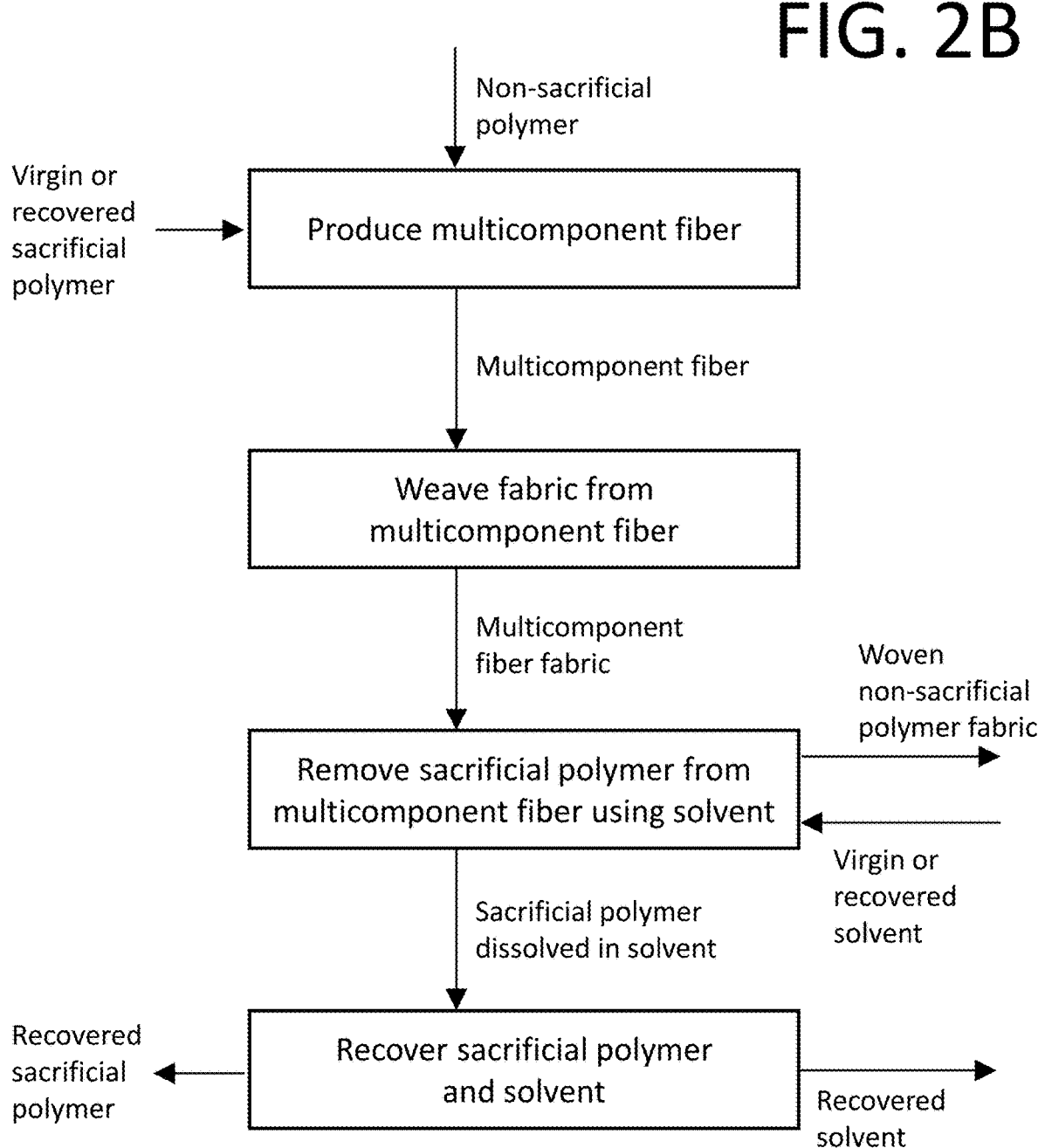

METHODS FOR PRODUCING POLYMER FIBERS AND POLYMER FIBER PRODUCTS FROM MULTICOMPONENT FIBERS

CROSS REFERENCES TO RELATED APPLICATIONS

This application claims the benefit of one or more prior-filed US patent applications: it claims priority from U.S. Provisional Patent Application No. 62/822,521, filed Mar. 22, 2019, which is incorporated herein by reference in its entirety.

BACKGROUND OF THE INVENTION

1. Field of the Invention

The present invention relates to polymer processing and manufacturing, and more specifically to methods for producing polymer fibers and polymer fiber products from multicomponent polymer fibers and recovering materials used in these methods.

2. Description of the Prior Art

It is generally known in the prior art that methods exist for making polymer fibers and polymer fiber products from multicomponent fibers including coatings, webs, papers, mats, and polymer compounds. These fibers and products are used for a variety of purposes including filtration, clothing, cleaning goods, insulation, and others. However, methods for manufacturing polymer fibers and polymer fiber products from multicomponent fibers suffer from low yield, difficulties in processing and handling, prohibitively high manufacturing cost, the production of significant amounts of waste, and limitations in the types of materials which can be produced due to inadequate or slow dissolution, or poor dissolution selectivity.

Prior art patent documents include the following:

U.S. Publication No. 2019/0001281 for grafted islands-in-the-sea nonwoven for high capacity ion exchange bioseparation by inventor Heller, filed Jul. 28, 2016 and published Jan. 3, 2019, is directed to polymer-grafted and functionalized nonwoven membranes adapted for use in bioseparation processes, the membranes including a nonwoven web of polyester fibers having an average fiber diameter of less than about 1.5 microns, each of the plurality of polyester fibers having grafted thereon a plurality of polymer segments constructed of a methacrylate polymer, each polymer segment carrying a functional group adapted for binding to a target molecule. The invention also provides a method of bioseparation comprising passing a solution comprising the target molecule, such as a protein, through the nonwoven membrane of the invention such that at least a portion of the target molecule in the solution binds to the nonwoven membrane. A method for preparing a polymer-grafted and functionalized nonwoven membrane adapted for use in bioseparation processes is also provided.

U.S. Publication No. 2015/0184315 for sea-island composite fiber by inventor Masuda, filed Jan. 20, 2015 and published Jul. 2, 2015, is directed to a sea-island composite fiber including island component fibers having a circumscribed circle diameter of 10 to 1000 nm, a circumscribed circle diameter variation of 1 to 20%, a non-circularity of 1.2 to 5.0, and a non-circularity variation of 1 to 10%.

U.S. Publication No. 2013/0165007 for micro and nanofiber nonwoven spunbonded fabric by inventor Pourdeyhimi, filed Dec. 18, 2012 and published Jun. 27, 2013, is directed to methods for the preparation of nonwoven spunbonded fabrics and various materials prepared using such spunbonded fabrics. The method generally comprises extruding multicomponent fibers having an islands-in-the-sea configuration such that upon removal of the sea component, the island components remain as micro- and nanofibers. The method further comprises mechanically entangling the multicomponent fibers to provide a nonwoven spunbonded fabric exhibiting superior strength and durability without the need for thermal bonding.

U.S. Publication No. 2011/0183563 for polymer alloy fiber, fibrous material, and method for manufacturing polymer alloy fiber by inventor Ochi, filed Apr. 1, 2011 and published Jul. 28, 2011, is directed to a polymer alloy fiber that has an islands-in-sea structure of two or more kinds of organic polymers of different levels of solubility, wherein the island component is made of a low solubility polymer and the sea component is made of a high solubility polymer, while the diameter of the island domains by number average is in a range from 1 to 150 nm, 60% or more of the island domains in area ratio have sizes in a range from 1 to 150 nm in diameter, and the island components are dispersed in a linear configuration. A method for manufacturing the polymer alloy fiber includes melt spinning of a polymer alloy that is made by melt blending of a low solubility polymer and a high solubility polymer.

U.S. Publication No. 2008/0160859 for nonwovens fabrics produced from multicomponent fibers comprising sulfopolyesters by inventor Gupta, filed Jan. 3, 2007 and published Jul. 3, 2008, is directed to a process for making a nonwoven fabric comprising: (A) collecting multicomponent fibers to form a non-woven web; wherein the multicomponent fiber comprises at least one water dispersible sulfopolyester and at least one water non-dispersible polymer; wherein said multicomponent fiber has a plurality of domains comprising the water non-dispersible polymer; wherein the domains are substantially isolated from each other by the water dispersible sulfopolyester intervening between the domains; (B) contacting the non-woven web with water at a sufficient temperature and pressure to remove a portion of the water dispersible sulfopolyester thereby forming a microfiber web; and (C) hydroentangling the microfiber web to produce the nonwoven fabric. A process is also provided wherein steps (B) and (C) are combined. Fibrous articles utilizing the nonwoven fabrics are also provided.

U.S. Publication No. 2006/0083917 for soluble microfilament-generating multicomponent fibers by inventor Dugan, filed Oct. 18, 2004 and published Apr. 20, 2006, is directed to microfilament-generating multicomponent fibers that include a first polymer component and a second polymer component extruded together in separate contiguous polymer segments extending along the length of the fiber. The first polymer component comprises a synthetic melt-processable polymer that is substantially soluble in a first relatively benign solvent selected from water, aqueous caustic solution, and non-halogenated organic solvents. The second polymer component is formed from a second synthetic melt-processable polymer dimensioned to produce one or more microfilaments upon dissolution of the first polymer, and that is substantially soluble in an aqueous solvent selected from water and aqueous caustic solution. The two polymer components are dissolvable in different solvents.

U.S. Publication No. 2006/0081330 for a fine-fibers-dispersed nonwoven fabric, process and apparatus for manufacturing same, and sheet material containing same by inventor Minami, filed Dec. 1, 2005 and published Apr. 20, 2006, is directed to a fine-fibers-dispersed nonwoven fabric comprising dispersed fine fibers having a fiber diameter of 4 μm or less and a fiber length of 3 mm or less, wherein an adhesion rate of substances adhered to the nonwoven fabric is 0.5 mass % or less. Further, a process and an apparatus for manufacturing the fine-fibers-dispersed nonwoven fabric, as well as a sheet material comprising the fine-fibers-dispersed nonwoven fabric are also disclosed.

U.S. Publication No. 2005/0260911 for porous fiber by inventor Takashi, filed Mar. 21, 2005 and published Nov. 24, 2005, is directed to a nanoporous fiber being substantially free from coarse pores and having homogeneously dispersed nanopores, unlike conventional porous fibers. A porous fiber has pores each having a diameter of 100 nm or less, in which the area ratio of pores each having a diameter of 200 nm or more to the total cross section of the fiber is 1.5% or less, and the pores are unconnected pores, or a porous fiber has pores each having a diameter of 100 nm or less, in which the area ratio of pores each having a diameter of 200 nm or more to the total cross section of the fiber is 1.5% or less, the pores are connected pores, and the fiber has a strength of 1.0 cN/dtex or more.

U.S. Publication No. 2001/0029138 for nonwoven fabric containing fine fiber, and a filter material by inventor Toshio, filed May 17, 2001 and published Oct. 11, 2001, is directed to a nonwoven fabric prepared from fibers which are not substantially fibrillated and have a diameter of less than 20 μm, by fusing a fiber web comprising fine fibers having a diameter of 4 μm or less, and adhesive fibers having a diameter ranging from 8 μm to less than 20 μm, wherein a maximum pore size in the nonwoven fabric is not more than twice a mean flow pore size of the nonwoven fabric.

U.S. Pat. No. 8,969,224 for sea-island composite fiber, ultrafine fiber, and composite spinneret by inventor Masuda, filed Jan. 26, 2011 and issued Mar. 3, 2015, is directed to a sea-island composite fiber that has an island component which is ultrafine fibers having a noncircular cross-section, the ultrafine fibers being uniform in the degree of non-circularity and in the diameter of the circumscribed circle. The sea-island composite fiber includes an easily soluble polymer as the sea component and a sparingly soluble polymer as the island component, and the island component has a circumscribed-circle diameter of 10-1,000 nm, a dispersion in circumscribed-circle diameter of 1-20%, a degree of non-circularity of 1.2-5.0, and a dispersion in the degree of non-circularity of 1-10%.

U.S. Pat. No. 8,501,642 for nano-fiber compound solutions, emulsions and gels, production method thereof, nano-fiber synthetic papers, and production method thereof by inventor Naruse, filed Feb. 16, 2005 and issued Aug. 6, 2013, is directed to compound solutions, emulsions and gels excellent in homogeneous dispersibility and long-term dispersion stability and also excellent in the properties as cosmetics, using disarranged nanofibers not limited in either form or polymer, widely applicable and small in the irregularity of single fiber diameter. This invention also provides a method for producing them. Furthermore, this invention provides synthetic papers composed of fibers, small in pore area and uniform in pore size, using disarranged nanofibers, and also provides a method for producing them. This invention provides compound solutions, emulsions, gels and synthetic papers containing disarranged nanofibers of 1 to 500 nm in number average diameter and 60% or more in the sum Pa of single fiber ratios.

U.S. Pat. No. 8,349,232 for micro and nanofiber nonwoven spunbonded fabric by inventor Behnam Pourdeyhimi, filed Mar. 28, 2007 and issued Jan. 8, 2013, is directed to methods for the preparation of nonwoven spunbonded fabrics and various materials prepared using such spunbonded fabrics. The method generally comprises extruding multi-component fibers having an islands-in-the-sea configuration such that upon removal of the sea component, the island components remain as micro- and nanofibers. The method further comprises mechanically entangling the multicomponent fibers to provide a nonwoven spunbonded fabric exhibiting superior strength and durability without the need for thermal bonding.

U.S. Pat. No. 8,138,232 for method for recycling plastic materials and use thereof by inventor Maeurer, filed Jun. 8, 2006 and issued Mar. 20, 2012, is directed to a method for recycling plastic materials which contain at least two polymers, copolymers or blends thereof based on polystyrene. The plastic material is thereby mixed with a solvent for the polymers, copolymers or blends. Subsequently a precipitation is effected by addition of a corresponding precipitant so that then the gelatinous precipitation product can be separated from the further components of the plastic material. The method is used for recycling of any plastic materials, in particular of plastic materials from electronic scrap processing and from shredder light fractions.

U.S. Pat. No. 7,998,887 for nonwoven fabric containing ultra-fine fibers, leather-like sheet, and production methods thereof by inventor Horiguchi, filed Jul. 7, 2004 and issued Aug. 16, 2011, is directed to a nonwoven fabric containing ultra-fine fibers suitable as a leather-like sheet, and also a leather-like sheet with an excellent compactness. A nonwoven fabric containing ultra-fine fibers, characterized in that it contains staple fibers with a fiber fineness of 0.0001 to 0.5 decitex and a fiber length of 10 cm or less, and has a weight per unit area of 100 to 550 g/m$^2$, an apparent density of 0.280 to 0.700 g/cm$^3$, a tensile strength of 70 N/cm or more, and a tear strength of 3 to 50 N.

U.S. Pat. No. 7,981,336 for process of making mixed fibers and nonwoven fabrics by inventor Pourdeyhimi, filed Aug. 1, 2008 and issued Jul. 19, 2011, is directed to the production of a predetermined ratio of multicomponent fibers in combination with monocomponent fibers or other multicomponent fibers, preferably through a spunbonding process. After extrusion, these fibers can produce a fiber network that is subsequently bonded to produce a nonwoven fabric comprising multiple types of fibers. The multicomponent fibers within the network may be processed to remove one component by dissolution or to split the individual components into separate fibers. As a result, the fabric will be comprised of fibers with a range of diameters (micro- or nano-denier fibers as well as higher denier fibers) such that the fibers will not pack as tightly as in a homogeneous nonwoven fabric produced from one type of monocomponent or multicomponent fiber. The present invention additionally relates to methods for producing nonwoven fabrics with increased loft, breathability, strength, compressive properties, and filtration efficiency.

U.S. Pat. No. 7,910,207 for islands-in-sea type composite fiber and process for producing same by inventor Kamiyama, filed Oct. 9, 2009 and issued Mar. 22, 2011, is directed to an islands-in-sea type composite fiber comprising a sea part containing an easily soluble polymer and 100 or more island parts containing a hardly soluble polymer, per fiber. In a cross-sectional profile of the composite fiber, each of the island parts has a thickness in the range of from 10 to 1,000 nm and the intervals between the island parts adjacent to each other are 500 nm or less. The islands-in-sea type composite fiber is produced by melt spinning the sea part polymer and the island part polymer mentioned above through a spinneret for an islands-in-sea type composite fiber and taking up the spun fiber at a speed of 400 to 6,000 m/min. Dissolution and removal of the sea part polymer from the composite fiber gives a group of fine fibers having a thickness of 10 to 1,000 rim and useful for clothing, industrial materials and other applications.

U.S. Pat. No. 7,666,504 for nanoporous fiber with unconnected pores for improved adsorptivity by inventor Ochi, filed Jul. 20, 2006 and issued Feb. 23, 2010, is directed to a nanoporous fiber being substantially free from coarse pores and having homogeneously dispersed nanopores, unlike conventional porous fibers. A porous fiber has pores each having a diameter of 100 nm or less, in which the area ratio of pores each having a diameter of 200 nm or more to the total cross section of the fiber is 1.5% or less, and the pores are unconnected pores, or a porous fiber has pores each having a diameter of 100 nm or less, in which the area ratio of pores each having a diameter of 200 nm or more to the total cross section of the fiber is 1.5% or less, the pores are connected pores, and the fiber has a strength of 1.0 cN/dtex or more.

U.S. Pat. No. 7,585,795 for sheet and interior material by inventor Yakake, filed Mar. 29, 2005 and issued Sep. 8, 2009, is directed to: a sheet comprising a non-woven fabric in which ultra-fine fibers of a single fiber thickness of 0.5 dtex or less are entangled and an elastomeric binder mainly composed of a polyurethane.

U.S. Pat. No. 7,431,869 for methods of forming ultra-fine fibers and non-woven webs by inventor Haggard, filed Jun. 4, 2004 and issued Oct. 7, 2008, is directed to a nonwoven web product including ultra-fine fibers that is formed utilizing a spunbond apparatus that forms multicomponent fibers by delivering first and second polymer components in a molten state from a spin pack to a spinneret, extruding multicomponent fibers including the first and second polymer components from the spinneret, attenuating the mulicomponent fibers in an aspirator, laying down the multicomponent fibers on an elongated forming surface disposed downstream from the aspirator to form a nonwoven web, and bonding portions of at least some of the fibers in the nonwoven web together to form a bonded, nonwoven web product. The multicomponent fibers can include separable segments such as islands-in-the-sea fibers, where certain separated segments become the ultra-fine fibers in the web product. In addition, carbon tubular fibers can be formed by extruding island-in-the-sea fibers including polyacrylonitrile or pitch sheath segments in the fibers, separating the segments of the fiber, and converting the polyacrylonitrile of pitch to carbon by a carbonization process.

U.S. Pat. No. 6,861,142 for controlling the dissolution of dissolvable polymer components in plural component fibers by inventor Wilkie, filed Jun. 6, 2003 and issued Mar. 1, 2005, is directed to the dissolution of dissolvable components in plural component polymer fibers that is achieved by providing a polymer fiber including at least two sections, where at least one fiber section includes a dissolvable component. The rate at which at least part of the fiber dissolves is controlled by at least one of a fiber section having a non-round cross-sectional geometry, and at least two fiber sections including two different dissolvable components. In an exemplary embodiment, island-in-the-sea fibers are formed with non-round and elongated cross-sectional geometries. In another embodiment, sheath-core fibers are formed in which the sheath and core include different dissolvable components.

U.S. Pat. No. 6,767,853 for fibrous substrate for artificial leather and artificial leather using the same by inventor Nakayama, filed Jul. 3, 2000 and issued Jul. 27, 2004, is directed to a fibrous substrate for artificial leather, containing microfine fiber bundles, each of which is composed of 3-50 microfine fibers (A) containing an elastic polymer and having an average fineness of 0.5 denier or less and 15 or more microfine fibers (B) containing a non-elastic polymer and having an average fineness of 0.2 denier or less. The microfine fiber bundles satisfy the following conditions (1)-(3): (1) the ratio of the number of strands of the A to the number of strands of the B in cross sections of the bundles (A/B) is ⅕ or less, (2) the ratio of the weight of the A to the weight of the B in the bundles (A/B) is 10/90-60/40, and (3) the microfine fibers (B) containing the non-elastic polymer encircle each of the microfine fibers (A) comprising the elastic polymer.

U.S. Pat. No. 6,583,075 for dissociable multicomponent fibers containing a polyacrylonitrile polymer component by inventor Dugan, filed Dec. 8, 1999 and issued Jun. 24, 2003, is directed to melt processable multicomponent fibers in which at least one component includes a polyacrylonitrile polymer and at least one component includes a fugitive polymer. The melt processable multicomponent fibers of the present invention may be separated into microfilaments formed entirely of polyacrylonitrile, suitable for the production of carbon and graphite fibers. The fibers of the present invention may be used in a variety of applications, including composites and filtration media.

U.S. Pat. No. 4,206,257 for napped sheet material bearing the characteristics of a suede-leather and method of producing the same by inventor Fukushima, filed Nov. 16, 1978 and issued Jun. 3, 1980, is directed to a suede-like sheet material closely resembling natural leathers in feel and nap is produced by temporarily fixing a fibrous mat consisting of "oceano-insular" composite fibers, impregnating said fibrous mat with elastomer (A), smoothing the surface, impregnating the resulting mat with another elastomer (B) which is harder and less swellable than said elastomer (A), removing the sea or matrix component of the composite fiber, and napping the surface of the resulting sheet material.

U.S. Pat. No. 9,284,431 for method for recycling floor coverings by inventor Hohner, filed Jan. 24, 2012, is directed to a solvent-based separation method for the total material recycling of materials used in nonwoven, woven, and tufted wares into the individual material components thereof sorted by type. At least one of the materials contains a polyolefin wax. As a solvent and/or swelling agent, halogen-free, aliphatic hydrocarbons or aromatic hydrocarbons or a mixture of one or several of said solvents are used.

U.S. Publication No. 2008/0047671 for process for the recovery of a polymer in solution by inventor Vandenhende, filed Apr. 7, 2005 and published Feb. 28, 2008, is directed to a process for the recovery of a polymer in solution in a solvent, the combined material forming a homogeneous medium, according to which: a) a nonsolvent is added to the homogeneous medium so as to render it heterogeneous; b) the heterogeneous medium is subjected to shearing and to a supply of thermal energy sufficient to evaporate the solvent and nonsolvent and to provide polymer particles; c) the polymer particles are recovered.

U.S. Publication No. 2003/0191202 for method for separating and recovering target polymers and their additives from a material containing polymers by inventor Maurer, filed May 22, 2003 and published Oct. 9, 2003, is directed to a method for separating target polymers and their additives from a material containing polymers, as a result of which the recovery both of the target polymers and of the additives is made possible. Based on the principle of a selective precipitation, the target polymer is precipitated and subsequently separated from the additives present in solution and dissolved foreign polymers. The separation of the additives from the solution is effected in a further step.

U.S. Pat. No. 5,198,471 for polymer recycling by selective dissolution by inventor Nauman, filed Sep. 11, 1989 and issued Mar. 30, 1993, is directed to a method for separating polymers from a physically commingled solid mixture containing a plurality of polymers comprises dissolving a first one of the polymers in a solvent at a first lower temperature to form a first preferably single phase solution and a remaining solid component. The solid component contains additional polymers which are not soluble to the solvent at the first temperature but which may be soluble at higher temperatures. The method includes subsequently heating the solvent to dissolve additional polymer from the solid component to form subsequent solutions. The polymers are then separated from their respective solution either using flash evaporation techniques when more than one polymer has been dissolved at a single temperature, or conventional techniques for extracting a polymer from a solvent in a solution.

U.S. Publication No. 2017/0298207 for processes for recycling polystyrene waste by inventor Cote, filed Mar. 30, 2017 and published Oct. 19, 2017, is directed to recycled polystyrene polymers having a melt flow index of less than about 25 g/10 min. There are provided processes for recycling polystyrene waste. The processes can comprise dissolving said polystyrene waste in p-cymene under conditions to obtain a polystyrene/p-cymene mixture, adding the polystyrene/p-cymene mixture to a hydrocarbon polystyrene non-solvent under conditions to obtain precipitated polystyrene and washing the precipitated polystyrene with additional portions of hydrocarbon polystyrene non-solvent under conditions to obtain twice-washed polystyrene. The twice-washed polystyrene can optionally be dried and formed into polystyrene pellets. There is also provided recycled polystyrene obtained from such processes for recycling polystyrene waste.

U.S. Pat. No. 9,605,126 for ultrafiltration process for the recovery of concentrated sulfopolyester dispersion by inventor Parker, filed Dec. 17, 2013 and issued Jun. 18, 2015, is directed to a process for recovering a concentrated sulfopolyester dispersion comprising routing an aqueous dispersion comprising a water-dispersible sulfopolyester to a sulfopolyester concentration zone to remove water from the aqueous dispersion to produce the concentrated sulfopolyester dispersion and a recovered water stream; wherein the sulfopolyester concentration zone comprises at least one ultrafiltration membrane.

U.S. Publication No. 2019/0233609 for method for recycling polyolefin waste by inventor Maurer, filed Sep. 13, 2017 and published Aug. 1, 2019, is directed to a method for recycling polyolefin containing waste by using a solvent with a specific Hansen parameter and contacting this mixture with a liquid filtration aid before separating the polyolefin from the mixture. The method comprises the following steps: Mixing the polyolefin containing waste with a solvent having a Hansen parameter δH from 0.0 to 3.0 M Pa1/2; Contacting this mixture with a liquid filtration aid having a Hansen parameter δH>4.0 M Pa1/2; and Separating the polyolefin from the mixture.

WIPO Publication No. WO2015/000681 for method for increasing the concentration of at least one polymer from a polymer-containing waste material and polymer recyclate by inventor Maurer, filed Jun. 16, 2014 and published Jan. 8, 2015, is directed to a solvent-based plastics-recycling method which can reclaim polymers from polymer-containing plastics waste materials. The method is based on the use of a solvent which has been doped with heat stabilizer and which takes the form of solid-liquid extraction process to extract polymers at temperatures above 70° C. from the plastics waste material. The method proposed can provide polymer recyclates which have improved mechanical properties in comparison with conventional recycled polymers. The use of at least one heat stabilizer in at least one organic solvent is also proposed for the solvent-based isolation of at least one polymer from a polymer-containing waste material.

WIPO Publication No. 2018/069205 for recycled polymer composition by inventor Harjanto, et al., filed Oct. 9, 2017 and published Apr. 19, 2018, is directed to a homogeneous recycled polyolefin comprising polyethylene and polypropylene, characterised in that it comprises: a) from 1 to 10,000 ppm of soluble impurities; b) from 0.001 to 5 wt % of insoluble impurities, which are particulates having a maximum dimension of from 20 microns to 1 mm, by total weight of the recycled polyolefin; c) from 0.0005 to 1% (5 to 10,000 ppm) of solvent having a Hansen parameter δH from 0 to 3; and d) from 0.1 ppm to 10,000 ppm of a filtration aid having a Hansen parameter δH>10; which may be obtained from a method comprising the steps of:—a) mixing polyolefin-containing waste with a solvent having a Hansen parameter δH from 0 to 3; b) contacting this mixture with a filtration aid having a Hansen parameter δH of greater than 10; and c) separating the polyolefin from the mixture.

EPO Patent No. EP0894818 for process for recycling soluble polymers or polymer blends from plastic containing materials by inventor Luck, et al., filed Jul. 28, 1998 and issued Mar. 2, 2005, is directed to a process for recycling soluble polymers or polymer mixtures from materials containing plastic with the following features: the target polymer or polymer mixture is selectively dissolved out of the material containing plastic; the unwanted insoluble and/or unwanted soluble constituents are separated from the resulting solution; with the aid of a precipitant the target polymer or polymer mixture is selectively precipitated out of the resulting polymer solution by turbulent agitation in a precipitator and in the presence of a gas or gas mixture, wherein the polymer solution and the gas or gas mixture are fed into the precipitator through one or more nozzles, and wherein the selective precipitation of the target polymer or polymer mixture is conducted at temperatures, which lie below the boiling points of the solvent and the precipitant at the pressure prevailing in the precipitator; the precipitated target polymer or polymer mixture is separated from the liquid phase; and the target polymer or polymer mixture is dried, if necessary.

SUMMARY OF THE INVENTION

The present invention is generally directed to methods for producing polymer fibers and polymer fiber products and to materials recovery from these processes. Specifically, the present invention includes a non-generic arrangement of steps for producing polymer fibers and/or polymer fiber products from multicomponent fiber using selective dissolution of sacrificial polymers and for recovering the sacrificial polymer and solvent for subsequent use. Other processing steps for producing polymer fiber, nonwoven polymer fiber products, or woven polymer fiber products are included in variations of this method. Compared to the prior art, the present invention provides the field of polymer fiber product manufacturing with the benefits of higher-quality material, lower cost, more diverse materials, reduced environmental impact, and reduced waste. The present invention achieves this outcome by modifying techniques conventionally employed in polymer recycling for use in manufacturing processes for polymer fibers.

In one embodiment, the present invention includes a method for separating fibers from a multicomponent fiber including at least one sacrificial polymer and at least one non-sacrificial fiber, comprising the steps of exposing the multicomponent fiber to at least one swelling agent or at least one solvent operable to selectively dissolve the at least one sacrificial polymer, upon dissolution of the at least one sacrificial polymer, separating and recovering the at least one non-sacrificial fiber from the at least one solvent and the at least one dissolved sacrificial polymer, separating the at least one dissolved sacrificial polymer from the at least one swelling agent or the at least one solvent, upon separation of the at least one separated sacrificial polymer, washing, washing and drying, or drying the at least one separated sacrificial polymer, wherein the at least one separated sacrificial polymer is recovered as macromolecules and is therefore operable to be recycled and re-spun, recovering greater than about 90% of the at least one swelling agent or the at least one solvent, wherein the at least one recovered swelling agent or the at least one recovered solvent is operable to be reused to dissolve the at least one separated sacrificial polymer in a second multicomponent fiber, producing the second multicomponent fiber from the at least one separated sacrificial polymer and at least one second non-sacrificial fiber, exposing the second multicomponent fiber to the at least one swelling agent or the at least one solvent operable to selectively dissolve the at least one separated sacrificial polymer to dissolve the at least one separated sacrificial polymer, upon dissolution of the at least one separated sacrificial polymer, separating and recovering the at least one second non-sacrificial fiber from the at least one swelling agent or the at least one solvent and the at least one dissolved sacrificial polymer, separating the at least one separated sacrificial polymer from the at least one swelling agent or the at least one solvent, upon separation of the at least one separated sacrificial polymer, washing, washing and drying, or drying the at least one separated sacrificial polymer, wherein the at least one separated sacrificial polymer is recovered as macromolecules and is therefore operable to be further recycled and re-spun, and recovering greater than about 90% of the at least one recovered swelling agent or the at least one recovered solvent, wherein the at least one recovered swelling agent is operable to be reused to dissolve the at least one separated sacrificial polymer, thereby recycling the at least one separated sacrificial polymer and the at least one recovered swelling agent or the at least one recovered solvent.

In another embodiment, the present invention includes a method for separating fibers from a multicomponent fiber including at least one sacrificial polymer and at least one non-sacrificial fiber, comprising the steps of exposing the multicomponent fiber to at least one solvent or swelling agent operable to selectively dissolve the at least one sacrificial polymer, upon dissolution of the at least one sacrificial polymer, separating and recovering the at least one non-sacrificial fiber from the at least one solvent or swelling agent and the at least one dissolved sacrificial polymer, separating and recovering the at least one dissolved sacrificial polymer from the at least one solvent or swelling agent, upon separation of the at least one dissolved sacrificial polymer, washing, washing and drying, or drying the at least one recovered sacrificial polymer, recovering the at least one solvent or swelling agent, wherein the at least one recovered solvent or swelling agent is operable to be reused to dissolve the at least one recovered sacrificial polymer in a second multicomponent fiber, producing the second multicomponent fiber from the at least one recovered sacrificial polymer and at least one second non-sacrificial fiber, exposing the second multicomponent fiber to the at least one solvent or swelling agent operable to selectively dissolve the at least one recovered sacrificial polymer to dissolve the at least one recovered sacrificial polymer, upon dissolution of the at least one recovered sacrificial polymer, separating and recovering the at least one second non-sacrificial fiber from the at least one solvent or swelling agent and the at least one dissolved sacrificial polymer, separating and recovering the at least one recovered sacrificial polymer from the at least one recovered solvent or swelling agent the at least one recovered sacrificial polymer, upon separation of the at least one recovered sacrificial polymer, washing, washing and drying, or drying the at least one recovered sacrificial polymer, and recovering the at least one recovered solvent or swelling agent, wherein the at least one recovered solvent is operable to be reused to dissolve the at least one recovered sacrificial polymer, thereby recycling the at least one recovered sacrificial polymer and the at least one recovered solvent or swelling agent.

In yet another embodiment, the present invention includes a method for recycling at least one sacrificial polymer and at least one solvent or at least one swelling agent when separating at least one target polymer from a multicomponent fiber made up of at least one sacrificial polymer and the at least one target polymer, comprising the steps of contacting the at least one multicomponent fiber with the at least one solvent or the at least one swelling agent to separate the at least one target polymer from the at least one solvent or the at least one swelling agent and the at least one sacrificial polymer, recovering, washing, washing and drying, or drying the at least one target polymer, separating and recovering the at least one sacrificial polymer from the at least one solvent or the at least one swelling agent, upon separation of the at least one recovered sacrificial polymer, removing, washing, washing and drying, or drying the at least one recovered sacrificial polymer, wherein the at least one recovered sacrificial polymer is of the same purity as a virgin polymer of the same chemical composition and is therefore operable to be recycled and re-spun, and recovering the at least one solvent or the at least one swelling agent, wherein the at least one recovered solvent or the at least one recovered swelling agent is operable to be reused to dissolve the at least one recovered sacrificial polymer in a second multicomponent fiber, thereby recycling the at least one recovered sacrificial polymer and the at least one recovered solvent or the at least one recovered swelling agent.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2A shows a process flow diagram illustrating the steps of one embodiment of the methods in the invention for producing polymer fibers and polymer fiber products and recovering materials used in these methods.

FIG. 2B shows a process flow diagram illustrating the steps of one embodiment of the methods in the invention for producing woven polymer fiber products and recovering materials used in these methods.

DETAILED DESCRIPTION

Figure 1A:
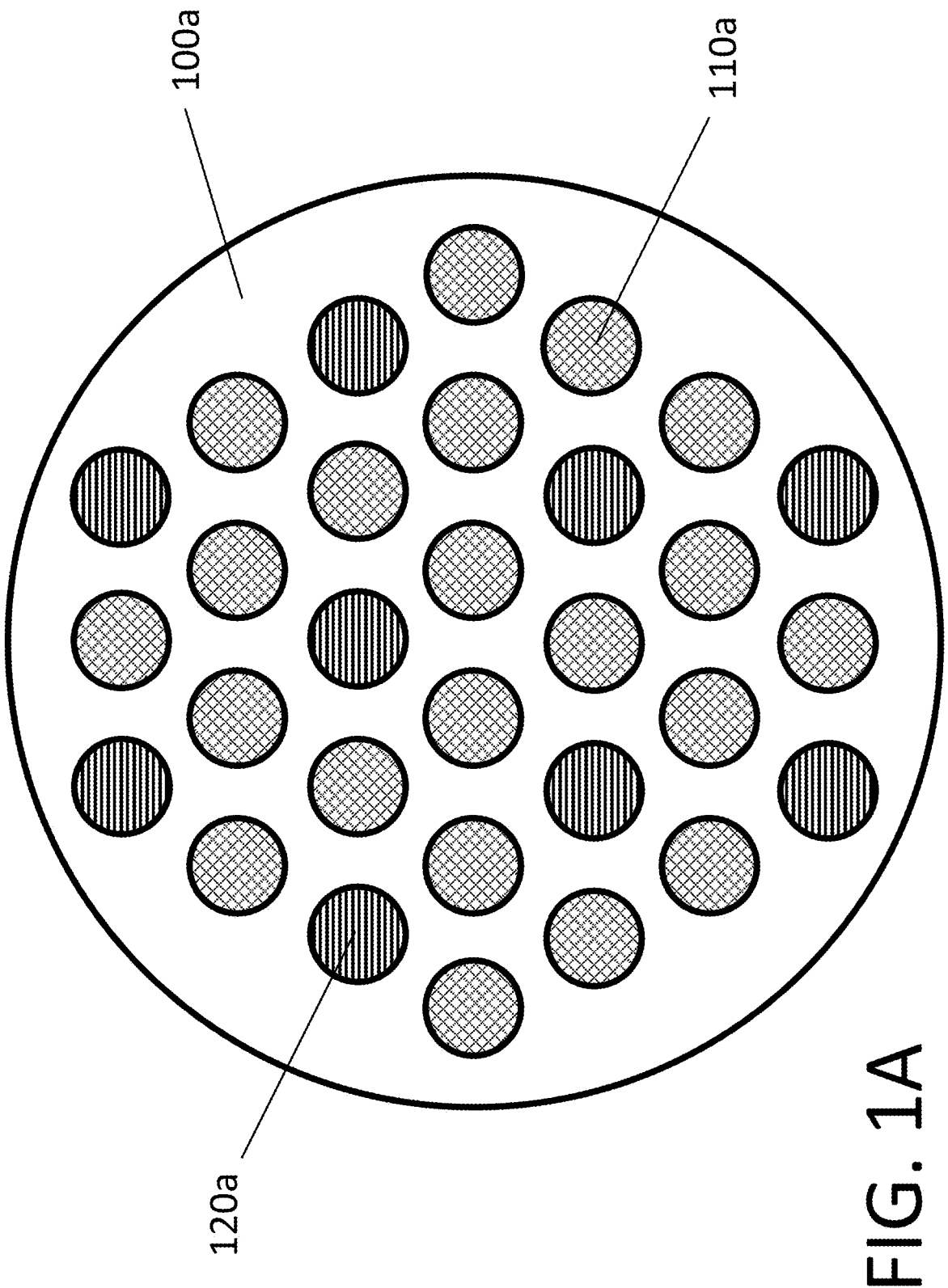
FIG. 1A illustrates a cross-section view of an exemplary multicomponent fiber with an islands-in-sea-configuration.

The present invention is generally directed to methods for producing polymer fibers and polymer fiber products and to materials recovery from these processes. Specifically, the present invention includes a non-generic arrangement of steps for producing polymer fibers and/or polymer fiber products from multicomponent fiber using dissolution of sacrificial polymer and for recovering the sacrificial polymer and solvent for subsequent use. Other processing steps for producing polymer fiber, nonwoven polymer fiber products, or woven polymer fiber products are included in variations of this method. Compared to the prior art, the present invention provides the field of polymer fiber product manufacturing with the benefits of higher-quality material, lower cost, more diverse materials, reduced waste, and reduced environmental impact. The present invention achieves this outcome by modifying techniques conventionally employed in polymer recycling for use in manufacturing processes for polymer fibers.

In one embodiment, the present invention includes a method for producing polymer fibers and polymer fiber products comprising the steps of removing the sacrificial polymer components from the multicomponent fiber using solvent, and collecting the non-sacrificial polymer components of the multicomponent fiber. In some embodiments, the method includes processing the dissolved sacrificial polymer and solvent such that the sacrificial polymer and/or solvent are suitable for subsequent use. In another embodiment, the method includes first processing the multicomponent fiber into discontinuous segments before removing the sacrificial polymer components from the multicomponent fiber using solvent. In another embodiment, the method includes processing the collected non-sacrificial polymer fibers into a product. In another embodiment, the method includes recycling the recovered sacrificial polymer into the polymer fiber product manufacturing process. In yet another embodiment, the method includes recycling the recovered solvent into the polymer fiber product manufacturing process.

Alternatively, in one embodiment, the present invention includes a method for producing woven fiber products comprising the steps of producing a woven product from multicomponent fiber and removing the sacrificial polymer components from the multicomponent fiber using solvent to obtain a product including the non-sacrificial polymer components. In some embodiments, the method includes processing the dissolved sacrificial polymer and solvent such that the sacrificial polymer and/or solvent are suitable for subsequent use. In another embodiment, the method includes recycling the recovered polymer into the polymer fiber product manufacturing process. In yet another embodiment, the method includes recycling the recovered solvent into the polymer fiber product manufacturing process.

Alternatively, in another embodiment, the present invention includes a method for producing nonwoven fiber products comprising the steps of producing a nonwoven product from multicomponent fiber and removing the sacrificial polymer components from the multicomponent fiber using solvent to obtain a product including the non-sacrificial fiber components. In another embodiment, the nonwoven product is produced from continuous multicomponent fiber. In another embodiment, the multicomponent fiber is processed into discontinuous segments before being processed into a product. In yet another embodiment, the method for making the nonwoven product and removing the sacrificial polymer components of the multicomponent fiber includes the steps of producing a nonwoven fiber product from discontinuous or continuous multicomponent fibers. In some embodiments, the method includes processing the dissolved sacrificial polymer and solvent such that the sacrificial polymer and/or solvent are suitable for subsequent use. In another embodiment, the method includes recycling the recovered polymer into the polymer fiber product manufacturing process. In another embodiment, the method includes recycling the recovered solvent into the polymer fiber product manufacturing process.

None of the prior art discloses methods for manufacturing polymer fibers and/or polymer fiber products from multicomponent fiber using removal of sacrificial polymer components that include recovering the sacrificial polymer and/or solvent and customized sacrificial polymer components with the degree of customization of sacrificial polymers and non-sacrificial polymers as provided by the present invention. Furthermore, the present invention provides higher quality polymer fibers and/or polymer fiber products at a lower cost with reduced waste and reduced environmental impact compared to the prior art.

Polymer fibers are used in products including coatings, webs, papers, mats, and fabrics for applications such as clothing, cleaning goods, insulation, filtration, etc. Often, the production process for these items begins with the production of a multicomponent fiber. The multicomponent fiber is often produced by melt-spinning or melt-extruding more than one thermoplastic material into a fiber such that within the fiber one or more sacrificial polymer materials separate one or more non-sacrificial polymer materials. Subsequently, a substance or treatment method is used to dissolve the sacrificial polymer components of the multicomponent fiber while the non-sacrificial polymer components of the multicomponent fiber remain.

However, methods for manufacturing polymer fibers and polymer fiber products using this dissolution process often suffer from low quality, low yield, high manufacturing cost, manufacturing processing difficulties, and limitations in the materials which can be produced due to inadequate or slow dissolution or poor dissolution selectivity. Furthermore, these methods frequently produce significant amounts of waste. For example, polylactic acid (PLA), polyvinyl alcohol, sulfopolyesters, and copolyesters have traditionally been used as sacrificial polymers. However, PLA is expensive, is difficult to fully dissolve, and is hard to recover in high-quality form. Polyvinyl alcohol is expensive and requires special fiber spinning equipment. Sulfopolyesters and copolyesters are often similar to the non-sacrificial polymer chemistry. In this case, when the sacrificial polymer component is dissolved the non-sacrificial polymer components may be damaged, thereby lowering product quality and reducing product yield, or some of the sacrificial polymer component remains on the non-sacrificial polymer component, contaminating the resulting product or causing downstream processing and/or quality issues. Similarly, incomplete dissolution, poor non-sacrificial fiber formation, and/or slow release of the non-sacrificial polymer component occurs in some cases when using PLA or copolyesters as the sacrificial polymer component, particularly for complex fiber cross-sectional geometries, because the chemistries of the sacrificial polymer and non-sacrificial polymer components are similar. The consumption of sacrificial polymer and solvent to remove the sacrificial polymer adds to the cost of the polymer fiber product manufacturing process, and the consumption of sacrificial polymer has a high environmental impact due to plastic waste generation and the use of fossil fuels in the polymer synthesis process. Thus, there is a strong need, which the present invention addresses, for novel methods of polymer fiber product manufacturing that enable the use of a greater variety of materials, result in higher quality products, and lower production costs.

Notably, in a different field of endeavor, existing methods of waste polymer recycling are not cost effective or are unable to effectively or efficiently process many plastics into high-quality, reusable form. Polymers are used in a variety of applications like single-use packaging, electronic equipment, and many others. Once discarded, these materials take up significant space in landfills and represent a large source of pollution, as many polymers do not break down in the environment. For example, it is estimated that by 2050 there will be more plastic than fish in the world's oceans. Furthermore, plastics are made from hydrocarbons using energy-intensive processes and thus represent a valuable resource even after their initial purpose is complete. Unilever has committed to using 100% recyclable, reusable, or compostable packaging by 2025, underscoring the importance of reusing polymer materials for economic and environmental reasons. Unfortunately, existing methods for recovery, reuse, and/or recycling of polymer materials suffer from high cost. These processes include re-extrusion, solvolysis, chemical recycling, and pyrolysis. The traditional "shred, compress, re-extrude" process does not work well for unsorted polymer mixes, polymers with additives, or polymer waste streams with impurities. Part of the challenge is that reuse of polymers is impossible unless additives, such as flame retardants and plasticizers, are removed. However, these additives thermally degrade during reprocessing in some cases and/or remain as dangerous impurities when repurposing the recycled polymer.

The Fraunhofer Institute for Process Engineering and Packaging IVV have developed processes for recycling polymer waste using CreaCycle GMBH's CREASOLV® products which address some problems with existing methods. These processes allow pure plastics to be recovered from waste by exploiting differences in the specific solubility of polymers using solvents and precipitants preferably presenting lowest risks to users and the environment. An example of this process is described in U.S. Publication No. 2019/0233609, published Aug. 1, 2019, which is hereby incorporated by reference in its entirety. The process generally involves the steps of (1) dissolution by sorting, shredding, and dissolving the target polymer and certain impurities in solvent, (2) cleaning the solution by separating insoluble impurities, (3) targeted precipitation by changing conditions of the solution, (4) recovering the polymer, and (5) distilling the solution in order to recycle the solvent and collect the remaining insoluble impurities. Alternatively, materials are separated via solvent evaporation, temperature change, and/or the addition of a precipitant. Polystyvert Inc., has developed a similar process for recycling polystyrene waste. An example of this process is described in U.S. Publication No. 2017/0298207, filed Mar. 30, 2017 and published Oct. 19, 2017, and WIPO Publication No. WO2019/095078, both of which are hereby incorporated by reference in its entirety. This method involves (1) dissolving polystyrene waste in p-cymene, (2) filtering undissolved contaminants, (3) adding precipitant such as n-heptane to the solution to cause separation of the polystyrene, (4) washing the precipitated polystyrene, (5) drying and pelletizing the cleaned polystyrene, and (6) recovering the p-cymene solvent. Another example of a polymer recycling process utilizing a solvent is described in U.S. Pat. No. 10,435,532, issued Oct. 8, 2019, which is hereby incorporated by reference in its entirety. Another example of a similar process of recycling polyolefins is described in WIPO Publication No. WO2018/069205, published Apr. 19, 2018, which is hereby incorporated by reference in its entirety. Advantageously, these processes maintain the polymer structures and their specific properties, recovering the polymers as macromolecules or as polymer chains longer than monomers, as opposed to breaking the polymers down into their monomers or degrading the polymer chain, as does traditional chemical recycling, allowing the polymers to be re-used and replace virgin plastics. What is needed is a manufacturing process which enables production of polymer fiber from more diverse materials, improves product quality, lowers manufacturing cost, and minimizes waste.

Referring now to the drawings in general, the illustrations are for the purpose of describing one or more preferred embodiments of the invention and are not intended to limit the invention thereto.

The present invention provides a method of producing polymer fiber and polymer fiber products including dissolution of one or more sacrificial polymer components of multicomponent fibers. Generally, the present invention includes the steps of dissolving one or more sacrificial components of a multicomponent fiber, separating the solvent including the sacrificial polymer components from the non-sacrificial polymer components of the multicomponent fiber, precipitating the sacrificial polymer components, collecting the sacrificial polymer components, and distilling the solvent such that soluble impurities are removed and the solvent is suitable for subsequent use. The present invention also includes steps for making polymer fiber products before or after the sacrificial polymer dissolution step. In the present invention, the solvent is tuned to selectively and effectively target only the sacrificial polymer. Conversely, the sacrificial polymer is operable to be tuned to be selectively and effectively targeted by the solvent. The benefits of this process are numerous, and include controlled sacrificial polymer dissolution, high-integrity non-sacrificial polymer fibers, high-quality non-sacrificial polymer products, lower costs, and a greater diversity of materials which are viable for use as sacrificial and/or non-sacrificial polymers. The high selectivity of the solvent formulations and gentleness of the process causes more complete dissolution of the sacrificial polymer component, high quality recovery of the sacrificial polymer component, and less damage to the non-sacrificial polymer component, resulting in higher product yield and a higher-quality end product. For example, PLA and other bioplastics are dissolved more effectively using the present invention than in conventional systems. The resulting non-sacrificial polymer fibers, recovered PLA, and recovered solvent are higher quality than previously possible and the yield of PLA recovered is higher than from conventional methods (Hiebe, M. (2019). PLA in the Waste Stream Results Summary. |Ivv.fraunhofer.de|Retrieved Mar. 21, 2019, from https://www.ivv.fraunhofer.de/content/dam/ivv/en/documents/info/Projectresults-summary-PLA-waste.pdf). An example of this process is described in D.E. Publication No. 102013210110, published Dec. 4, 2014, which is hereby incorporated by reference in its entirety. The highly controllable dissolution enabled by the present invention also allows a portion of the sacrificial polymer to be left on the non-sacrificial polymer in some applications. This configuration assists in subsequent fiber dispersion or suspension, end-product binding, or imparts desired properties to the fiber or end product, including, but not limited to, density modification, liquid or moisture wicking ability, hydrophilicity, hydrophobicity, oleophilicity, and/or oleophobicity. Methods for controlling the fraction of sacrificial polymer remaining after solvent processing include, but are not limited to, tailoring the solvent composition, processing temperature, and/or processing time. Preferably, in embodiments where a portion of the sacrificial polymer is not completely removed during solvent processing, the amount of sacrificial polymer remaining is between approximately 0% and 50% by weight or by volume of the initial amount in the multicomponent fiber. Also preferably, the amount of sacrificial polymer remaining is between 0% and 1% by weight or by volume of the initial amount in the multicomponent fiber. For example, polyethylene (PE), or modified PE, is a sacrificial polymer which, when a portion remains undissolved, assists in binding of the non-sacrificial polymer during subsequent processing. The choice of sacrificial component influences these properties and the present invention facilitates the use of a wider variety of materials as the sacrificial component.

Several other benefits result from enabling the use of new materials as sacrificial or non-sacrificial components. In some applications, costs are lowered by including materials which were previously challenging to use. For example, polyolefins are low-cost polymers that are typically used in multicomponent fibers for their desirable melting and/or binding properties. However, despite their stability and ability to form multicomponent fibers with a broad range of other polymers, they have not commonly been used as the sacrificial component of multicomponent fiber because of the high cost of solvents, high risk of solvents associated with, inadequate or slow dissolution, and/or poor dissolution selectivity. However, effective polymer recycling solvent formulations have recently been developed for polystyrene, PLA and other polyesters, polyamides, polycarbonates, and polyolefins such as polypropylene and polyethylene, thus facilitating their use as reusable and therefore economical sacrificial polymer components of multicomponent fibers. Polystyrene and polystyrene copolymers are, however, unlikely to be used as a sacrificial polymer due to potential processing issues. In one embodiment, polystyrene is the sacrificial polymer and the at least one solvent used is a ketone, ether, cycloalkane, ester, in particular acetone, methyl ethyl ketone, tetrahydrofuran, dialkyl esters of dicarboxylic acids, or fatty acid alkyl esters, and the at least one precipitant is water or an alcohol, in particular methanol, ethanol, isopropanol, n-propanol and butanol, or mixtures thereof. Another benefit of enabling the use of new materials is the ability to tailor components to a particular process. For example, sacrificial polymer selection is critical in processes where the fiber is in direct contact with the processing equipment, such as weaving, needle punching, or hydroentangling. Specifically, PLA is used in weaving processes, but is brittle and susceptible to cracking (Nodo, K., Leong, Y. W., and Hamada, H. (2012), Effect of knitted and woven textile structures on the mechanical performance of poly (lactic acid) textile insert injection-compression moldings. J. Appl. Polym. Sci., 125: E200-E207. doi:10.1002/app.34369), and some polymers used in weaving processes are difficult to handle and process because the fibers tend to stick together (Walker, C. (2019, Jan. 15). ZTE Helps Eastman Develop Unique Fibers|Wilson College News|NC State University. Retrieved Mar. 21, 2019, from https://textiles.ncsu.edu/news/2018/12/zte-helps-eastman-develop-unique-fibers/). Instead, the present invention facilitates the use of easily weavable materials, including, but not limited to, some types of polyolefins, in multicomponent fibers, thus easing the use of multicomponent fibers in woven articles removing the need to modify existing weaving processes. The wider variety of materials available for sacrificial components also benefits spunlace/hydroentanglement processes in other ways. Properties including, but not limited to, hydrophilicity, water insolubility, and/or modulus, vary depending on the material used as the sacrificial component, and manipulating these properties by appropriate choice of material allows high throughput, high-quality end-products, and a high degree of entanglement For example, static is a common issue in polymer processing, and in one embodiment of the present invention, a sacrificial polymer is chosen because it will prevent static issues during processing.

Finally, the high quality of the output products in the present invention has numerous benefits, including lowering costs. In some embodiments, insoluble contaminants and additives are separated from the sacrificial polymer and solvent before precipitation of the sacrificial polymer using filtration, such as with a filtration aid, or other suitable method. In some embodiments, soluble contaminants and additives are separated from the sacrificial polymer and solvent after precipitation of the sacrificial polymer using distillation or other suitable solvent recovery method. In some embodiments, the recovered materials have similar properties to the virgin materials. Thus, in some embodiments, the recovered sacrificial polymer and/or solvent are suitable for subsequent use in the original, or another, application. Resale of these high-quality materials allows for partial cost recovery when the sacrificial polymer and/or solvent are not reused. Alternatively, reuse of the sacrificial polymer and/or solvent in the polymer fiber product manufacturing process lowers raw materials costs and waste disposal costs. In one embodiment, the solvent is used in the polymer recycling process more than one time. For example, in embodiments where the solvent is recycled into the polymer fiber product manufacturing process, far less solvent is required to process a given amount of sacrificial polymer than in conventional methods. A process for decreasing the amount of solvent, or swelling agent, required for polymer recycling and utilizing melt filtration is described in EPO Publication No. EP2513212, issued on Oct. 24, 2012, which is hereby incorporated by reference in its entirety. As another example, in embodiments where the sacrificial polymer is recycled into the polymer fiber product manufacturing process, employing multicomponent fibers with very high sacrificial polymer content is more economical because minimizing the amount of sacrificial polymer in the multicomponent fiber is no longer crucial to keeping costs low. This configuration allows for significant spacing between the non-sacrificial polymer components, resulting in higher-quality non-sacrificial polymer fiber production and reduced agglomeration during downstream processing. Alternatively, maximizing the amount of non-sacrificial polymer in the multicomponent fiber is more feasible due to the improved dissolution performance and selectivity of the solvent. This configuration allows for maximizing the amount of non-sacrificial polymer produced per unit of multicomponent fiber, thus increasing production rates and lowering costs.

Notably, the present invention provides for the use of multicomponent polymer fibers of various sizes, in various configurations, and including various materials. Herein, fiber is understood to refer to fiber, filament, and/or yarn, or products thereof. Also herein, component and components are understood to mean one or more components and/or materials. In a preferred embodiment, the multicomponent fiber is a bicomponent fiber with an islands-in-sea configuration. Alternatively, the fiber with the islands-in-sea configuration is a multicomponent fiber with island fibers which include at least two different materials. FIG. 1A shows a cross-section view of an example multicomponent fiber with an island-in-sea configuration. The multicomponent fiber includes a sea component 100a that separates the one or more island components 110a and 120a of the multicomponent fiber. Other embodiments include using one or more different materials as the sea components, or using one or more different materials as the island components. Yet other embodiments include multicomponent fiber including non-circular cross-sectional configurations, multicomponent fiber including non-sacrificial polymer fibers with non-circular cross-sectional configurations, and multicomponent fiber including a core-in-sheath configuration. Non-circular cross-sectional configurations for the multicomponent fibers and non-sacrificial polymer fibers include, but are not limited to, oval, ribbon, rectangular, multi-lobed, etc. In another preferred embodiment, the multicomponent fiber includes a core-sheath configuration.

Figure 1B:
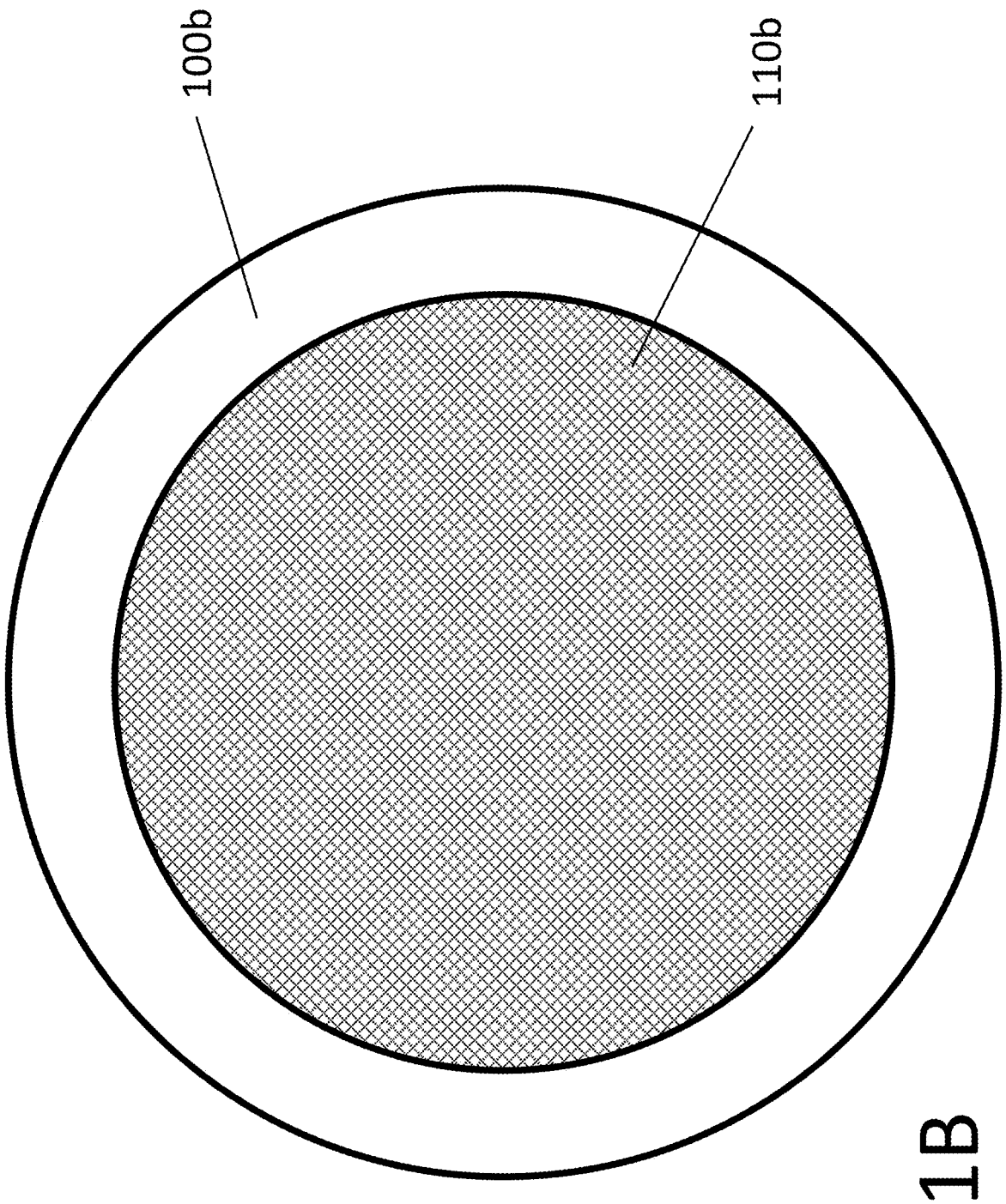
FIG. 1B illustrates a cross-section view of an exemplary multicomponent fiber with a core-sheath configuration.
Figure 1C:
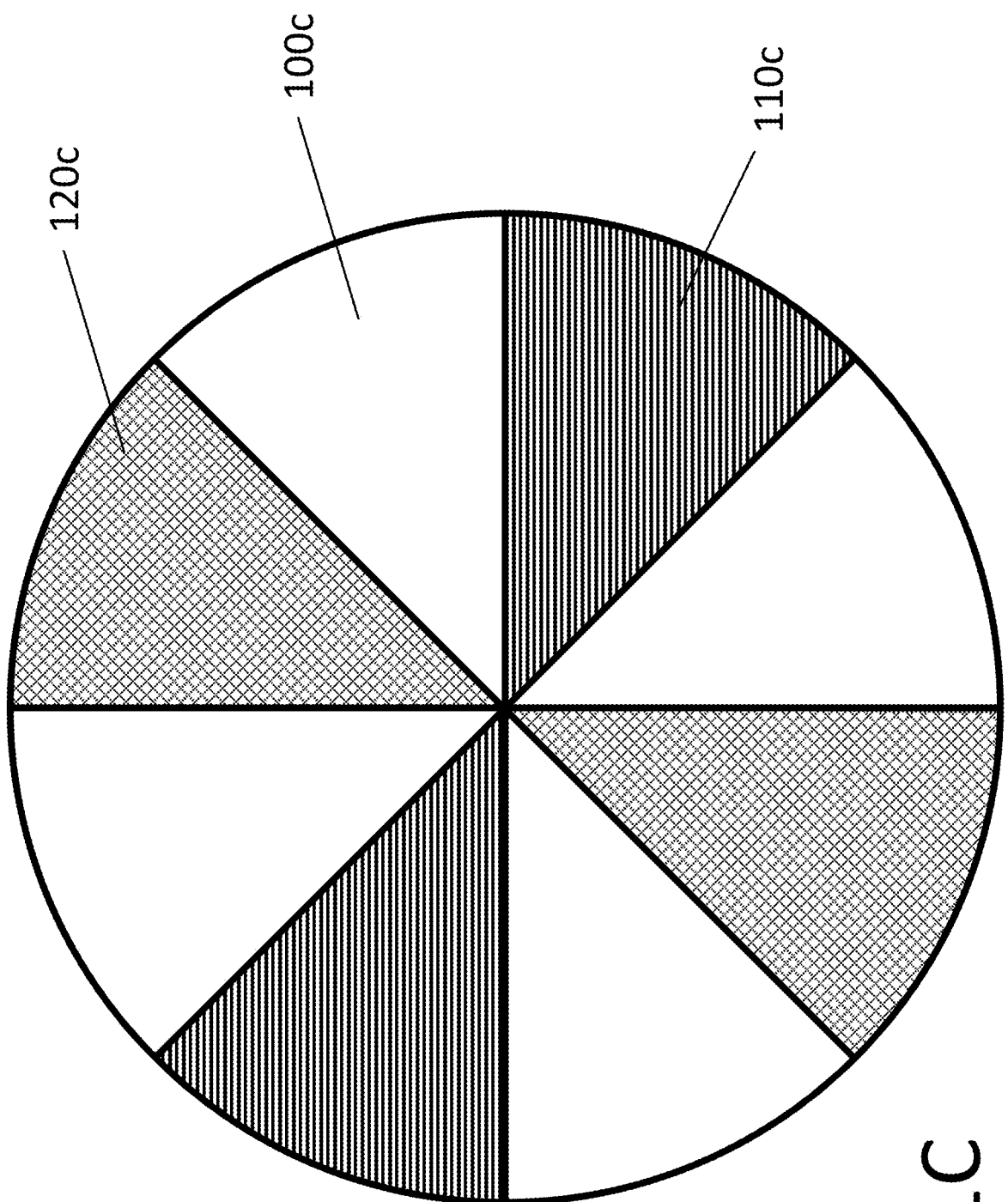
FIG. 1C illustrates a cross-section view of an exemplary multicomponent fiber with a pie-wedge configuration.

The multicomponent fiber is operable to be made from a variety of chemically viable materials. In one embodiment, the non-sacrificial polymer material and sacrificial polymer material are virgin materials. In another embodiment, the non-sacrificial polymer material is not a virgin material, such as a waste-stream material, and the sacrificial polymer material is a virgin material. Alternatively, the sacrificial polymer material is not a virgin material, such as a waste-stream material, and the non-sacrificial polymer material is a virgin material. In yet another embodiment, neither the non-sacrificial polymer nor the sacrificial polymer is a virgin material. In an alternative embodiment, the non-sacrificial polymer is a blend of virgin material and non-virgin material and the sacrificial polymer is virgin material or is not virgin material. Alternatively, the sacrificial polymer is a blend of virgin material and non-virgin material and the non-sacrificial polymer is virgin material or is not virgin material. In some cases it is necessary to separate materials from a waste stream, such as if multiple polymers will be recovered independently. One method of this is sink-float separation. An example of this process is described in U.S. Pat. No. 9,469,049, published on Oct. 18, 2016, which is hereby incorporated by reference in its entirety. FIG. 1B shows a cross-section view of an example bicomponent fiber with a core-sheath configuration. The bicomponent fiber includes a sheath component 100b that surrounds a core component 100b. In yet another preferred embodiment, the multicomponent fiber includes a pie-wedge configuration. FIG. 1C shows a cross-section view of an example multicomponent fiber with a pie-wedge configuration. The multicomponent fiber includes a number of sacrificial and non-sacrificial components 100c, 110c, and 120c arranged as wedges in the fiber. Multicomponent fibers are produced using methods including, but not limited to, melt-spinning, spunbonding, melt-blowing, melt-kneading, extrusion, and solution spinning.

The materials comprising the multicomponent fibers of the present invention include any type of polymer recognized as compatible with these processes, and the present invention includes their use as a component of the multicomponent fiber. These materials include, but are not limited to, polyesters, including, but not limited to, polyethylene terephthalate, polyethylene terephthalate glycol, polyhydroxyalkanoates, polytrimethylene terephthalate, polybutylene terephthalate, polylactides including polylactic acid, polycaprolactone, polybutylene succinate, polyhydroxybutyrate, non-sulfopolyesters, polyolefins including, but not limited to, polypropylenes and polyethylenes (such as LLDPE, LDPE, PE, and HDPE), polyamides including, but not limited to, PA6, PA66, PA666, PA610, PA612, PA11, and PA12, other high temperature polyamides or aminated polymers, polystyrenes, polycarbonates, elastomers including thermoplastic elastomers, polyurethanes including thermoplastic polyurethanes, other block polymers, other thermoplastics, glycols including polyethylene glycol, polyvinyl alcohols including, but not limited to, ethylene vinyl alcohol and butanediol vinyl alcohol, polyamide-imides, polydiketoenamines, polyimides, polyetherimides, polyetherktone, polyaryletherketones including, but not limited to, polyetheretherketone, polyetherketoneketone, polyaryletherketone, and polyetherketoneetherketoneketone, polyacrylics, polyacrylonitriles, acetates, liquid crystal polymers, polyphenylene oxide, polyphenylene sulfide, fluoropolymers including polyvinylidene fluoride, polybenzimidazoles, polysulfones, polyethersulfones, polyoxymethylene, and appropriate phthalates, esters, ethers, glycols, and oxides, as well other copolymers, blends, variants including melt or flow modified variants, modified molecular weights, unfilled or additive incorporated iterations, and other applicable polymers. In one embodiment, one of the above polymers is used as the non-sacrificial polymer in the production of a multicomponent fiber and the sacrificial polymer comprises polyolefins including, but not limited to, polypropylenes and polyethylenes (such as LLDPE, LDPE, PE, HDPE etc.), polyamides, non-sulfopolyesters including, but not limited to, polyethylene terephthalate, polybutylene terephthalate, and polylactides, other polyesters, other polycondensates, polycarbonates, polystyrenes (PS), polyvinyl chlorides (PVC), and mixtures, copolymers and variant molecular weights thereof. The non-sacrificial and sacrificial polymers are chosen for their compatibility given their thermal and rheological capabilities, making the polymer combination operable from a processing standpoint. For example, it is unlikely that a multicomponent fiber would be formed from a polyethylene terephthalate (PET) non-sacrificial component and a Polybutylene terephthalate (PBT) sacrificial component. As a result, almost any polymer is operable to be utilized as a non-sacrificial polymer according to the present invention given the suitable sacrificial polymer, solvent or swelling agent, and processing conditions. In one embodiment, the at least one sacrificial polymer includes a polyolefin and the at least one non-sacrificial, or target, polymer includes one or more of polyamide 6, polyamide 66, PBT, and PET, wherein the at least one sacrificial polymer and at least one target polymer are rheologically and/or thermally compatible. In another embodiment, a polyolefin such as polypropylene or polyethylene is a sacrificial polymer and is recovered from a multicomponent fiber. Alternatively, a polylactide is a sacrificial polymer and is recovered from a multicomponent fiber. Alternatively, a polyamide is a sacrificial polymer and is recovered from a multicomponent fiber. Alternatively, a polyester is a sacrificial polymer and is recovered from a multicomponent fiber, wherein the polyester is non-sulfopolyester. Alternatively, a polycarbonate is a sacrificial polymer and is recovered from a multicomponent fiber. An example method of choosing compatible polymers and producing a multicomponent polymer fiber without inducing degradation of the polymers is described in U.S. Pat. No. 7,252,493, issued Aug. 7, 2007, which is hereby incorporated by reference in its entirety. Advantageously, the present invention allows for the utilization of polymers which have high processing temperatures, such as greater than about 300 degrees Celsius, and/or high heat deflection temperatures. For example, certain polyesters, polyamides, and polycarbonates, which are used as sacrificial polymer options in some embodiments of the present invention, allow for the production of higher temperature non-sacrificial polymer fibers which have high processing temperatures, such as greater than about 300 degrees Celsius, thus creating a wide range of possible non-sacrificial fibers and sacrificial products which are operable to be reused in a fiber production process, processed into saleable pellets and/or granules, recovered as particles, or having other commercial opportunities.

The present invention also provides for dissolution of one or more sacrificial polymer components of a multicomponent fiber while allowing one or more non-sacrificial polymer components to remain. The solvents or swelling agents used for selective dissolution of the sacrificial polymer include, but are not limited to, water, alcohols including, but not limited to, aliphatic alcohols, organic solvents with high, medium, or low boiling points, acids, alkalis, caustic soda, surfactants/soaps, CreaCycle GMBH's CREASOLV® A, CreaCycle GMBH's CREASOLV® B, CreaCycle GMBH's CREASOLV® CT, CreaCycle GMBH's CREASOLV® SB, CreaCycle GMBH's CREASOLV® PC, CreaCycle GMBH's CREASOLV® MP, CreaCycle GMBH's CREASOLV® PS-F1.1, CreaCycle GMBH's CREASOLV® PO, CreaCycle GMBH's CREASOLV® 1, CreaCycle GMBH's CREASOLV® 2, CreaCycle GMBH's CREASOLV® 3, CreaCycle GMBH's CREASOLV® 4, CreaCycle GMBH's CREASOLV® 5, CreaCycle GMBH's CREASOLV® 6, alkylbenzenes including p-cymene, terpenes, terpenoids, ketones, ethers, cycloalkanes, esters, acetone, butanone, dimethyl sulfoxide, xylene, hexane, pyrrolidones, turpentine, kerosene, isopropanol, n-propanol, butanol, hexafluoroisopropanol (HFIP), methanol, ethanol, toluene, cresols, dimethylacetamide, dimethylformamide, cyrene, essential oils including, but not limited to, cinnamaldehyde, tetrahydrofuran (THF), xylene, methylethylketone (MEK), and dichloromethane (DCM), cyclohexane, cyclohexanone, limonene, ethyl benzene, glycerol, glycerin, ethylene glycol, tertralin, acrolein, dibasic ester (DBE), dialkyl dicarboxylic ester or a mixture thereof, dialkyl dicarboxylic ether or a mixture thereof, dimethyl ester (DME), a diethyl ester of oxalic acid, maleic acid, malonic acid, succinic acid, glutaric acid, or adipinic acid, dimethyl succinate, dimethyl glutarate, dimethyl adipate, paraffinic hydrocarbons, paraffins, naphthenes, aldehydes, acids, bases, aliphatic compounds such as aliphatic hydrocarbons and including, but not limited to, cycloaliphatic, linear, or branched hydrocarbons, such as those with 5 to 18 carbon atoms, methyl ethyl ketone, heterocycles, fatty acid alkyl esters, aromatic hydrocarbons, alcohols (with 1 to 5 carbons) of cyclic ethers, alcohols (with 1 to 5 carbons) of aliphatic and cyclic ketones, basic ester mixtures, mineral spirits, carboxylic acids, petroleum distillates, terpenoids, lipids, enzymes, ionic liquids, dialkyl esters of dicarboxylic acids, and mixtures and derivatives of these, as long as the solubility of the one or more sacrificial polymer components of the multicomponent fiber is sufficiently different from the solubility of the one or more non-sacrificial polymer components of the multicomponent fiber to allow selective dissolution. In another embodiment, the aforementioned solvents or swelling agents are also operable to be utilized as precipitation agents or filtration aids.

In one embodiment, the solvent used for selective dissolution and the precipitation agent used for selective precipitation of the sacrificial polymer are chosen by utilizing Hansen solubility parameters. In embodiments where the fiber is a tricomponent fiber or other multicomponent fiber with more than two components (ex: four-component fiber, five-component fiber, six-component fiber, etc.), the Hansen solubility parameter is utilized to ensure that the non-sacrificial polymers are not dissolved by the solvent. In a preferred embodiment, CreaCycle GMBH's CREASOLV® formulations, or a mixture or derivatives thereof, are chosen for the solvent, the precipitation agent, or the solvent and precipitation agent. In one embodiment, water is not used as the solvent. An exemplary embodiment includes a multicomponent fiber with an islands-in-the-sea configuration where the sea component(s) is/are sacrificial polymers and the island component(s) is/are non-sacrificial polymer or where the sea component(s) is/are non-sacrificial polymer and the island component(s) is/are sacrificial polymer. In one embodiment, a solvent is chosen that will dissolve a sacrificial polymer without significantly turning the macromolecules or polymer chain into monomers. Notably, this is a form of material recycling as opposed to chemical recycling, because the sacrificial polymer does not change significantly at the molecular level. In a preferred embodiment, the at least one sacrificial polymer is recovered as macromolecules and therefore does not require repolymerization. In one embodiment, above about 50% of the recovered sacrificial polymer is recovered as macromolecules. In another embodiment, above about 75% of the recovered sacrificial polymer is recovered as macromolecules. In yet another embodiment, above about 90% of the recovered sacrificial polymer is recovered as macromolecules. In one embodiment, a solvent for polyolefins is chosen, including but not limited to, a solvent from CreaCycle GMBH's CREASOLV® formulations. In one embodiment, the solvent is not classified as hazardous under the Global Harmonized system (GHS) criteria.

Furthermore, the present invention provides for the production of various polymer fiber products. In one embodiment, a multicomponent fiber is immersed in, sprayed with, or exposed to solvent resulting in the dissolution of the sacrificial polymer component of the multicomponent fiber. The non-sacrificial polymer components are then collected as continuous fibers in a roll, on a spool, on a bobbin, as a tow, or as a sheet. In some embodiments, the non-sacrificial polymer components are processed into discontinuous segments using rotary, guillotine, milling, cryogenic milling, or other fiber length reduction methods known in the art. In another embodiment, a multicomponent fiber is woven or knitted into a fabric using a loom or knitting machine, respectively. The fabric is then immersed in, sprayed with, or exposed to solvent resulting in the dissolution of the sacrificial polymer component of the multicomponent fiber. The non-sacrificial components remain as a woven fabric which is removed from the solvent treatment. Solvent treatment methods include batch processing techniques including solvent baths and continuous techniques including roll-to-roll processes. In another embodiment, the fabric is rinsed or treated at least once to remove any remaining solvent. In yet another embodiment, the solvent with dissolved polymer and/or any washing fluids are collected for subsequent processing. In yet another embodiment, there is an additional rinsing, washing, or other treatment prior to subsequent processing.

In another embodiment, multicomponent fiber is processed into discontinuous segments using rotary, guillotine, milling, cryogenic milling, or other fiber length reduction methods known in the art. These reduced length fibers are immersed in or exposed to solvent, resulting in the dissolution of the sacrificial polymer component. In some embodiments, the non-sacrificial polymer fibers are left in the sacrificial polymer solvent. In some embodiments, the non-sacrificial polymer fibers are collected or consolidated as a wet-cake, dry-cake, or other form factors known in the art using filtration with a filtration aid, ultrafiltration, or other methods known in the art. In one embodiment, such as when the filtration aid is being used to filter a polyolefin, the filtration aid is a monohydrocarbon or a polyhydroxy hydrocarbon with 2 to 12 carbon atoms, or an alcohol or diol. In one embodiment, a filtration aid is incorporated during the separation and recovery of the at least one sacrificial polymer, and an example of this method is described in WIPO Publication No. WO2018/068973, published Apr. 19, 2018, which is hereby incorporated by reference in its entirety. In some embodiments, the collected or consolidated non-sacrificial polymer fibers are rinsed with water or other solvent and/or dried. In some embodiments, the non-sacrificial polymer fibers are transferred from the sacrificial polymer dissolution solvent to another dispersive fluid. Often, polymer fibers in aqueous solution is a preferred form factor for transport or for use in processes for making polymer fiber products. Methods for performing this dispersant change include, but are not limited to, diafiltration, distillation using heat and/or vacuum, redispersion of filtered or consolidated non-sacrificial polymer fibers, and combinations of these methods. In some embodiments, the non-sacrificial polymer fibers are consolidated into a bulk material by vaporizing the solvent or dispersive fluid. In some embodiments, the non-sacrificial polymer fibers are processed into products. Methods for producing nonwoven polymer fiber products include, but are not limited to, wet-lay, air-lay, needle punching, hydroentanglement, spunbonding, carding, crosslapping, thermal bonding, ultrasonic bonding, melt-blowing, coating and chemical bonding or combinations of these. Polymer fiber nonwoven products include, but are not limited to, webs, papers, mats, and fabrics. Input materials for wet-lay processes include non-sacrificial polymer fibers in dry form, wet or in water or solvents, with lubricants, surfactants, or with dispersion aids.

In yet other embodiments, multicomponent fiber is processed into discontinuous segments using rotary, guillotine, milling, cryogenic milling, or other fiber length reduction methods known in the art. The multicomponent discontinuous fiber is then processed into products. Methods for producing polymer fiber products include, but are not limited to, wet-lay, air-lay, needlepunching, spunlacing, spunbonding, carding, crosslapping, thermal bonding, ultrasonic bonding, melt-blowing, chemical bonding, coating and compounding. Polymer fiber products include, but are not limited to, webs, papers, mats, fabrics, coatings and polymer compounds. For wet-lay processes, the discontinuous multicomponent fiber is first dispersed in water or another medium known in the art. The resulting nonwoven product is then immersed in, sprayed with, or exposed to solvent, resulting in the dissolution of the sacrificial polymer component of the multicomponent fiber. The non-sacrificial polymer fiber components remain as a nonwoven product which is removed from the solvent treatment. Solvent treatment methods include batch processing techniques including solvent baths and continuous techniques including roll-to-roll processes. In another embodiment, multicomponent fiber is used to make a nonwoven product. In some embodiments, the nonwoven product is rinsed and/or dried. In some embodiments, the solvent, dissolved sacrificial polymer, and/or any washing fluids are collected for subsequent processing. In another embodiment, there is an additional washing step, where the nonwoven product is rinsed and/or dried, before subsequent processing.

Additionally, the present invention provides for the recovery of the sacrificial polymer dissolution solvent and dissolved sacrificial polymer. In a preferred embodiment, insoluble impurities and non-sacrificial polymer are filtered or otherwise separated from the solvent including dissolved sacrificial polymer. The solubility property of the solvent including dissolved sacrificial polymer is then modified through the addition of a precipitant or by changing the temperature or pressure of the solution in order to precipitate the sacrificial polymer. Examples of precipitants include, but are not limited to, water, n-alkanes such as C6-C8 alkanes, isoalkanes, petroleum distillate, n-heptane, n-hexane, alcohols including methanol, ethanol, isopropanol, n-propanol, and butanol, aliphatic hydrocarbons or mixtures such as petroleum ethers or benzenes, mixtures of non-polar substances, aliphatic hydrocarbons, and mixtures of petroleum, ether and benzenes, such that the precipitant mixes, and mixtures or derivatives of these substances. Addition of the precipitant causes the dissolved sacrificial polymer to drop out of solution. An example of this process is described in U.S. Patent Publication No. 2004/0229965, published Nov. 18, 2004, which is hereby incorporated in its entirety. In one embodiment, a gas is also present. The polymer is then separated from the solution using one of various technologies including, but not limited to, filtration or centrifugation followed by decanting. The precipitated and separated sacrificial polymer is then dried using a devolatilization reactor or other suitable tool in one embodiment. In another embodiment, drying occurs by rotary evaporation. In some embodiments, the dried polymer is extruded using a plastic extruder or other suitable tool. In some embodiments, the recovered polymer is supplied to the multicomponent polymer fiber production step of the present invention, and is thereby continuously recycled. The solution remaining after separating the precipitated polymer, which now includes the solvent, in one embodiment the precipitation agent, and soluble impurities, is separated to recover the solvent using distillation, membrane separation, chromatographic separation, density separation, friction washing, phase separation, melt filtration, another suitable solvent recovery technique, or a combination of techniques. In one embodiment, melt filtration, pressure filtration, or phase separation is used to separate the sacrificial polymer and the swelling agent. In another embodiment, separation occurs just by solvent removal, such as by liquid filtration. A method of using friction washing and density separation for polymer separation and recycling, as well as particle production by precipitation and separation or removal of the solvent or by swelling agent, is described in U.S. Pat. No. 7,935,736, issued May 3, 2011, which is hereby incorporated by reference in its entirety. In one embodiment, particles or granules remain upon removal of the swelling agent. WIPO Publication No. WO2011/082802, published Jul. 14, 2011, which is hereby incorporated by reference it its entirety, describes a process wherein the plastics-containing waste with at least one swelling agent swells the at least one target polymer to form a polymer gel which is forced through holes to produce polymer strands operable to be processed into pellets. In one embodiment of this method, the polymer gel is recovered as granules by removal of the swelling agent and the swelling agent is recovered in a reusable form. In another example of the present invention, solvent recovery systems are used to distill used solvent from mixtures of liquid chemicals and solids. In some embodiments, the recovered solvent is used again to selectively dissolve sacrificial polymer in the methods described in the present invention, and is thereby continuously recycled. By way of example, polypropylene is separated and purified from an impure, mixed waste of post-consumer/post-industrial product. The polypropylene is separated using a polypropylene specific solvent. Then, the recovered polypropylene is used as the sacrificial polymer in the fiber production step and the same polypropylene specific solvent is also used again. The recovered polypropylene and polypropylene specific solvent are operable to be repeatedly used as input materials. In another embodiment, the recovered sacrificial polymer is in gel form and is forced through sieves or holes to create strands of recovered sacrificial polymer. A method of producing strands is described in U.S. Pat. No. 8,138,232, issued Mar. 20, 2012, which is hereby incorporated by reference in its entirety. In some embodiments, the collected insoluble and/or soluble impurities are discarded, or, if of further value, sold or reused.

FIG. 2A shows a process flow diagram illustrating the steps of some embodiments of the methods in the invention for producing polymer fibers and polymer fiber products. Non-sacrificial polymer material inputs and sacrificial polymer material inputs are operable to come from starting waste, post-consumer waste, post-industrial waste, virgin polymer streams, recovered polymers from the recycling process of this invention, and blends of these sources. Non-sacrificial polymer material and sacrificial polymer material are fed into a fiber-spinning tool, producing a multicomponent fiber. This multicomponent fiber is passed to a tool where it is processed to produce discontinuous multicomponent fiber segments. These multicomponent fiber segments are exposed to solvent, resulting in the selective dissolution of the sacrificial polymer component of the multicomponent fiber. In one embodiment, the multicomponent fiber segments are also exposed to temperature and/or pressure changes. The non-sacrificial polymer fibers are then separated from the solvent, washed at least once, and are redispersed or are maintained in redispersable form. In one embodiment, the non-sacrificial polymer fibers are filtered, washed at least once, and redispersed or are maintained in redispersable form at least one additional time. In another embodiment, a dispersant is not used or the non-sacrificial polymer fibers are not redispersed. Surface treatments are performed during the non-sacrificial polymer recovery process in one embodiment, including the addition of lubricants, water, dispersants, processing aids, surface finishes, or other additives. These dispersed non-sacrificial polymer fibers are then sold to manufacturers of polymer fiber products or further processed into nonwovens, compounds, or other processing. The solvent is collected and the sacrificial polymer is collected. The removal of the sacrificial polymer leaves behind a non-sacrificial polymer fiber of average diameters from about 1 nanometer to about 1000 nanometers to greater than about 10 microns, based on the initial spinning conditions of the fiber and the shape of the fiber. Multicomponent fibers with islands-in-the-sea configurations are typically used to produce single component fibers with diameters below 10 microns. In one embodiment, diameters of recovered sacrificial polymer fibers are between about 1 nanometer and about 100 nanometers. Alternatively, diameters of recovered sacrificial polymer fibers are between about 100 nanometers and about 15 microns or between about 100 nanometers and about 30 microns. In another embodiment, diameters of recovered sacrificial polymer fibers are at most about 50 microns. Preferably, diameters of recovered sacrificial polymer fibers are less than about 10 microns. Alternatively, diameters of recovered sacrificial polymer fibers are between about 10 and about 1000 microns.

In one embodiment, fibers with non-circular cross-sections which do not have constant diameters are formed. The dissolved sacrificial polymer is recovered by adding a precipitation agent to the solvent or by temperature or pressure change. The precipitated polymer is removed using filtration with a filtration aid or centrifugation followed by decanting, then dried using a devolatilization reactor, and finally extruded using a plastic extruder tool in one embodiment. This recovered sacrificial polymer is recycled back into the process at the multicomponent fiber production stage in one embodiment. During the sacrificial polymer recovery process, various additions are operable to take place, including addition of heat-stabilizers, colors, or other additives, to the recovered sacrificial polymer. Advantageously, chemical additives are operable to make both virgin and waste stream materials, as well as non-sacrificial polymer products, environmentally friendly. In another embodiment, the sacrificial polymer is precipitated and recovered as a useful particle powder. The sacrificial polymer is recovered in particle form when it has commercial use as a particle. In one embodiment, surfactants, anti-statics, dispersion, antioxidants, or processing aids including lubricants are added to the particle powders. The solvent is recovered by distillation using a solvent recovery system or by another suitable solvent recovery method and is recycled back into the process at the sacrificial polymer dissolution step in one embodiment. Additional additives are operable to include, but are not limited to, UV absorbers, light stabilizers, metal deactivators, filler deactivators, antioxidants, nucleating agents, anti-nucleating agents, tougheners, plasticizers, lubricants, rheology modifiers, thixotropic agents, chain extenders, optical brighteners, antimicrobial agents, antistatic agents, slip agents, antiblocking agents, coupling agents, crosslinking agents, anti-crosslinking agents, hydrophilizing agents, hydrophobizing agents, dispersing agents, compatibilizers, oxygen scavengers, acid scavengers, propellants, degradation additives, defoamers, odor scavengers, marking agents, antifogging agents, fillers, reinforcing agents, other additives and mixtures thereof.

In one embodiment, biodegradation enhancing and/or degradation enhancing additives are incorporated with the input polymer waste, input post-consumer polymer waste, post-industrial waste, or virgin polymer streams. The biodegradation enhancing and/or degradation enhancing additives are incorporated prior to the formation of the multicomponent fiber with at least one sacrificial polymer and at least one non-sacrificial polymer, in addition to at least one additive, and are incorporated as a liquid, powder, masterbatch, or other method. When the non-sacrificial polymer is put to use downstream, the addition of the biodegradation enhancing and/or degradation enhancing additive increases the rate at which the polymer is operable to degrade in different environments, such as a landfill, relative to waste destined for a landfill or other area that does not incorporate such additives, leading to a decrease in net plastic waste. Additionally, inclusion of biodegradation enhancing and/or degradation enhancing additives in the production of polymers that are destined for use in single-use products and applications and often end up in oceans are operable to degrade faster, causing less harm. Thus, in embodiments where incorporating biodegradation enhancing and/or degradation enhancing additives into post-consumer or post-industrial input polymer sources, the benefits of both recycling and providing an end-of polymer lifecycle solution are realized. In one embodiment, the additives include a masterbatch containing calcium carbonate and an aliphatic polyester which allows the breakdown of polyesters in marine environments and landfill conditions. In another embodiment, the additives are plastic additives which allow microbes to consume bonds within the plastic structure and increase degradation rate. In yet another embodiment, the additive includes a glutaric acid and an aliphatic polymer which allows microorganisms to penetrate the treated plastic and increase degradation rates in a variety of environments. In another embodiment, the biodegradation enhancing and/or degradation enhancing additives include, but are not limited to, starches, microbes, *Geobaccillus thermoleovorans*, pro-oxidant additives, iron, manganese, cobalt, or any other chemical or chemical compound operable to increase the degradation and/or biodegradation rate of the polymer. Biodegradation enhancing additives are operable to improve biodegradation of the polymer by direct action, indirect action, aerobic, or anaerobic means. Advantageously, by adding biodegradation enhancing additives to the non-sacrificial polymers, narrow diameter biodegradable fibers are formed to have a lessened environmental impact.

In another embodiment, stabilizers against actinic, thermal, and/or oxidative damage are added to one or more of the sacrificial polymer, non-sacrificial polymer, recovered sacrificial polymer, and recovered non-sacrificial polymer. In one embodiment, thermal stabilizers are added to a masterbatch, powder, or liquid prior to the initial spinning of the multicomponent fiber. In another embodiment, thermal stabilizers are added to the solvent bath in order to be added to the then recovered sacrificial polymer. In another embodiment, thermal stabilizers are added to the recovered sacrificial polymer during sacrificial polymer recovery and washing. Thermal stabilizers are operable to maintain the mechanical integrity of a polymer during processing, increasing the combination of polymers that the described invention is operable to be used with. Thermal stabilizers are also useful in maintaining the structural and chemical integrity of a polymer after the process described by this invention, where the recovered polymer is operable to be processed into items that need to maintain their structure in adverse conditions. An example of this method is found in EPO Publication No. EP3016998, published May 11, 2016, which is hereby incorporated by reference in its entirety. In one embodiment of the present invention, IRGANOX 1010, produced by BASF, a sterically hindered phenolic antioxidant which prevents the thermo-oxidative degradation of polymers, waxes, and oils is used. In an alternative embodiment, IRGAFOS 168, a hydrolytically stable phosphite-based secondary process stabilizer produced by BASF, is used. In another embodiment, at least one cyclitol, at least one alditol, at least one alditol in addition to at least one primary and/or secondary antioxidant, or at least one cylitol in addition to at least one primary and/or secondary anti-oxidant, is introduced to the polymer recyclate or polymer before recycling to provide thermal, actinic, or oxidative damage stabilization. An example of this method is found in WIPO Publication No. WO2019/063550, published Apr. 4, 2019, and is hereby incorporated by reference in its entirety. In some cases, addition of the thermal stabilizer, as well as temperature and/or pressure changes, are operable to provide the polymer recycled with this process with improved mechanical properties compared to traditionally recycled polymer. An example of this process is described in WIPO Publication No. WO2015/000681, published Jan. 16, 2014, is incorporated herein by reference in its entirety. An example of a method including increasing the temperature of solvent for polymer recovery is described in EPO Publication No. EP1237998, published on Sep. 11, 2002, which is hereby incorporated by reference in its entirety.

In one embodiment, prior to utilizing the solvent, non-sacrificial polymer, or sacrificial polymer in the multicomponent fiber process, the chosen solvent is used to purify waste-stream sacrificial and/or non-sacrificial polymer suitable for melt spinning processing in the multicomponent fiber. The solvent is then used again in the removal of the sacrificial polymer from the multicomponent fiber. Advantageously, this allows the process to utilize waste-stream material that contains fillers, pigments, or other materials that would otherwise render the material useless such that it would end up being disposed of and potentially be an environmental hazard. The remaining non-sacrificial polymer and the sacrificial polymer resulting from the production process are of high quality and are operable to be reused, just as the solvent is operable to be reused, multiple times. In one embodiment, the remaining non-sacrificial polymer is a non-sacrificial fiber. In one embodiment, greater than about 50% of the solvent used is recovered and is operable to be reused multiple times. In another embodiment, greater than about 75% of the solvent used is recovered and operable to be reused multiple times. In a preferred embodiment, greater than about 90% of the solvent used is recovered and is operable to be reused multiple times.

High quality recovered polymers have mechanical, chemical, and thermal behavior similar to virgin polymers of the intended chemical formula which can be compared and include, but are not limited to, behavior of a polymer sample in water, such as floating or sinking, other density comparisons, behavior of a polymer sample when burning, color of a flame, formation of soot, melting temperature, melt flow, and measurement of mechanical properties such as, but not limited to, tensile strength, Young's Modulus, tensile creep, and flexural strength. In one embodiment, greater than about 50% of the sacrificial polymer used is recovered and is operable to be reused multiple times. In another embodiment, greater than about 75% of the sacrificial polymer used is recovered and operable to be reused multiple times. In a preferred embodiment, greater than about 90% of the sacrificial polymer used is recovered and is operable to be reused multiple times. An example of using waste-stream materials in polymer recycling is described by WIPO Publication No. WO2006/131376, published Dec. 14, 2006, which is hereby incorporated by reference in its entirety. In yet another similar solvent based process, a chosen solvent is used to purify a waste stream polymer or waste stream polymers into high chemical purity thermoplastic polymers wherein the particles formed from the sacrificial component of a multicomponent fiber are then used in a process where sacrificial polymer component particles are permanently eliminated, and the solvent is re-used in future processes.

FIG. 2B shows a process flow diagram illustrating the steps of some embodiments of the methods in the invention for producing woven fabric including polymer fiber. Non-sacrificial polymer material and sacrificial polymer material are fed into a fiber-spinning tool, producing a multicomponent fiber. The multicomponent fiber is then woven or knitted into a fabric using a loom or knitting machine, respectively. The fabric is then immersed in, sprayed with, or exposed to solvent, resulting in the selective dissolution of the sacrificial component of the multicomponent fiber. The non-sacrificial polymer components remain as a woven fabric, which is removed from the solvent treatment. Solvent treatment methods include batch processing techniques such as solvent baths and continuous techniques such as roll-to-roll processes. The solvent including dissolved sacrificial polymer is collected. In one embodiment, the non-sacrificial polymer is rinsed and dried to remove any remaining sacrificial polymer and solvent. During the non-sacrificial polymer gather process, the addition of lubricants, coatings, or other treatments are operable to take place. The sacrificial polymer is recovered by adding a precipitation agent to the solvent or by temperature or pressure change. In one embodiment, the precipitated polymer is removed using filtration or centrifugation followed by decanting, then dried using a devolatilization reactor, and finally extruded using a plastic extruder tool. In an alternative embodiment, drying occurs by rotary evaporation. The recovered sacrificial polymer is recycled back into the process at the multicomponent fiber production stage. During the sacrificial polymer recovery process, various additions are operable to take place, including addition of thermal stabilizers, biodegradation enhancing compounds, colors and dyes, antioxidants, lubricants, or other additives, to the recovered sacrificial polymer. The solvent is recovered by distillation using a solvent recovery system and is recycled back into the process at the sacrificial polymer dissolution step.

Figure 2C:
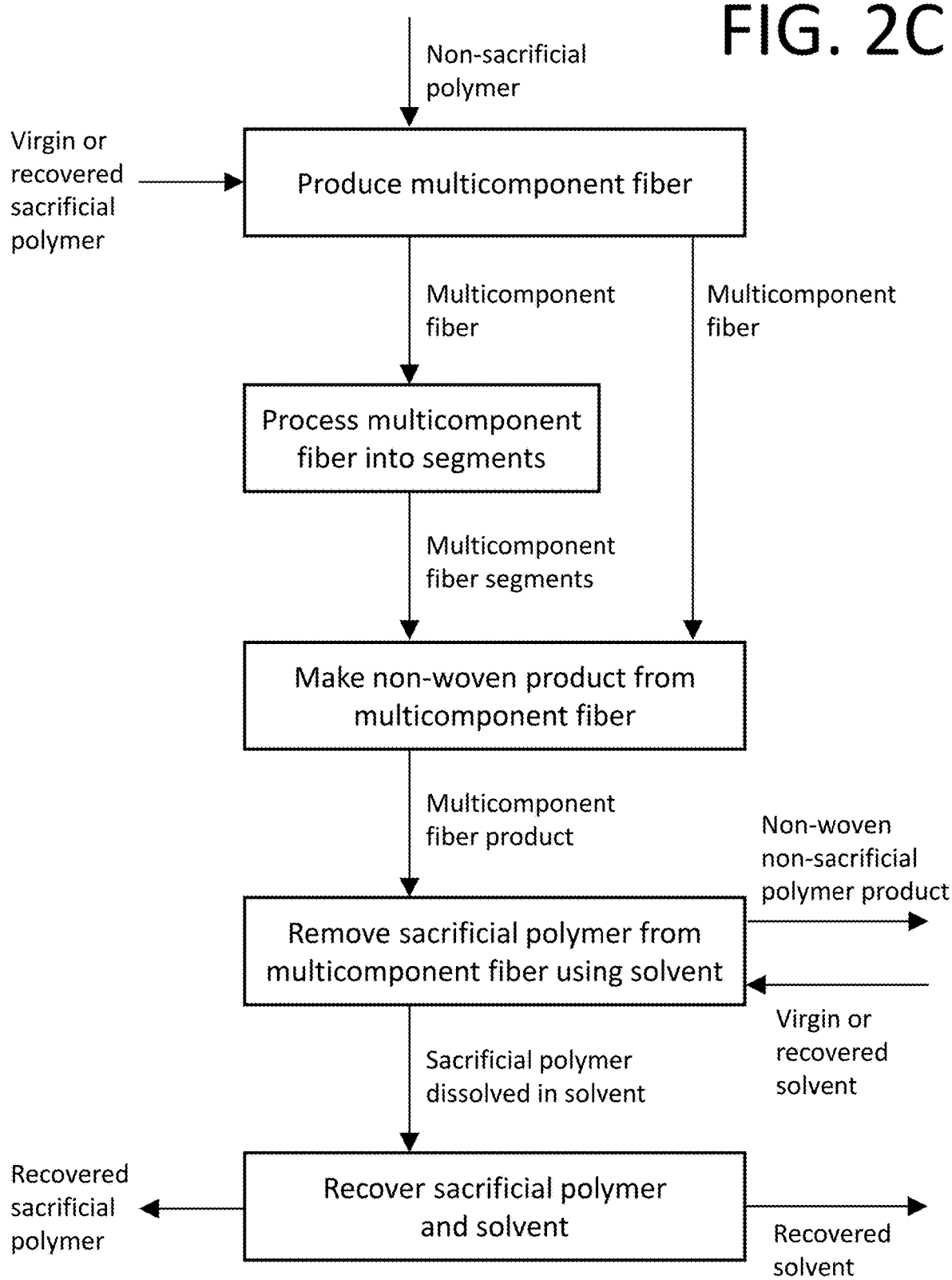
FIG. 2C shows a process flow diagram illustrating the steps of one embodiment of the methods in the invention for producing nonwoven polymer fiber products and recovering materials used in these methods.

FIG. 2C shows a process flow diagram illustrating the steps of some embodiments of the methods in the invention for producing nonwoven polymer fiber products. Non-sacrificial polymer material and sacrificial polymer material are fed into a fiber-spinning tool, producing a multicomponent fiber. In some embodiments, this multicomponent fiber is passed to a tool where it is processed to produce discontinuous multicomponent fiber segments. Next, this discontinuous or continuous multicomponent fiber is processed into nonwoven products. Methods for producing nonwoven polymer fiber products include, but are not limited to, wet-lay, air-lay, needlepunching, spunlacing, spunbonding, carding, crosslapping, thermal bonding, ultrasonic bonding, melt-blowing, coating and chemical bonding. Polymer fiber products include, but are not limited to, webs, papers, mats, coatings and fabrics. The resulting nonwoven product is then immersed in, sprayed with, or exposed to solvent, resulting in the dissolution of the sacrificial polymer component of the multicomponent fiber. The non-sacrificial polymer components remain as a nonwoven product which is removed from the solvent treatment. Solvent treatment methods include batch processing techniques including solvent baths and continuous techniques including roll-to-roll processes. In some embodiments, the nonwoven product is rinsed and/or dried. In one embodiment, the nonwoven product is rinsed one or more times. During the non-sacrificial polymer gather process, various additions are operable to take place, including the addition of lubricants or other treatments. The solvent including sacrificial polymer is collected. The sacrificial polymer is recovered by adding a precipitation agent to the solvent or by temperature or pressure change. The precipitated sacrificial polymer is removed using filtration or centrifugation followed by decanting, then dried using a devolatilization reactor, and finally extruded using a plastic extruder tool in one embodiment. The recovered sacrificial polymer is recycled back into the process at the multicomponent fiber production stage in one embodiment. During the sacrificial polymer recovery process, various additions are operable to take place, including addition of thermal stabilizers, biodegradation enhancing compounds, colors and dyes, antioxidants, lubricants, or other additives, to the recovered sacrificial polymer. The solvent is recovered by distillation or other suitable solvent recovery method and is recycled back into the process at the sacrificial polymer dissolution step in one embodiment.

In one exemplary and non-limiting embodiment, woven fabric including polymer fiber is produced using the present invention. Multicomponent fiber with polyethylene terephthalate (PET) non-sacrificial component and polyethylene (PE) sacrificial component is first obtained by melt-spinning and collected on a spool. This multicomponent fiber is then woven into a fabric on a loom. Next, multicomponent fiber fabric pieces are immersed in or exposed to an organic solvent, which is preferably a paraffinic hydrocarbon formulation, and retrieved in a batch mode process, dissolving the PE sacrificial component while not dissolving the PET non-sacrificial component and resulting in a woven PET fabric. The dissolution of the PE sacrificial component occurs at an elevated temperature in one embodiment (Whiteley, K. S.; Heggs, T. G.; Koch, H.; Mawer, R. L. and Immel, W. (2005) "Polyolefins" in Ullmann's Encyclopedia of Industrial Chemistry. Wiley-VCH, Weinheim. doi: 10.1002/14356007.a21_487). The organic solvent and dissolved PE mixture is filtered to remove insoluble impurities. Water is added to the dissolved PE and an organic solvent to induce precipitation of the dissolved PE. In an alternative embodiment, water is not the precipitant. This mixture is centrifuged and decanted to separate the solvent from the precipitated PE. The PE is fed into a devolatilization reactor to remove residual solvent and then input into a plastic extruder to produce pelletized PE which is reused as input into the multicomponent fiber melt-spinning stage. The decanted organic solvent and water mixture is distilled in a solvent recovery system, resulting in pure organic solvent, pure water, and dried soluble impurities. The dried soluble impurities, and the organic solvent and water are reused in the PE dissolution and PE precipitation steps, respectively. In some embodiments, the collected insoluble and/or soluble impurities are discarded, or, if of further value, sold or reused.

In another exemplary and non-limiting embodiment, non-woven fabric composed of polymer fiber is produced using the present invention. A fabric is produced by spunbonding multicomponent fiber with PET non-sacrificial polymer component and PE sacrificial polymer component. Next, multicomponent fiber fabric pieces are immersed in or exposed to an organic solvent and retrieved in a batch mode process, dissolving the PE sacrificial polymer component while not dissolving the PET non-sacrificial polymer component and resulting in a nonwoven PET fabric. The dissolution of the PE sacrificial component occurs at an elevated temperature in one embodiment. The organic solvent and dissolved PE mixture is filtered to remove insoluble impurities. Water is added to the dissolved PE and organic solvent to induce precipitation of the dissolved PE. This mixture is centrifuged and decanted to separate the solvent from the precipitated PE. The PE is input into a devolatilization reactor to remove residual solvent, and then input into a plastic extruder to produce pelletized PE which is reused as input into the multicomponent fiber melt-spinning stage. The decanted organic solvent and water mixture is distilled in a solvent recovery system, resulting in pure organic solvent, pure water, and dried soluble impurities. The organic solvent and water are reused in the PE dissolution and PE precipitation steps, respectively. In some embodiments, the collected insoluble and/or soluble impurities are discarded, or, if of further value, sold or reused.

In another exemplary and non-limiting embodiment, carded and spunlaced fabric composed of polymer fiber is produced using the present invention. Multicomponent fiber with PET non-sacrificial polymer component and PE sacrificial polymer component is first obtained by melt-spinning and is collected in continuous tow form. Then the fiber is then processed into discontinuous segments using a staple cutting tool. These multicomponent fiber segments are then carded into a fabric in a continuous process. This fabric is then exposed to an organic solvent. The dissolution of the PE sacrificial component occurs at an elevated temperature in one embodiment. The dissolved PE and organic solvent are collected during the spunlacing process. The organic solvent and dissolved PE mixture is filtered to remove insoluble impurities. Water is added to the dissolved PE and organic solvent to induce precipitation of the dissolved PE. This mixture is centrifuged and decanted to separate the solvent from the precipitated PE. The PE is fed into a devolatilization reactor to remove residual solvent, and then input into a plastic extruder to produce pelletized PE which is reused as input into the multicomponent fiber melt-spinning stage. The decanted organic solvent and water mixture is distilled in a solvent recovery system, resulting in pure organic solvent, pure water, and dried soluble impurities. The dried soluble impurities, and the organic solvent and water are reused in the PE dissolution and PE precipitation steps, respectively. In some embodiments, the collected insoluble and/or soluble impurities are discarded, or, if of further value, sold or reused.

In yet another exemplary and non-limiting embodiment, the present invention provides for production of polymer fibers in aqueous solution. Multicomponent fiber with PET non-sacrificial polymer component and PE sacrificial polymer component is first obtained by melt-spinning and collected in tow form. This multicomponent fiber is then processed into discontinuous segments using a staple cutting tool. These multicomponent fiber segments are then immersed in or exposed to an organic solvent and retrieved in a batch mode process, dissolving the PE sacrificial polymer component while not dissolving the PET non-sacrificial polymer component and resulting in PET fibers dispersed in organic solvent including dissolved PE. The dissolution of the PE sacrificial component occurs at an elevated temperature in one embodiment. The PET fibers are filtered from this solution and then redispersed in water or other suitable dispersion medium to form an aqueous solution of PET fibers, or are collected without redispersion. In some embodiments, the organic solvent and dissolved PE mixture is filtered to remove remaining insoluble impurities. Water is added to the dissolved PE and organic solvent to induce precipitation of the dissolved PE. This mixture is centrifuged and decanted to separate the solvent from the precipitated PE. The PE is input into a devolatilization reactor to remove residual solvent, and then input into a plastic extruder to produce pelletized PE which is reused as input into the multicomponent fiber melt-spinning stage. The decanted organic solvent and water mixture is distilled in a solvent recovery system, resulting in pure organic solvent, pure water, and dried soluble impurities. The dried soluble impurities, and the organic solvent and water are reused in the PE dissolution and PE precipitation steps, respectively. In some embodiments, the collected insoluble and/or soluble impurities are discarded, or, if of further value, sold or reused.

In an alternative embodiment, a multicomponent fiber with PET non-sacrificial polymer component and PP sacrificial polymer component is first obtained. The multicomponent fiber is then exposed to at least one swelling agent operable to selectively dissolve the sacrificial PP polymer. The sacrificial PP fiber is dissolved while the PET non-sacrificial polymer component is not, resulting in the PP dispersed in the swelling agent. The PET non-sacrificial fibers are removed and are operable to be redispersed in a medium such as water. The PP sacrificial polymer is recovered in gel form and precipitation does not occur. The PP sacrificial polymer is then separated from the swelling agent and is washed, washed and dried, or dried, and is recovered as macromolecules, such that it is operable to be recycled and re-spun. In one embodiment, the sacrificial polymer is recovered as granules. The swelling agent is also recovered and is operable to be reused.

In yet another exemplary and non-limiting embodiment, other woven fabrics, nonwoven fabrics, carded and spunlaced fabrics, and polymer fibers are produced using the present invention. In one embodiment, a multicomponent fiber is formed with Polypropylene (PP) as the sacrificial polymer and polyamide 6, polyamide 66, Polybutylene terephthalate (PBT), and/or polyethylene terephthalate (PET) are the non-sacrificial polymer, with the sacrificial polymer preferably being a sea component and the non-sacrificial polymer preferably being an island component in an islands-in the-sea configuration.

In one embodiment, an islands-in-the-sea bicomponent fiber is formed from PP and polyamide 6, wherein PP is the sea component and polyamide 6 is the island fiber component, where the PP sea is the sacrificial polymer and is separated from the non-sacrificial polyamide 6 island fiber. The PP sea is recovered and reused in the fiber production process multiple times or is operable to be sold as pellets, granules, or powder. A solvent is used to separate the PP and polyamide 6, and the solvent is recovered and reused in the fiber production process multiple times. In another embodiment, an islands-in-the-sea bicomponent fiber is formed from PP and PET, wherein PP is the sea component and PET is the island fiber component, where the PP sea is the sacrificial polymer and is separated from the non-sacrificial PET island fiber. The PP sea is recovered and reused in the fiber production process or is operable to be sold as pellets, granules, or powder. A solvent is used to separate the PP and PET, and the solvent is recovered and reused in the fiber production process. In another embodiment, an islands-in-the-sea bicomponent fiber is formed from PP and polyamide 66, wherein PP is the sea component and polyamide 66 is the island component, where the PP sea is the sacrificial polymer and is separated from the non-sacrificial polyamide 66 island fiber. The PP sea is recovered and reused in the fiber production process or is operable to be sold as pellets, granules, or powder. A solvent is used to separate the PP and polyamide 66, and the solvent is recovered and reused in the fiber production process. In another embodiment, an islands-in-the-sea bicomponent fiber is formed from PP and PBT, wherein PP is the sea component and PBT is the island component, where the PP sea is the sacrificial polymer and is separated from the non-sacrificial PBT island fiber. The PP sea is recovered and reused in the fiber production process many times or is operable to be sold as pellets, granules, or powder. A solvent is used to separate the PP and PBT, and the solvent is recovered and reused in the fiber production process multiple times. In another embodiment, an islands-in-the-sea bicomponent fiber is formed from PP and PET, wherein PP is the sea component and PET is the island component, where the PP sea is the sacrificial polymer and is separated from the non-sacrificial PET island fiber. The PP sea is recovered and reused in the fiber production process multiple times or is operable to be sold as pellets, granules, or powder. A solvent is used to separate the PP and PET, and the solvent is recovered and reused in the fiber production process multiple times.

In an alternative embodiment, an islands-in-the-sea bicomponent fiber is formed from PLA and PP, wherein PLA is the sea component and PP is the island component, where the PLA sea is the sacrificial polymer and is separated from the non-sacrificial PP island fiber. The PLA sea is recovered and reused in the fiber production process multiple times or is operable to be sold as pellets, granules, or powder. A solvent is used to separate the PLA and PP, and the solvent is recovered and reused in the fiber production process multiple times. In one embodiment, the solvent for the PLA sea is an aliphatic alcohol, ether or ester and mixtures thereof (preferably THF), HFIP, acetone, CreaSolv SB, CreaSolv PC, CreaSolv MP and mixtures thereof.

In another example, Polyvinylidene Fluoride (PVDF), Polyaryl ether ketone (PAEK), PET, or any other chemical compound known in the art is the non-sacrificial polymer. In another example, a multicomponent fiber is formed with a polyamide, such as polyamide 66 as the sacrificial polymer and a polyester, such as PET, as the non-sacrificial polymer. Advantageously, the present invention provides for combining multiple non-sacrificial polymers with a sacrificial polymer in a single fiber to produce tri-component fibers, four component fibers, five component fibers, etc. In yet another example, a multicomponent fiber is formed with a high processing temperature polyamide as the sacrificial polymer and a polyaryletherketone, including but not limited to certain grades of polyetherketoneketone, is the non-sacrificial polymer. The flexibility of this invention allows for many other polymers to be used as the sacrificial polymer, creating many opportunities for a reduction in net waste due to waste-polymer recycling.

In one embodiment, a bicomponent fiber is formed from PP and PVDF, wherein PP is the sacrificial polymer and is separated from the non-sacrificial PVDF fiber. The PP is recovered and reused in the fiber production process or is operable to be sold as pellets, granules, or powder. A solvent is used to separate the PP and PVDF, and the solvent is recovered and reused in the fiber production process. In one embodiment, the solvent for a polyolefin sacrificial polymer, such as PP or PE, is CreaCycle GMBH's CREASOLV® PO, an aliphatic compound such as cycloaliphatic, linear or branched hydrocarbons, and preferably cycloaliphatic, linear or branched hydrocarbons with 5 to 18 carbon atoms, and mixtures thereof. In another embodiment, a bicomponent fiber is formed from polyester, such as PET and a polycarbonate, wherein a polyester is the sacrificial polymer and is separated from the non-sacrificial polycarbonate fiber. The polyester is recovered and reused in the fiber production process multiple times or is operable to be sold as pellets, granules, or powder. A solvent is used to separate the polyester and polycarbonate, and the solvent is recovered and reused in the fiber production process multiple times.

In another embodiment, a tricomponent fiber is formed from PLA, Polyvinyl alcohol (PVOH), and PET, wherein PLA is the sacrificial polymer and is separated from the non-sacrificial PET and PVOH. The PLA is recovered and reused in the fiber production process or is operable to be sold as pellets, granules, or powder. In one embodiment, the PVOH is Butanediol Vinyl Alcohol (BVOH) or copolymers thereof.

In yet another embodiment, a bicomponent fiber is formed from PP and a polycarbonate, wherein PP is the sacrificial polymer and is separated from the non-sacrificial polycarbonate fiber. The PP is recovered and reused in the fiber production process or is operable to be sold as pellets, granules, or powder. A solvent is used to separate the PP and polycarbonate, and the solvent is recovered and reused in the fiber production process. In another embodiment, a bicomponent fiber is formed from PET and polyamide 6, wherein PET is the sacrificial polymer and is separated from the non-sacrificial polyamide 6 fiber. The PET is recovered and reused in the fiber production process multiple times or is operable to be sold as pellets, granules, or powder. A solvent is used to separate the PET and polyamide 6, and the solvent is recovered and reused in the fiber production process multiple times. In one embodiment, the solvent is one or more of a dialkyl dicarboxylic ester or a dialkyl dicarboxylic ether mixture, dimethyl ester, or diethyl esters of oxalic acid, malonic acid, succinic acid, glutaric acid and/or adipic acid. In another embodiment, a bicomponent fiber is formed from PET and PP, wherein PET is the sacrificial polymer and is separated from the non-sacrificial PP fiber. The PET is recovered and reused in the fiber production process multiple times or is operable to be sold as pellets, granules, or powder. A solvent is used to separate the PET and PP, and the solvent is recovered and reused in the fiber production process multiple times. In one embodiment the PET is precipitated, and the precipitant is one or more aliphatic hydrocarbons or mixtures such as petroleum ethers or benzenes, mixtures of non-polar substances, aliphatic hydrocarbons, and mixtures of petroleum, ether and benzenes, such that the precipitant mixes.

In another embodiment, a bicomponent fiber is formed from polyamide 6 and either PET, PE, and/or PBT, wherein polyamide 6 is the sacrificial polymer and is separated from the non-sacrificial PET, PE, and/or PBT fiber. The polyamide 6 is recovered and reused in the fiber production process or is operable to be sold as pellets, granules, or powder. A solvent is used to separate the polyamide 6 and either PET, PE, and/or PBT, and the solvent is recovered and reused in the fiber production process.

In another embodiment, a multicomponent fiber is formed from a polyamide and one or more other materials that are not a polyamide, wherein the polyamide is the sacrificial polymer and the non-polyamide is the non-sacrificial polymer. In yet another embodiment, a multicomponent fiber is formed from a polyester and one or more other materials that are not a polyester, wherein the polyester is the sacrificial polymer and the non-polyester is the non-sacrificial polymer. In yet another embodiment, a multicomponent fiber is formed from a polycarbonate and one or more other materials that are not a polycarbonate, wherein the polycarbonate is the sacrificial polymer and the non-polycarbonate is the non-sacrificial polymer. In an alternative embodiment, a multicomponent fiber is formed from a polylactide or other bio-based polyester and one or more other materials that are not a polylactide or bio-based polyester, wherein the polylactide or other bio-based polyester is the sacrificial polymer and the non-polylactide is the non-sacrificial polymer. In one embodiment, the sacrificial polymer is one or more of a polyolefin, polyamide, polycarbonate, and polyester, and the swelling agent is one or more of alcohols, aldehydes, ketones, acids, bases, aliphatic hydrocarbons, aromatic hydrocarbons, esters, ethers, heterocycles, water, or mixtures thereof.

It will be understood by one of ordinary skill in the art that this is a non-limiting list of chemical compounds and chemical compound combinations. Furthermore, these sacrificial and non-sacrificial polymers are operable to be processed into multicomponent fibers, including bicomponent and tricomponent fibers, in configurations including, but not limited to, islands-in-the-sea fibers, core-sheath-islands-in-the-sea fibers, core-sheath fibers, eccentric core-sheath fibers, side-by-side core-sheath fibers, pie-wedge fibers, hollow pie-wedge fibers, bowtie fibers, oval fibers, ribbon fibers, rectangular fibers, multi-lobed fibers, hollow fibers, and any other configuration operable to produce the desired polymer properties for the non-sacrificial polymer recovered after processing, including polymer fiber segments of the aforementioned cross-sections, and wherein the sacrificial component is either an exterior component of the multicomponent fiber or an interior component of the multicomponent fiber.

In another embodiment, a polymer is used as a sacrificial polymer in a multicomponent fiber, and once separated from a non-sacrificial polymer with the solvent, recovered, washed, and dried, is re-used as the non-sacrificial polymer in a second multicomponent fiber. By way of example, an islands-in-the-sea bicomponent fiber is formed from PP and polyamide 6, wherein PP is the sea component and polyamide 6 is the island fiber component, where the PP sea is the sacrificial polymer and is separated from the non-sacrificial polyamide 6 island fiber. The PP sea is recovered and reused in the fiber production process or is operable to be reused as the non-sacrificial polymer in a multicomponent fiber where PP is the non-sacrificial polymer and PET is the sacrificial polymer.

FIGS. 3-9 provide scanning electron microscopy (SEM) images of polymer fibers and powders according to various embodiments of the present invention. SEM produces images of a sample, such as a polymer fiber, by scanning across the surface with a focused beam of electrons, providing information about the surface topography. By using electrons rather than light, as in traditional light microscopy, much higher resolution images are operable to be captured, with some scanning electron microscopes able to achieve resolution of one nanometer or better.

Figure 3:
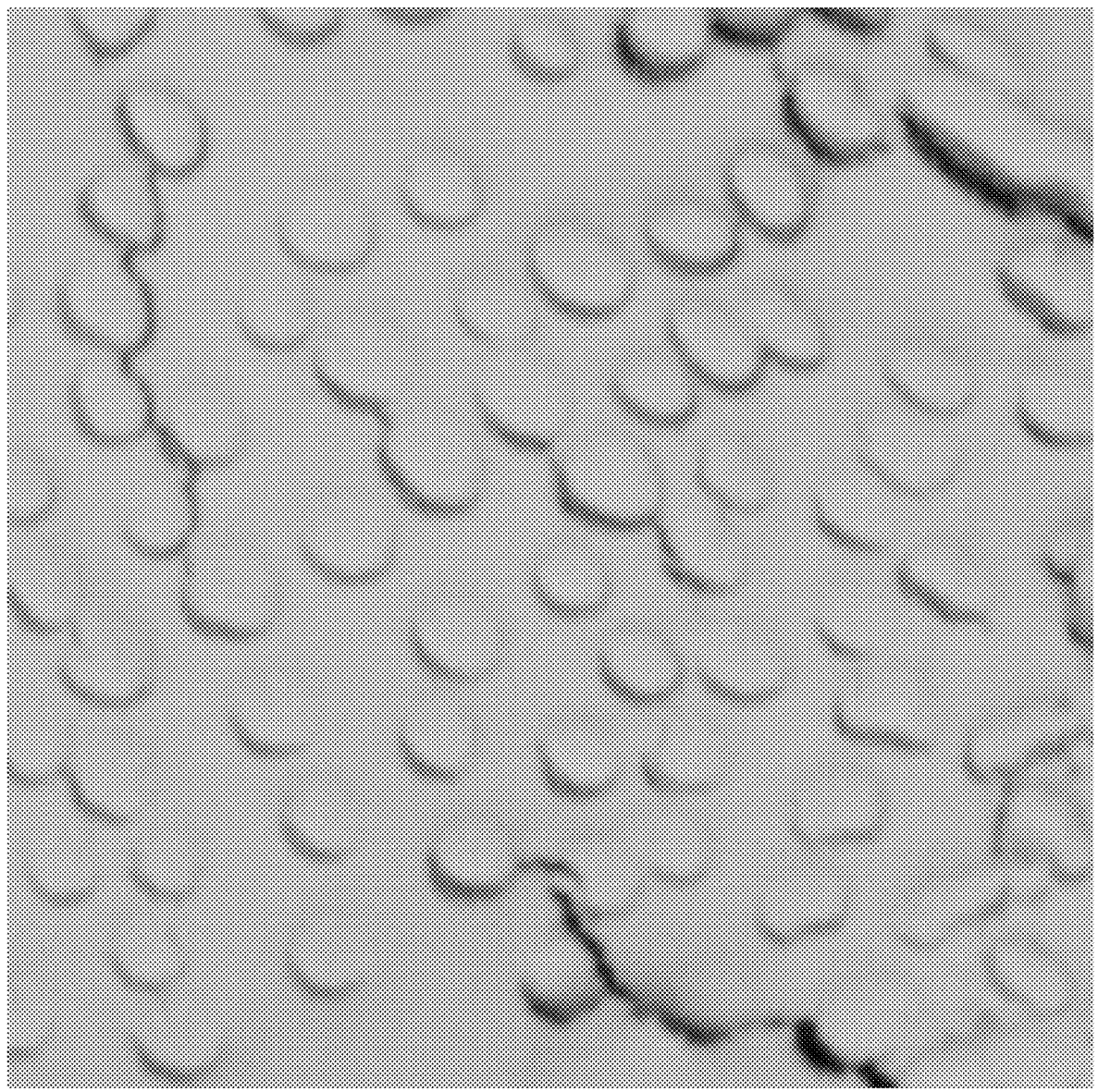
FIG. 3 shows a scanning electron microscopy image of a multicomponent fiber, according to one embodiment of the present invention.
Figure 4:
FIG. 4 shows a scanning electron microscopy image of a separated polymer fiber, according to one embodiment of the present invention.
Figure 5:
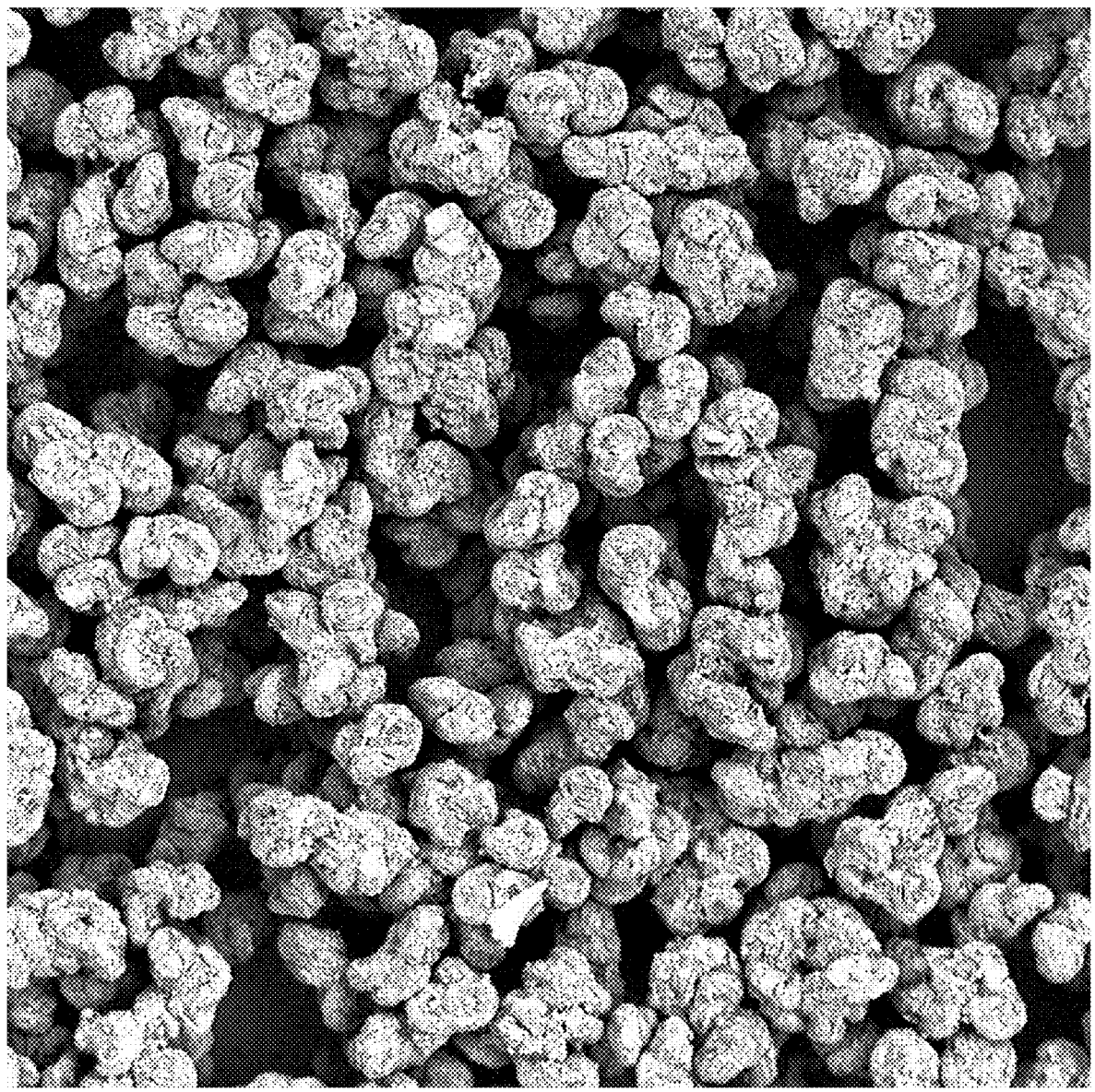
FIG. 5 shows a scanning electron microscopy image of a recycled polymer in powder form, according to one embodiment of the present invention.

FIG. 3 is an SEM image representing an islands-in-the-sea bicomponent fiber formed from PLA and PP, wherein PLA is the sacrificial sea component and PP is the non-sacrificial island component. In this image, the bicomponent fiber is recently formed and measurements have been taken of the diameters of the PP non-sacrificial island fibers within the sea. In this embodiment, the measured PP non-sacrificial island fibers have a diameter range of about 0.57 µm to about 0.8 µm, and an average diameter of about 0.71 µm (n=18). In one embodiment, solvent is used to separate the PP non-sacrificial islands from the PLA sea and the solvent, non-sacrificial PP, and sacrificial PLA are all recovered. FIG. 4 shows an SEM image of the recovered PP non-sacrificial polymer fibers wherein the representative fibers have been measured as having a diameter range of about 0.344 µm to about 0.768 µm, and an average diameter of about 0.638 µm (n=10). In one embodiment, the PLA sacrificial polymer is recovered in a powder form, shown in FIG. 5 as an SEM image with powder particles of the recovered sacrificial polymer with diameters of under 50 µm.

Figure 6:
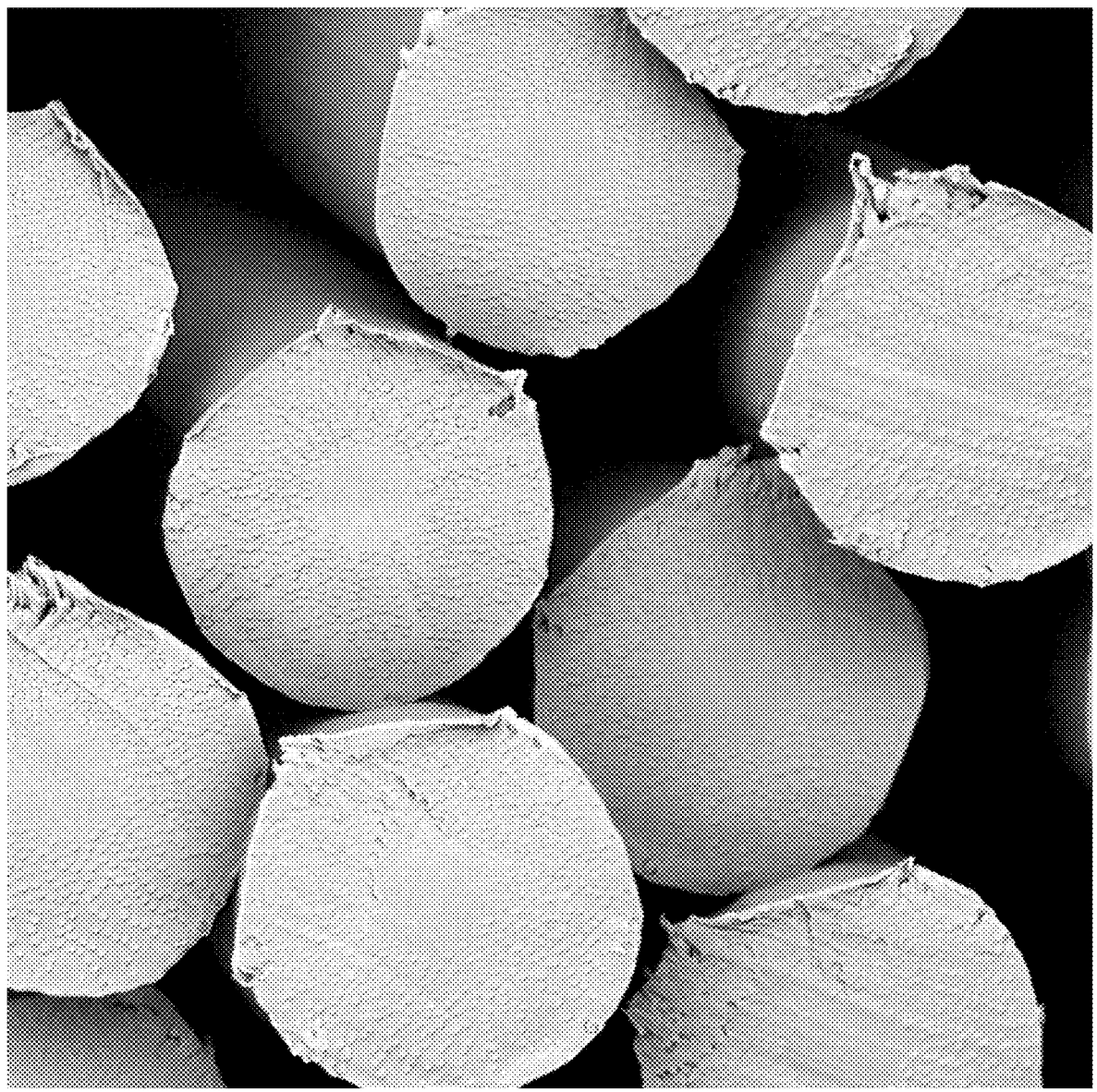
FIG. 6 shows a scanning electron microscopy image of multicomponent fibers, according to one embodiment of the present invention.
Figure 7:
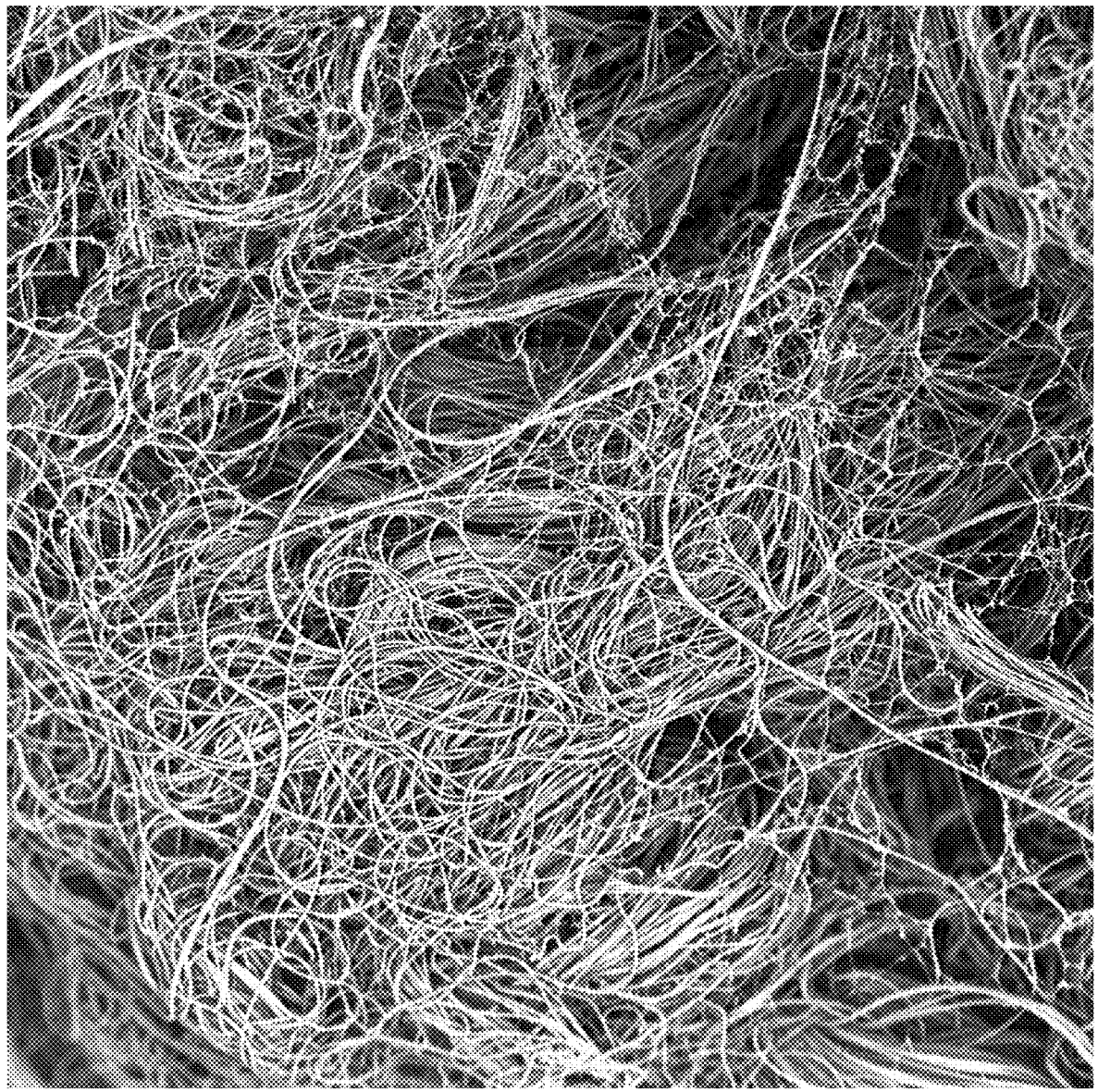
FIG. 7 shows a scanning electron microscopy image of a separated polymer fiber, according to one embodiment of the present invention.
Figure 8A:
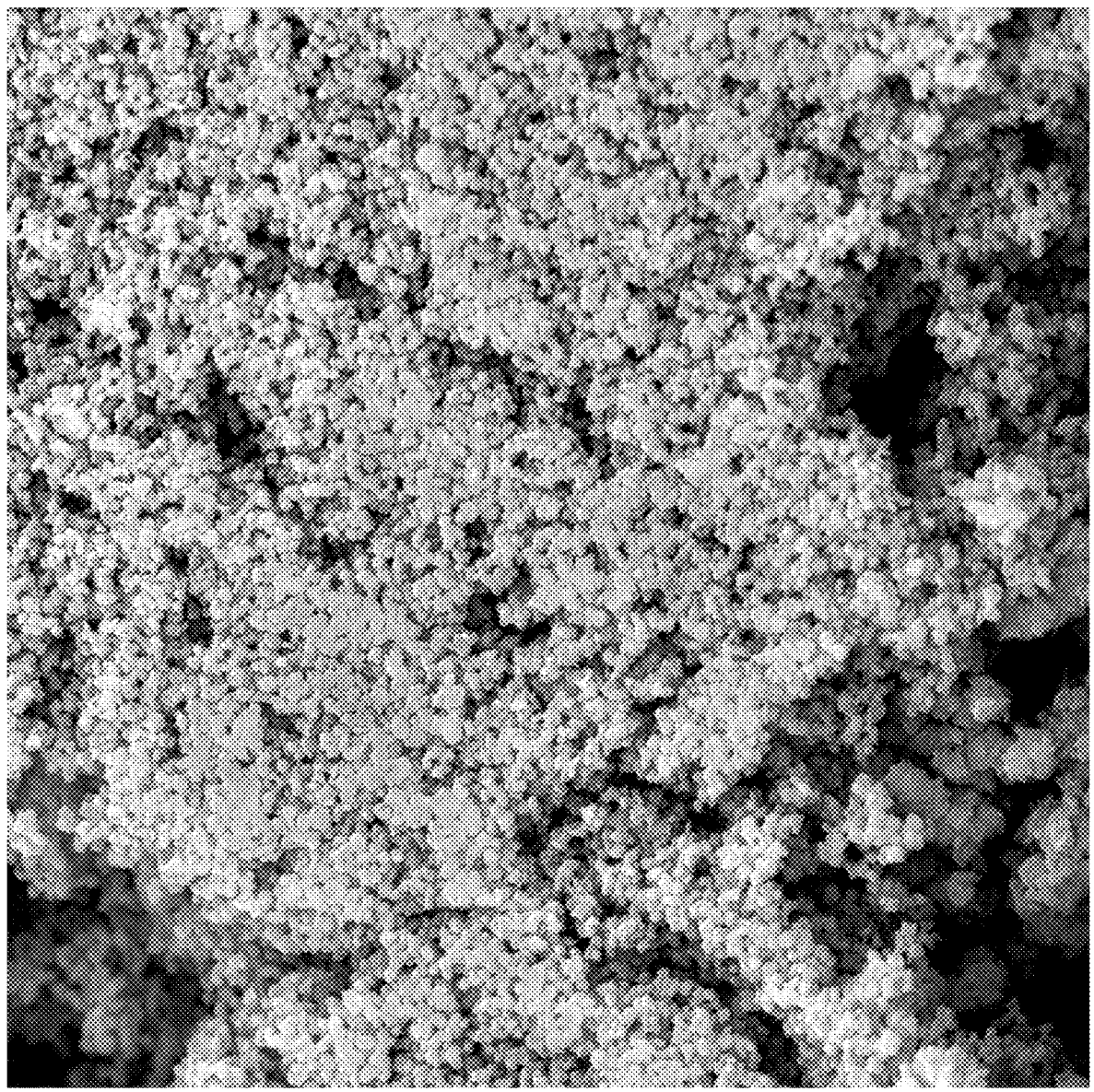
FIG. 8A shows a scanning electron microscopy image of a recycled polymer in powder form, according to one embodiment of the present invention.
Figure 8B:
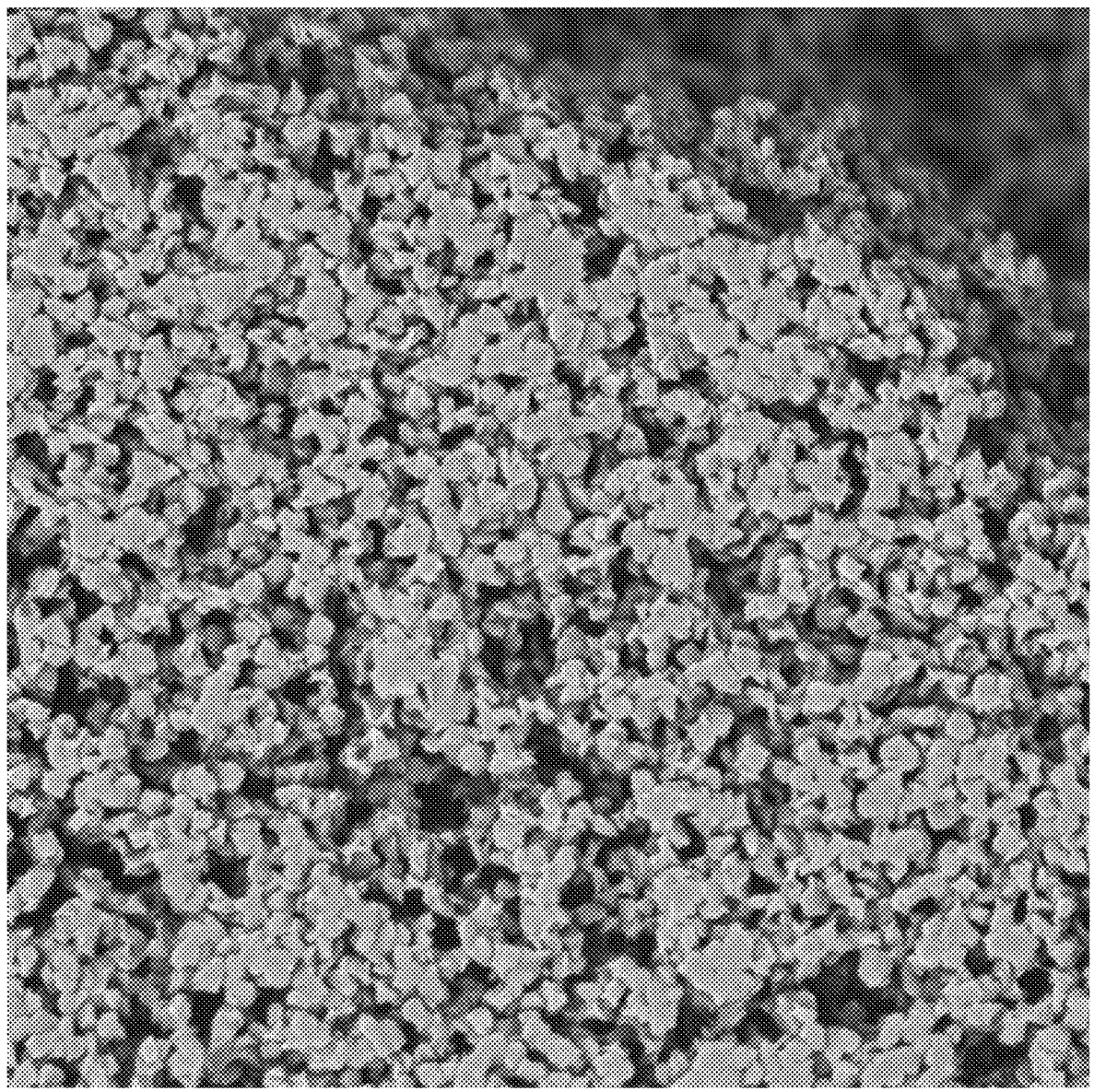
FIG. 8B shows a scanning electron microscopy image of a recycled polymer in powder form, according to one embodiment of the present invention.

FIG. 6 is an SEM image representing an islands-in-the-sea bicomponent fiber formed from PA6 and PP, wherein PP is the sacrificial sea component and PA6 is the non-sacrificial island component. In this image, the bicomponent fiber is recently formed, and multiple cut strands of the fiber can be seen to illustrate the amount of islands in the sea of this particular embodiment. FIG. 7 is an SEM image of the recovered PA6 fibers, which are of the submicron level in diameter, wherein representative fibers were measured as having a diameter range of about 0.750 µm to about 1.010 µm, and an average diameter of about 0.854 µm (n=10). In one embodiment, the PP sacrificial polymer is recovered in powder form, shown in FIGS. 8A and 8B as SEM images of the powder particles of the recovered sacrificial PP. The SEM images show the recovered sacrificial PP powder at different resolutions, 2800× and 6200× respectively, which illustrate the powder particles as having diameters of less than about 2 µm.

Figure 9:
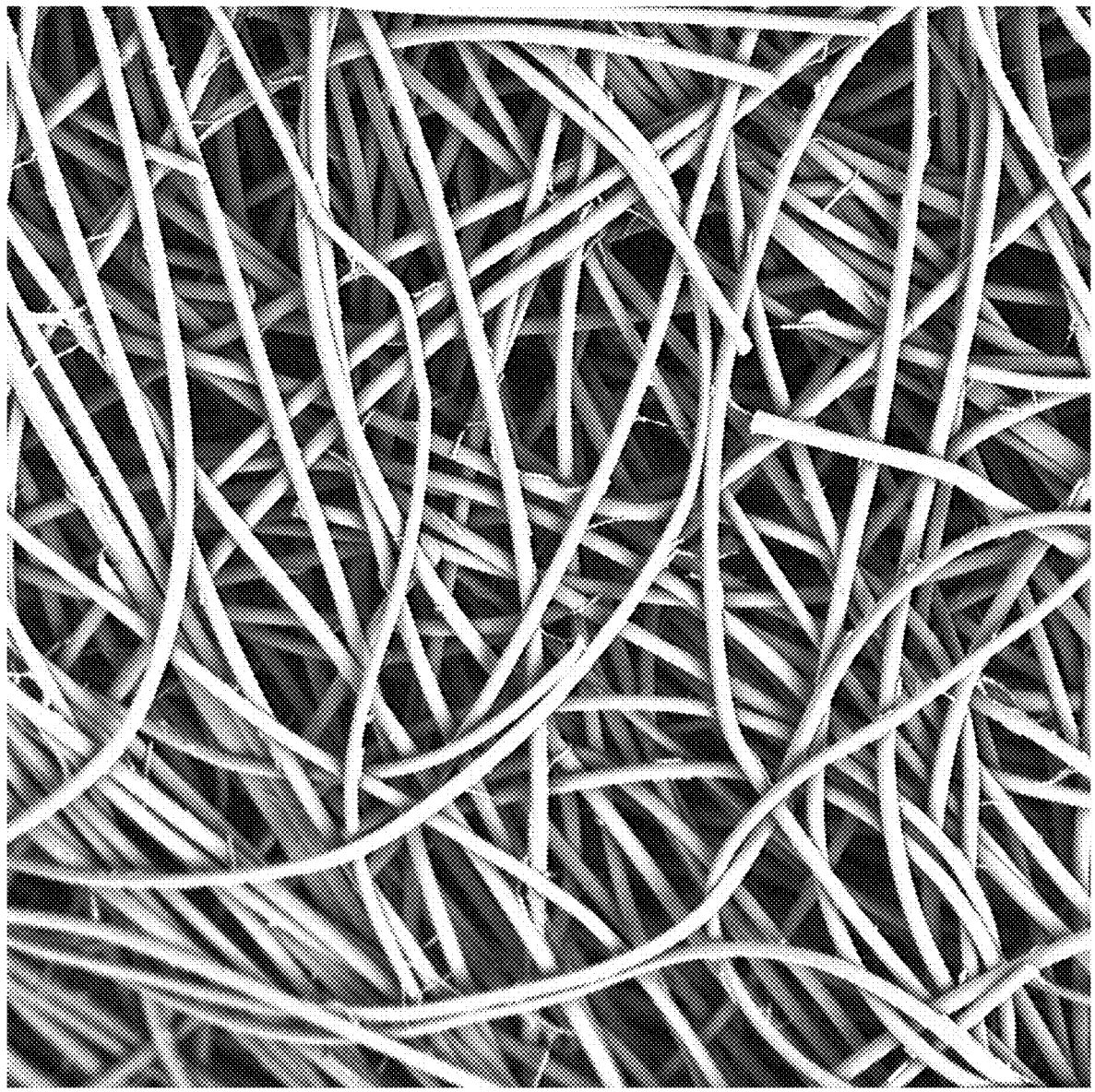
FIG. 9 shows a scanning electron microscopy image of a separated polymer fiber, according to one embodiment of the present invention.

In another exemplary embodiment, a bicomponent fiber is formed from PA66 and PP, wherein PA66 is the non-sacrificial polymer and is separated from the sacrificial PP. The PP is recovered and reused in the fiber production process or is operable to be sold as pellets, granules, or powder. A solvent is used to separate the PA66 and PP, and the solvent is recovered and reused in the fiber production process. The PA66 non-sacrificial polymer fiber is also recovered, and is seen in FIG. 9, which shows an SEM image of PA66 fibers on the micron scale, wherein representative PA66 fibers were measured as having a diameter range of about 2.521 µm to about 3.018 and an average diameter of about 2.834 µm (n=10)

Figure 10:
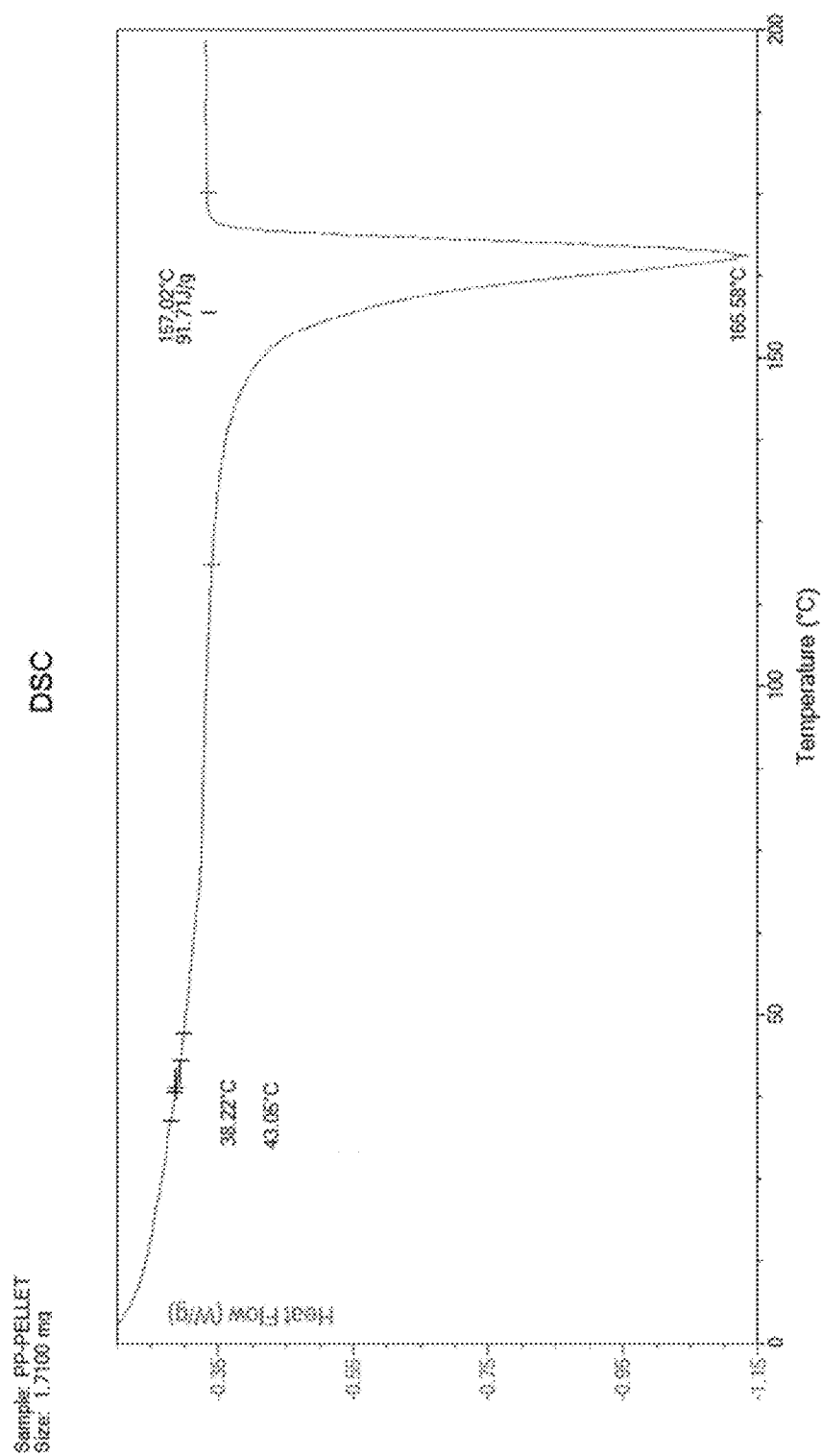
FIG. 10 shows differential scanning calorimetry results of measuring the melting temperature of a virgin polymer, according to one embodiment of the present invention.
Figure 11:
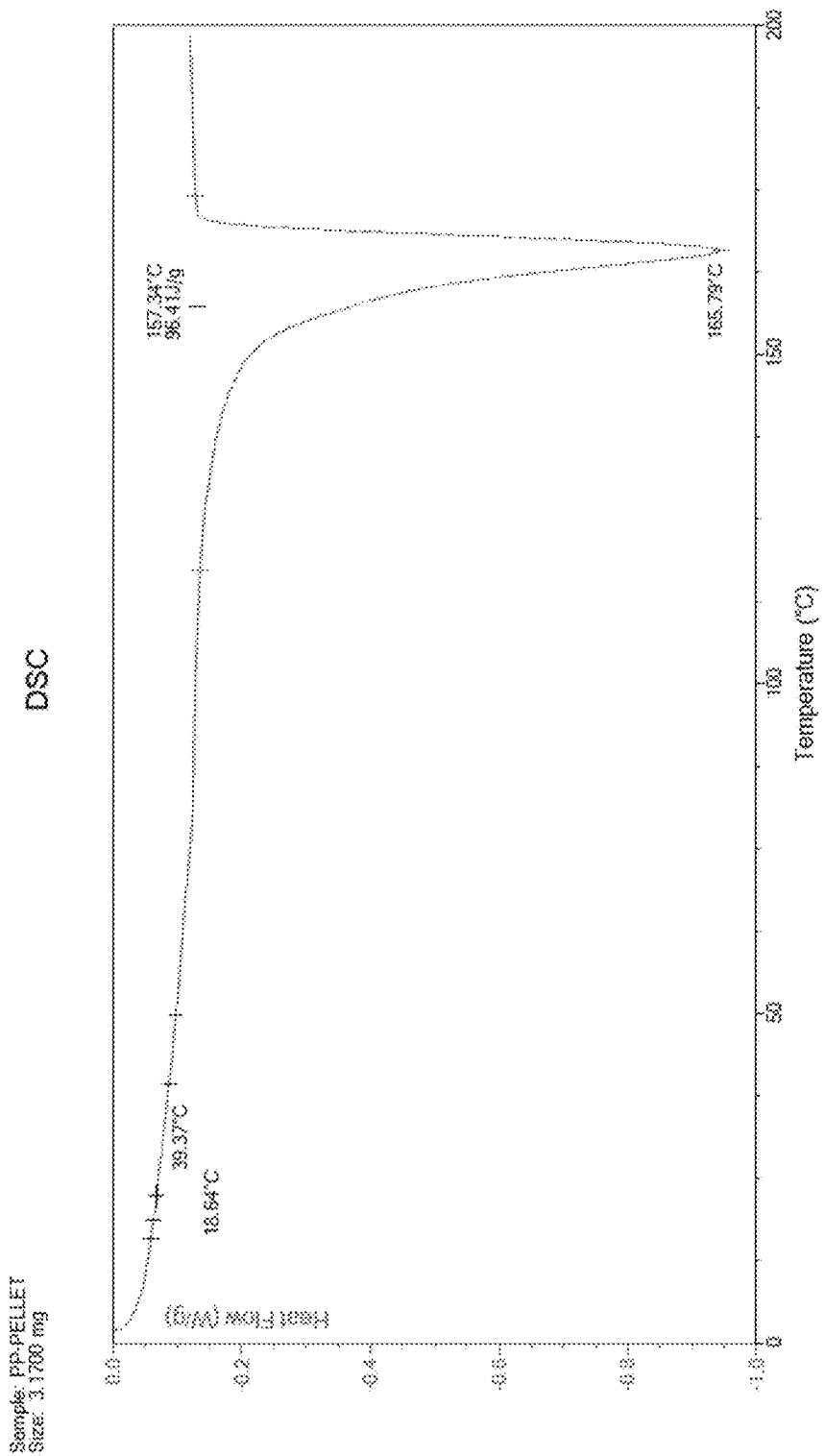
FIG. 11 shows differential scanning calorimetry results of measuring the melting temperature of a virgin polymer, according to one embodiment of the present invention.
Figure 12:
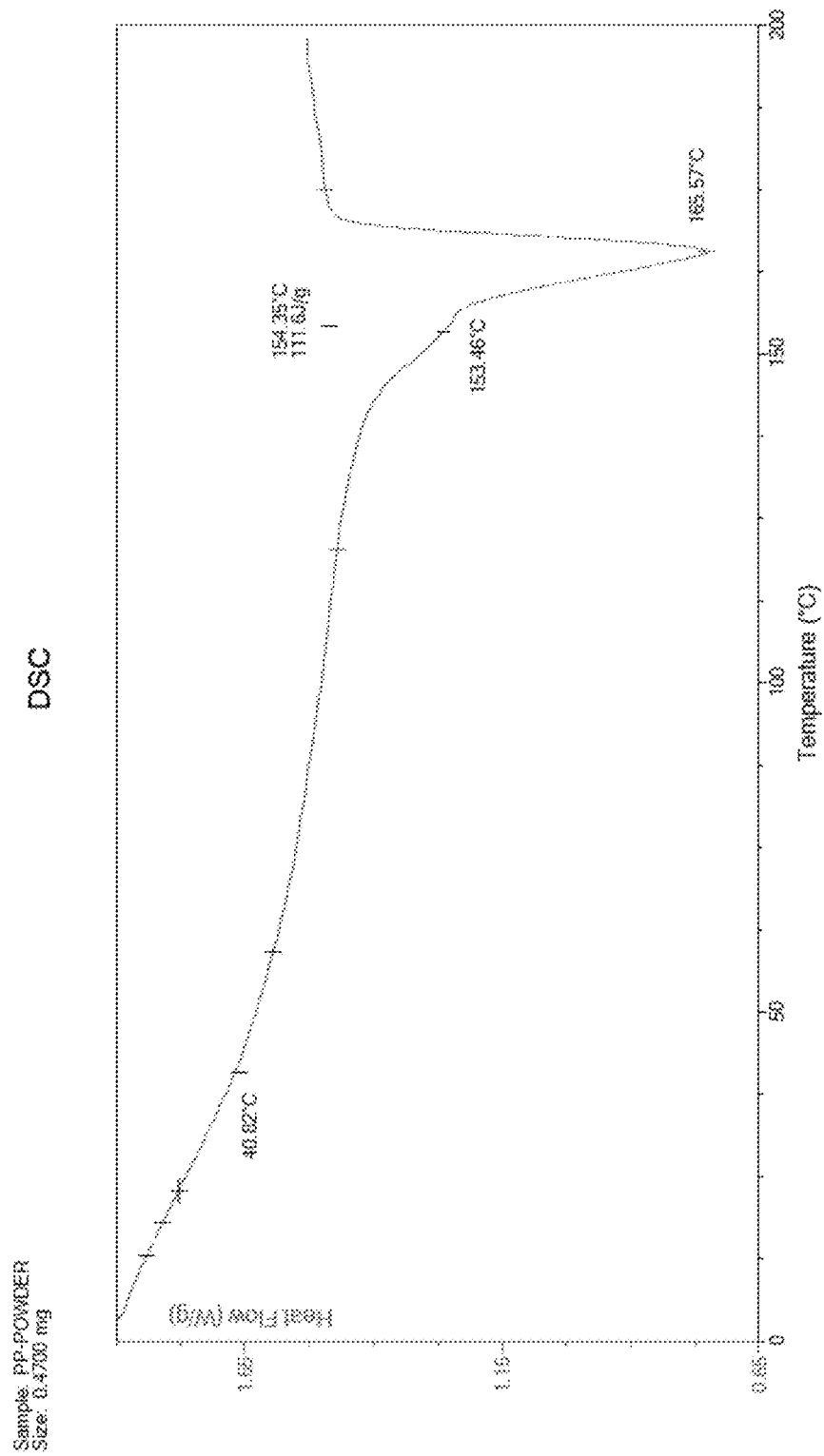
FIG. 12 shows differential scanning calorimetry results of measuring the melting temperature of a recovered polymer, according to one embodiment of the present invention.
Figure 13:
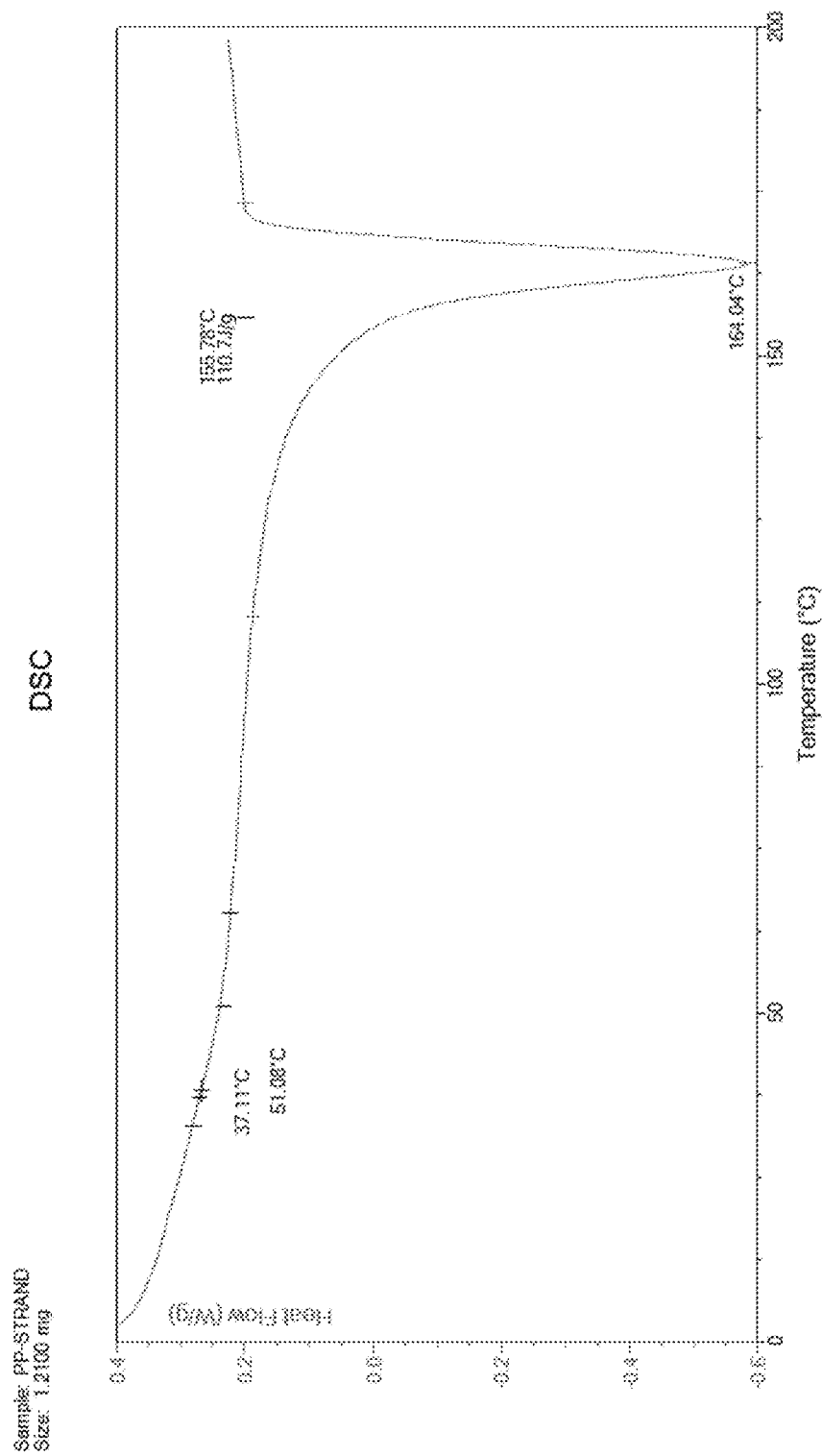
FIG. 13 shows differential scanning calorimetry results of measuring the melting temperature of a recovered polymer, according to one embodiment of the present invention.
Figure 14:
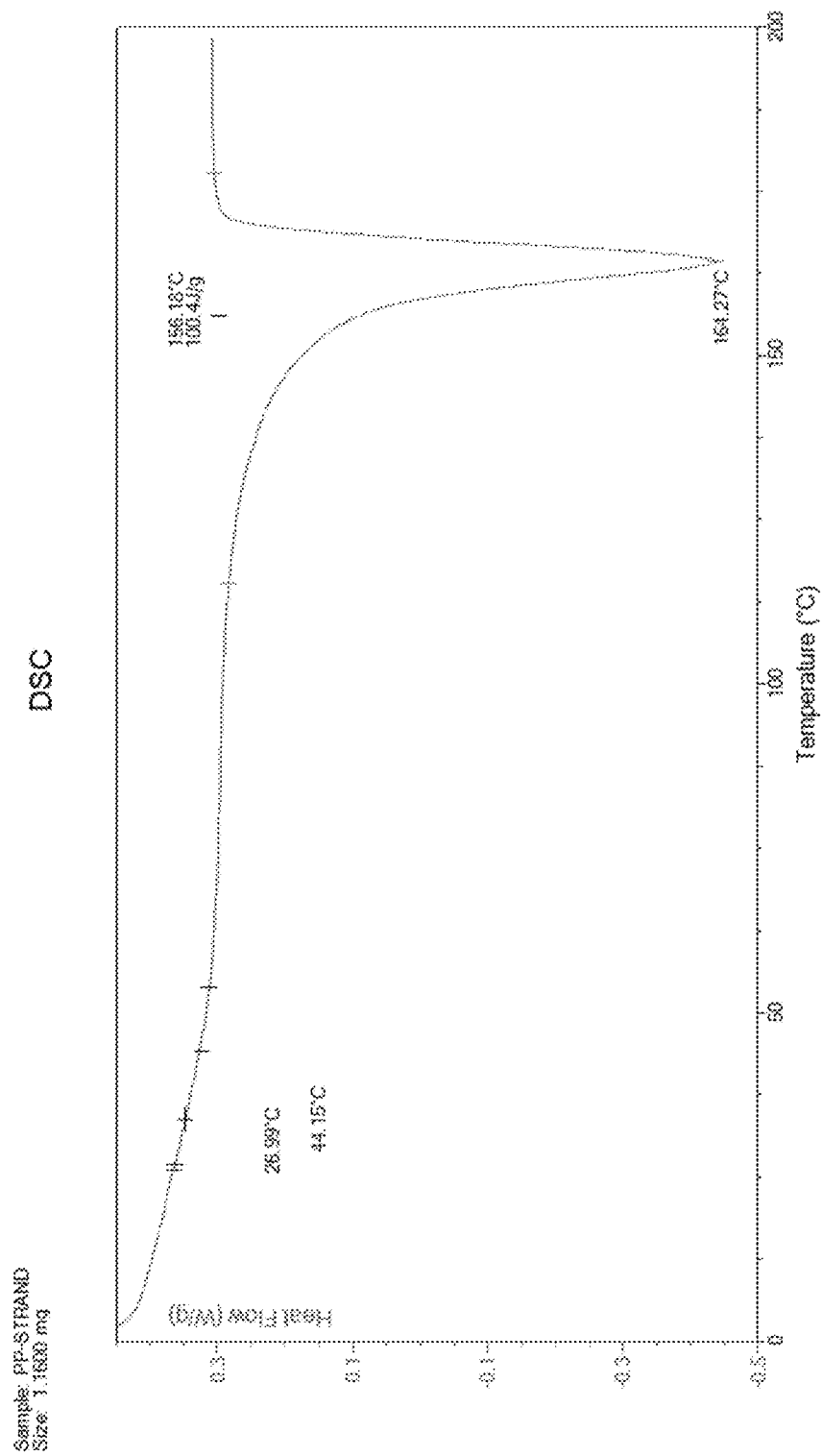
FIG. 14 shows differential scanning calorimetry results of measuring the melting temperature of a recovered polymer, according to one embodiment of the present invention.
Figure 15:
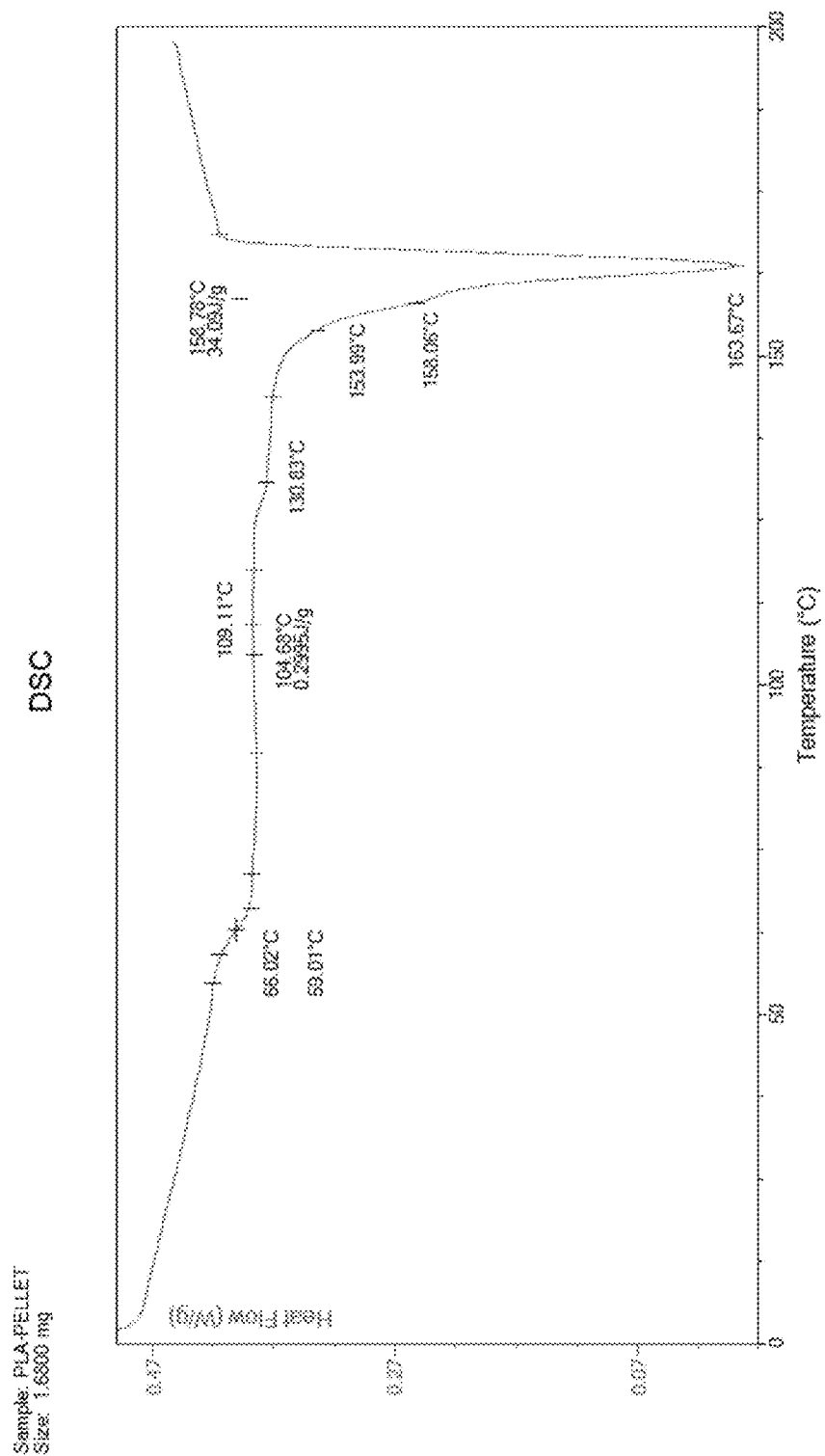
FIG. 15 shows differential scanning calorimetry results of measuring the melting temperature of a virgin polymer, according to one embodiment of the present invention.
Figure 16:
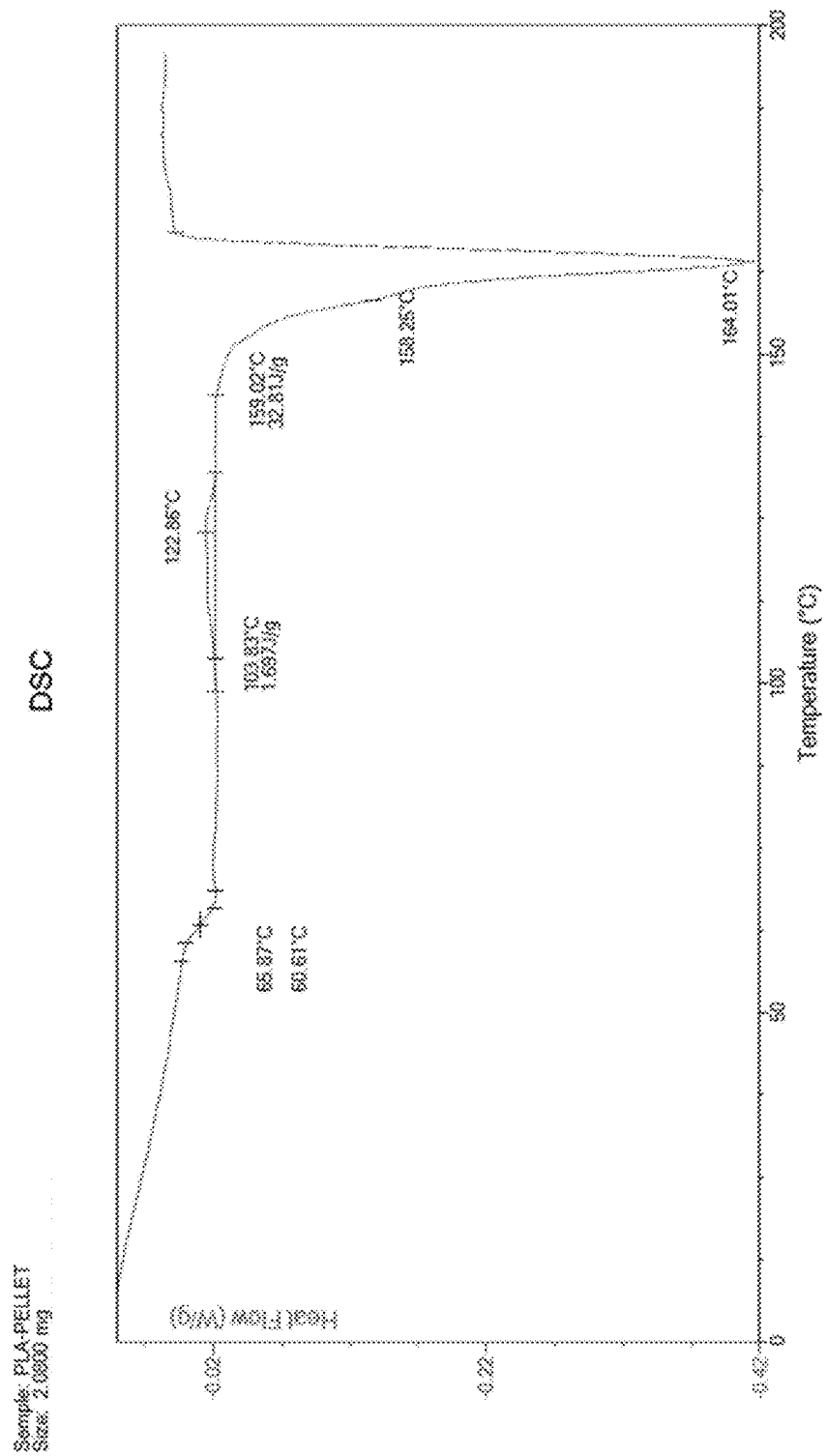
FIG. 16 shows differential scanning calorimetry results of measuring the melting temperature of a virgin polymer, according to one embodiment of the present invention.
Figure 17:
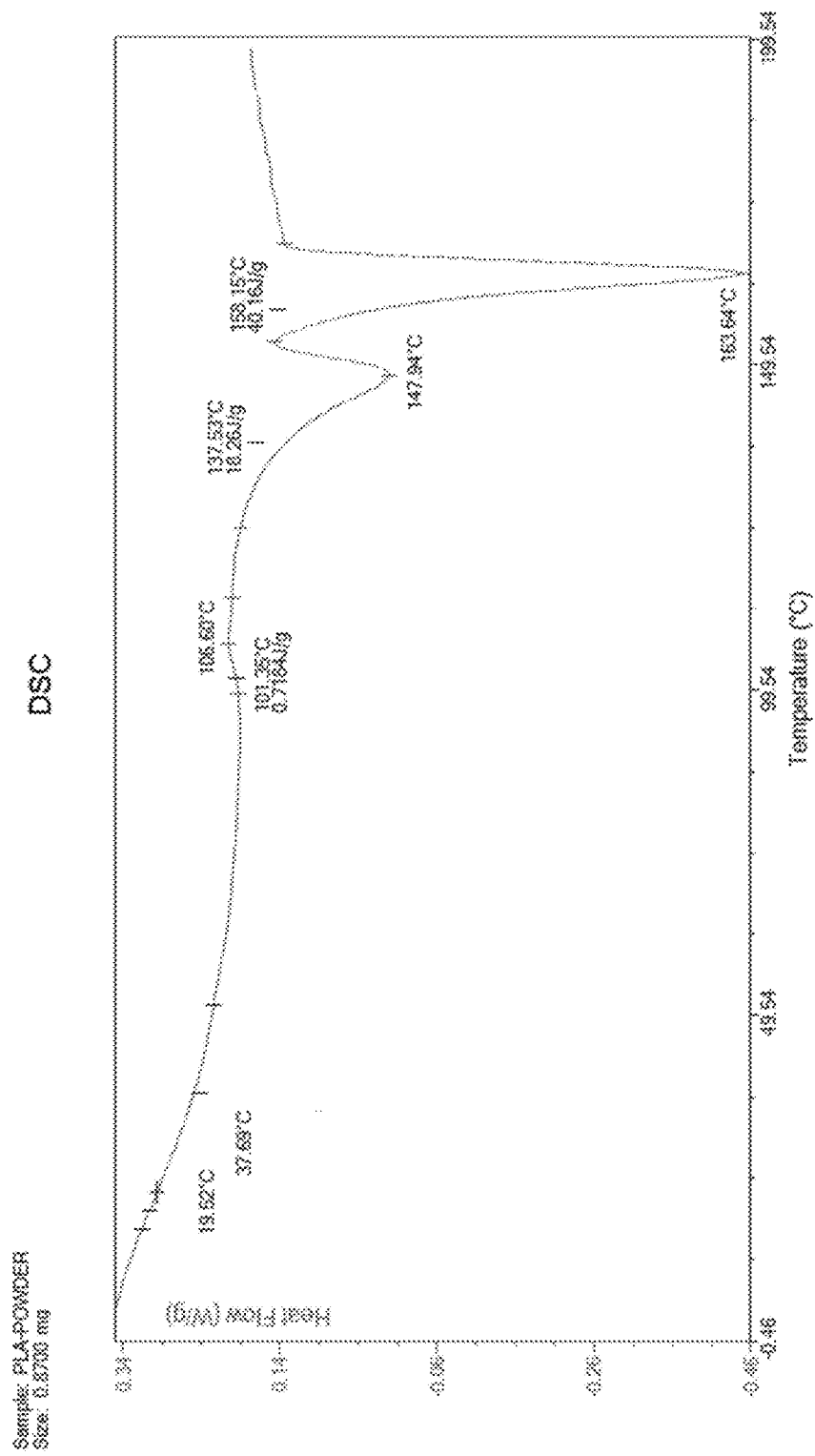
FIG. 17 shows differential scanning calorimetry results of measuring the melting temperature of a recovered polymer, according to one embodiment of the present invention.
Figure 18:
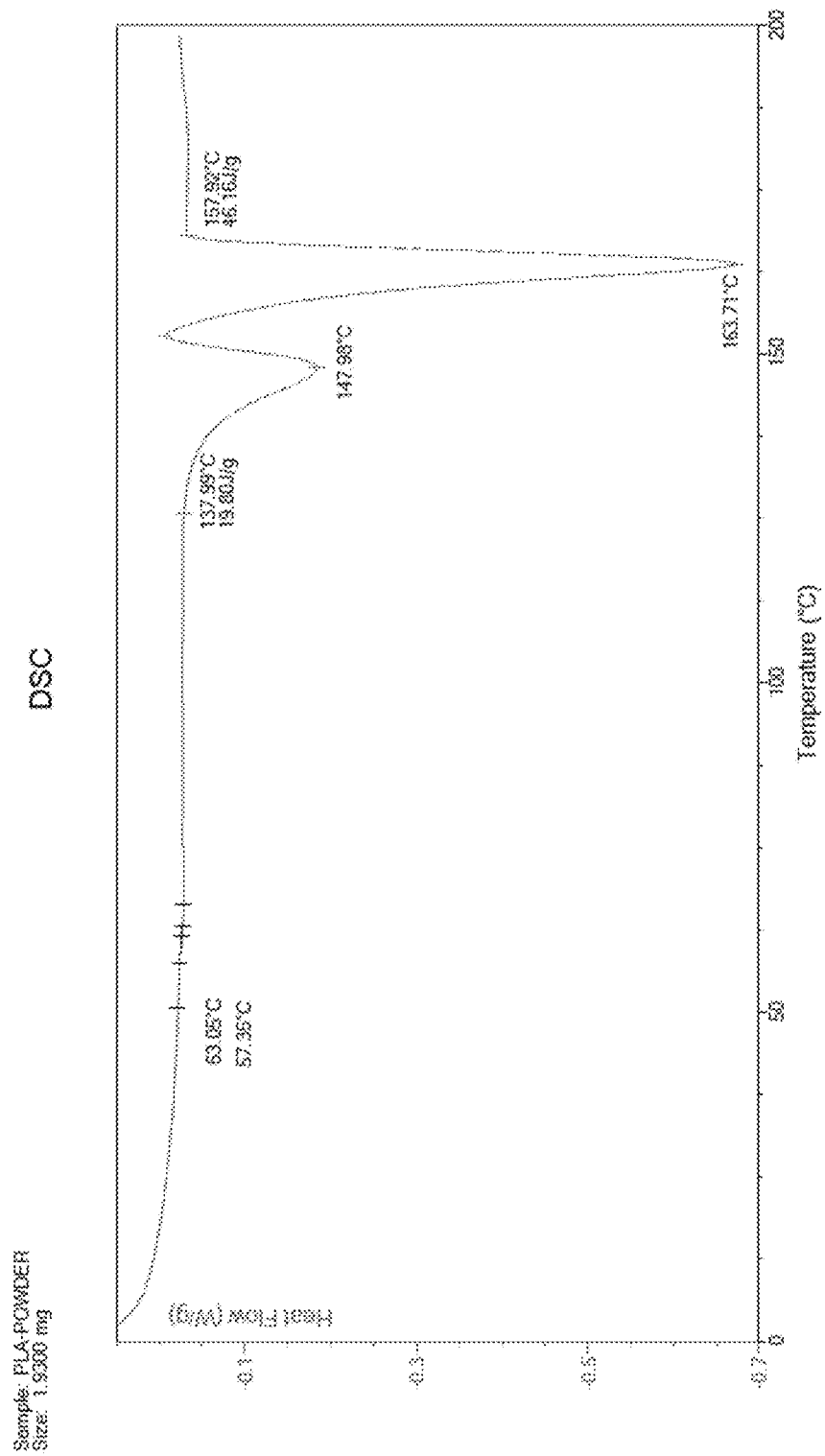
FIG. 18 shows differential scanning calorimetry results of measuring the melting temperature of a recovered polymer, according to one embodiment of the present invention.
Figure 19:
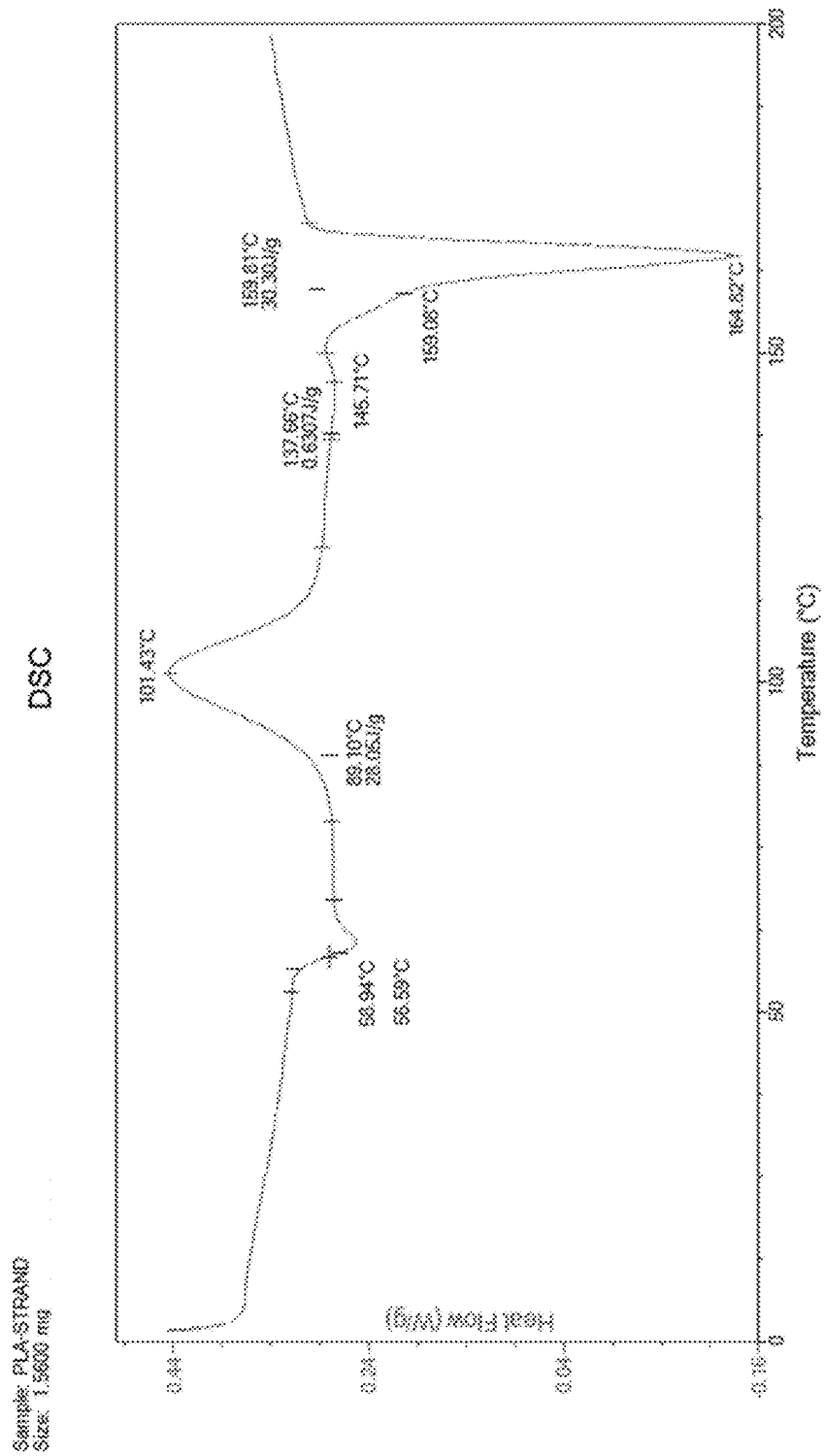
FIG. 19 shows differential scanning calorimetry results of measuring the melting temperature of a recovered polymer, according to one embodiment of the present invention.
Figure 20:
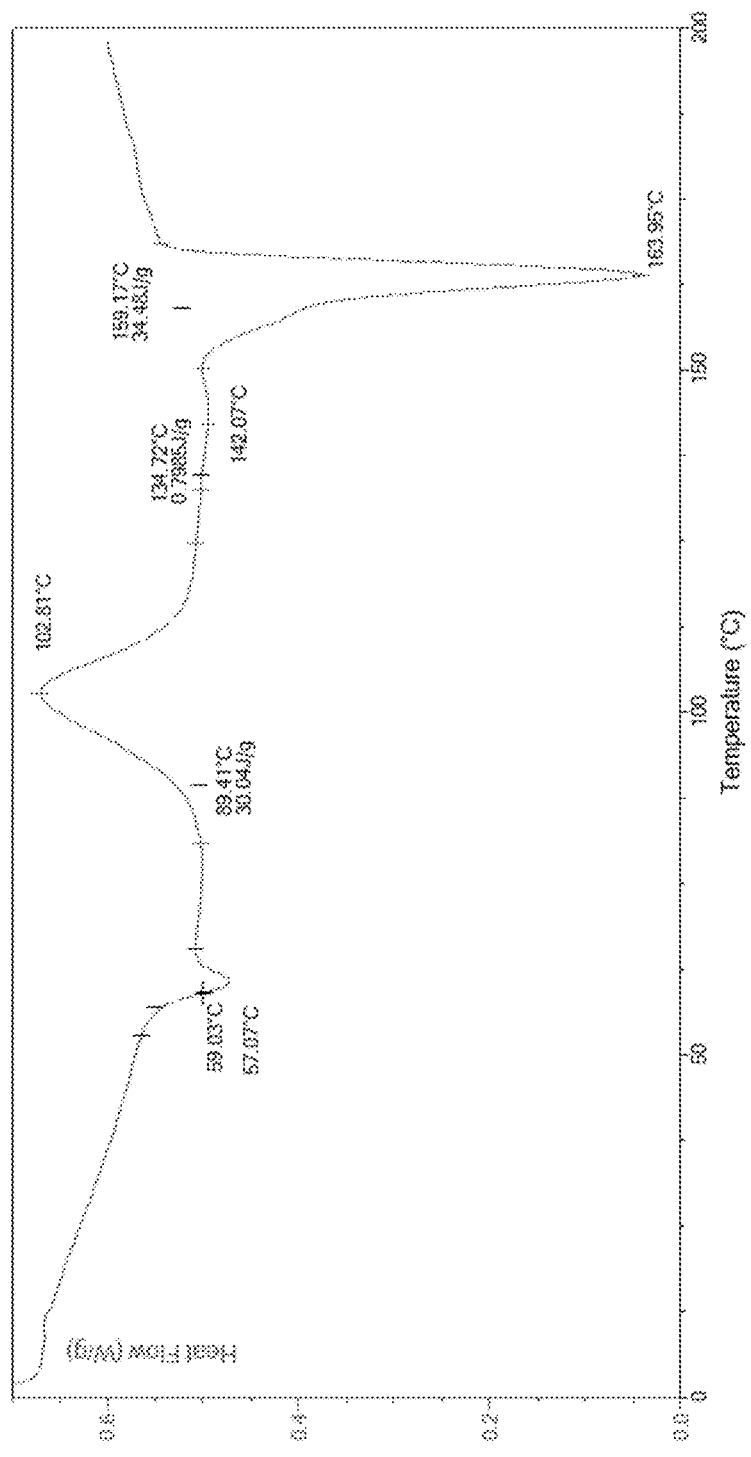
FIG. 20 shows differential scanning calorimetry results of measuring the melting temperature of a recovered polymer, according to one embodiment of the present invention.

FIGS. 10-20 show the results of differential scanning calorimetry (DSC), a test which determines the amount of heat required to raise the temperature of a targeted sample and reference sample, measured as a function of temperature. DSC is commonly used to determine thermal transition temperatures of polymers, such as the glass transition temperature, crystallization temperature, and melting temperature, which are easy to use metrics to compare materials. DSC can also be valuable to revealing polymer degradation or change, which is often indicated by a significant change in the melting temperature of the material. In the present invention, DSC was performed to compare the melting temperatures of virgin sacrificial polymers with the melting temperatures of recovered sacrificial polymers of the same polymer to evaluate whether significant change in polymer melting temperature had occurred, and was performed using a DSC Q1000 V9.9 BUILD 3.3 on Jan. 24, 2020. FIGS. 10 and 11 illustrate DSC results for virgin polypropylene (PP) granules, which in one embodiment are NEXEO BRASKEM PP HP CP360H, and have a measured melting point of about 165.7 degrees Celsius. FIG. 12 illustrates DSC results for recovered sacrificial PP powder, in this case recovered from a multicomponent fiber wherein the sacrificial polymer was virgin NEXEO BRASKEM PP HP CP360H, and the recovered PP powder has a measured melting point of about 165.6 degrees Celsius. Notably, this polypropylene is a homopolymer. This is an about 0.06% difference in melting temperature compared to the virgin polymer. FIGS. 13 and 14 illustrate DSC results for recovered sacrificial PP strands, in this case recovered from a multicomponent fiber wherein the sacrificial polymer was virgin NEXEO BRASKEM PP HP CP360H, and the recovered PP strands have a measured melting point of about 164.3 degrees Celsius, or an about 0.84% difference in melting temperature compared to the virgin polymer. FIGS. 15 and 16 illustrate DSC results for virgin polylactic acid (PLA) granules, which in one embodiment are NATUREWORKS INGEO 6202D, and have a measured melting point of about 163.8 degrees Celsius. FIGS. 17 and 18 illustrate DSC results for recovered sacrificial PLA powder, in this case recovered from a multicomponent fiber wherein the sacrificial polymer was virgin NATUREWORKS INGEO 6202D, and the recovered PLA powder has a measured melting point of about 163.7 degrees Celsius, or an about 0.06% difference in melting temperature compared to the virgin polymer. FIGS. 19 and 20 illustrate DSC results for recovered sacrificial PLA strands, in this case recovered from a multicomponent fiber wherein the sacrificial polymer was virgin NATUREWORKS INGEO 6202D, and the recovered PLA strands have a measured melting point of about 164.4 degrees Celsius, or an about 0.37% difference in melting temperature compared to the virgin polymer. These DSC results indicate the ability of the present invention to recover a sacrificial polymer with a melting temperature that has not been significantly changed by the recycling process. In one embodiment of the present invention, the melting temperature of recovered sacrificial polymer is within 10% of the melting temperature of a virgin polymer of the same chemical formula, which is operable to be the sacrificial polymer used in the initial spinning of the multicomponent fiber. In another embodiment, the melting temperature of the recovered sacrificial polymer is within 5% of the melting temperature of a virgin polymer of the same chemical formula. In a preferred embodiment of the present invention, the melting temperature of recovered sacrificial polymer is within 1% of the melting temperature of a virgin polymer of the same chemical formula.

The above-mentioned examples are provided to serve the purpose of clarifying the aspects of the invention, and it will be apparent to one skilled in the art that they do not serve to limit the scope of the invention. By nature, this invention is highly adjustable, customizable, and adaptable. For example, this invention is highly adjustable, customizable, and adaptable with regards to polymer combinations used to produce multicomponent fibers. The above-mentioned examples are just some of the many configurations that the mentioned components can take on. All modifications and improvements have been deleted herein for the sake of conciseness and readability but are properly within the scope of the present invention.

The invention claimed is:

1. A method for separating fibers from a multicomponent fiber including at least one sacrificial polymer and at least one non-sacrificial fiber, comprising:
   exposing the multicomponent fiber to at least one swelling agent or at least one solvent operable to selectively dissolve the at least one sacrificial polymer;
   upon dissolution of the at least one sacrificial polymer, separating and recovering the at least one non-sacrificial fiber from the at least one solvent and the at least one dissolved sacrificial polymer;
   separating the at least one dissolved sacrificial polymer from the at least one swelling agent or the at least one solvent;
   upon separation of the at least one separated sacrificial polymer, washing, washing and drying, or drying the at least one separated sacrificial polymer, wherein the at least one separated sacrificial polymer is recovered as macromolecules and is therefore operable to be recycled and re-spun;
   recovering greater than about 90% of the at least one swelling agent or the at least one solvent, wherein the at least one recovered swelling agent or the at least one recovered solvent is operable to be reused to dissolve the at least one separated sacrificial polymer in a second multicomponent fiber;
   producing the second multicomponent fiber from the at least one separated sacrificial polymer and at least one second non-sacrificial fiber;

exposing the second multicomponent fiber to the at least one swelling agent or the at least one solvent operable to selectively dissolve the at least one separated sacrificial polymer to dissolve the at least one separated sacrificial polymer;

upon dissolution of the at least one separated sacrificial polymer, separating and recovering the at least one second non-sacrificial fiber from the at least one swelling agent or the at least one solvent and the at least one dissolved sacrificial polymer;

separating the at least one separated sacrificial polymer from the at least one swelling agent or the at least one solvent;

upon separation of the at least one separated sacrificial polymer, washing, washing and drying, or drying the at least one separated sacrificial polymer, wherein the at least one separated sacrificial polymer is recovered as macromolecules and is therefore operable to be further recycled and re-spun; and recovering greater than about 90% of the at least one recovered swelling agent or the at least one recovered solvent, wherein the at least one recovered swelling agent is operable to be reused to dissolve the at least one separated sacrificial polymer;

thereby recycling the at least one separated sacrificial polymer and the at least one recovered swelling agent or the at least one recovered solvent.

2. The method of claim 1, further comprising processing the multicomponent fiber into multicomponent fiber segments prior to exposing the multicomponent fiber to the at least one swelling agent or the at least one solvent, and separating the non-sacrificial fiber segments from the at least one swelling agent or at the least one solvent and the at least one dissolved sacrificial polymer, and separating the non-sacrificial fiber segments from the at least one swelling agent or the at least one solvent and the at least one dissolved sacrificial polymer by washing, washing and drying, or drying.

3. The method of claim 1, further comprising weaving or knitting the multicomponent fiber into a multicomponent fabric material prior to exposing the multicomponent fiber to the at least one swelling agent or the at least one solvent, and separating and recovering the non-sacrificial fiber from the at least one swelling agent or the at least one solvent and the at least one dissolved sacrificial polymer.

4. The method of claim 1, further comprising processing the multicomponent fiber into a multicomponent nonwoven material prior to exposing the multicomponent fiber to the at least one swelling agent or the at least one solvent, and separating and recovering the non-sacrificial fiber from the at least one swelling agent or the at least one solvent and the at least one dissolved sacrificial polymer.

5. The method of claim 1, further comprising processing the multicomponent fiber into multicomponent fiber segments and processing the multicomponent fiber segments into a multicomponent nonwoven material prior to exposing the multicomponent fiber to the at least one swelling agent or the at least one solvent, and separating and recovering the non-sacrificial fiber from the at least one swelling agent or the at least one solvent and the at least one dissolved sacrificial polymer.

6. The method of claim 1, further comprising recovering the at least one separated sacrificial polymer in fine particle or granule form.

7. The method of claim 1, wherein the at least one separated sacrificial polymer is blended with at least one virgin sacrificial polymer to create a blended sacrificial polymer, and then producing the second multicomponent fiber from the blended sacrificial polymer and at least one second non-sacrificial fiber.

8. The method of claim 1, further comprising adding chemical additives or physical additives to the at least one non-sacrificial fiber while recovering the at least one non-sacrificial fiber, wherein the chemical additives or physical additives include dispersants, lubricants, or surface finishes.

9. The method of claim 1, wherein the melting temperature of the at least one separated sacrificial polymer is within 5% of the melting temperature of the at least one sacrificial polymer.

10. The method of claim 1, further comprising adding chemical additives or physical additives to the at least one separated sacrificial polymer during, during and after, or after separation of the sacrificial polymer and during washing, washing and drying, or drying of the at least one sacrificial polymer, wherein the chemical additives or physical additives include stabilizers, lubricants, antioxidants, and dyes.

11. A method for separating fibers from a multicomponent fiber including at least one sacrificial polymer and at least one non-sacrificial fiber, comprising:

exposing the multicomponent fiber to at least one solvent or swelling agent operable to selectively dissolve the at least one sacrificial polymer;

upon dissolution of the at least one sacrificial polymer, separating and recovering the at least one non-sacrificial fiber from the at least one solvent or swelling agent and the at least one dissolved sacrificial polymer;

separating and recovering the at least one dissolved sacrificial polymer from the at least one solvent or swelling agent;

upon separation of the at least one dissolved sacrificial polymer, washing, washing and drying, or drying the at least one recovered sacrificial polymer;

recovering the at least one solvent or swelling agent, wherein the at least one recovered solvent or swelling agent is operable to be reused to dissolve the at least one recovered sacrificial polymer in a second multicomponent fiber;

producing the second multicomponent fiber from the at least one recovered sacrificial polymer and at least one second non-sacrificial fiber;

exposing the second multicomponent fiber to the at least one solvent or swelling agent operable to selectively dissolve the at least one recovered sacrificial polymer to dissolve the at least one recovered sacrificial polymer;

upon dissolution of the at least one recovered sacrificial polymer, separating and recovering the at least one second non-sacrificial fiber from the at least one solvent or swelling agent and the at least one dissolved sacrificial polymer;

separating and recovering the at least one recovered sacrificial polymer from the at least one recovered solvent or swelling agent;

upon separation of the at least one recovered sacrificial polymer, washing, washing and drying, or drying the at least one recovered sacrificial polymer; and recovering the at least one recovered solvent or swelling agent, wherein the at least one recovered solvent is operable to be reused to dissolve the at least one recovered sacrificial polymer;

thereby recycling the at least one recovered sacrificial polymer and the at least one recovered solvent or swelling agent.

12. The method of claim 11, further comprising weaving or knitting the multicomponent fiber into a multicomponent fabric material prior to exposing the multicomponent fabric to the at least one solvent or swelling agent, and separating and recovering the non-sacrificial fiber from the at least one solvent or swelling agent and the at least one dissolved sacrificial polymer.

13. The method of claim 11, further comprising processing the multicomponent fiber into a multicomponent nonwoven material prior to exposing the multicomponent fiber to the at least one solvent or swelling agent, and separating and recovering the non-sacrificial fiber from the at least one solvent or swelling agent and the at least one dissolved sacrificial polymer.

14. The method of claim 11, further comprising processing the multicomponent fiber into multicomponent fiber segments and processing the multicomponent fiber segments into a multicomponent nonwoven material prior to exposing the multicomponent fiber to the at least one solvent or swelling agent, and separating and recovering the non-sacrificial fiber from the at least one solvent or swelling agent and the at least one dissolved sacrificial polymer.

15. The method of claim 11, further comprising adding chemical additives or physical additives to the at least one non-sacrificial fiber while recovering the at least one non-sacrificial fiber, wherein the chemical additives or physical additives include dispersants, lubricants, and surface finishes.

16. A method for recycling at least one sacrificial polymer and at least one solvent or at least one swelling agent when separating at least one target polymer from a multicomponent fiber made up of at least one sacrificial polymer and the at least one target polymer, comprising:
  contacting the at least one multicomponent fiber with the at least one solvent or the at least one swelling agent to separate the at least one target polymer from the at least one solvent or the at least one swelling agent and the at least one sacrificial polymer;
  recovering, washing, washing and drying, or drying the at least one target polymer;
  separating and recovering the at least one sacrificial polymer from the at least one solvent or the at least one swelling agent;
  upon separation of the at least one recovered sacrificial polymer, removing, washing, washing and drying, or drying the at least one recovered sacrificial polymer, wherein the at least one recovered sacrificial polymer is of the same purity as a virgin polymer of the same chemical composition and is therefore operable to be recycled and re-spun; and
  recovering the at least one solvent or the at least one swelling agent, wherein the at least one recovered solvent or the at least one recovered swelling agent is operable to be reused to dissolve the at least one recovered sacrificial polymer in a second multicomponent fiber;
  thereby recycling the at least one recovered sacrificial polymer and the at least one recovered solvent or the at least one recovered swelling agent.

17. The method of claim 16, further comprising adding chemical additives or physical additives to the at least one recovered target polymer, wherein the additives include thermal stabilizers.

18. The method of claim 16, wherein the at least one recovered sacrificial polymer is recovered in polymer chains longer than monomers.

19. The method of claim 16, wherein the at least one sacrificial polymer includes a polyolefin and the at least one target polymer includes one or more of Polyamide 6, Polyamide 66, Polybutylene terephthalate (PBT), and Polyethylene terephthalate (PET), wherein no component of the multicomponent fiber system is a sulfopolyester and wherein the at least one sacrificial polymer and the at least one target polymer are rheologically compatible.

20. The method of claim 16, wherein the at least one sacrificial polymer includes a polyamide, a non-sulfopolyester polyester, polyolefin, or polycarbonate and the at least one target polymer includes a polymer which is rheologically and thermally compatible with the at least one sacrificial polymer.

* * * * *